(12) United States Patent
Minakata et al.

(10) Patent No.: US 7,583,448 B2
(45) Date of Patent: Sep. 1, 2009

(54) ZOOM OPTICAL SYSTEM AND ELECTRONIC SYSTEM INCORPORATING IT

(75) Inventors: Hiroyuki Minakata, Hachioji (JP); Masaru Ikemachi, Akishima (JP); Kanato Adachi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/982,299

(22) Filed: Oct. 31, 2007

(65) Prior Publication Data

US 2008/0106808 A1     May 8, 2008

Related U.S. Application Data

(62) Division of application No. 10/559,830, filed as application No. PCT/JP2004/017028 on Nov. 10, 2004.

(30) Foreign Application Priority Data

| Nov. 17, 2003 | (JP) | 2003-386162 |
| Nov. 17, 2003 | (JP) | 2003-386163 |
| Nov. 19, 2003 | (JP) | 2003-389222 |
| Nov. 19, 2003 | (JP) | 2003-389223 |
| Nov. 25, 2003 | (JP) | 2003-393936 |
| Nov. 25, 2003 | (JP) | 2003-393937 |
| Nov. 25, 2003 | (JP) | 2003-393938 |

(51) Int. Cl.
    *G02B 15/14* (2006.01)
(52) U.S. Cl. .................... 359/686; 359/676
(58) Field of Classification Search ............. 359/686, 359/689, 676
See application file for complete search history.

(56) References Cited

U.S. PATENT DOCUMENTS 4,697,866 A * 10/1987 Howard ............... 359/355
5,157,550 A * 10/1992 Tsuchida et al. ........ 359/686
6,204,976 B1   3/2001 Nagahara
6,353,504 B1   3/2002 Yamamoto
2003/0231404 A1 * 12/2003 Nagahara .............. 359/680
2004/0252382 A1 * 12/2004 Nagata ................. 359/691

FOREIGN PATENT DOCUMENTS

| JP | 61-114822 | 6/1986 |
| JP | 10 12341 | 5/1998 |
| JP | 2003 04335 | 2/2003 |
| JP | 2003 035867 | 2/2003 |
| JP | 2003 156686 | 5/2003 |
| JP | 2003 322795 | 11/2003 |
| JP | 2004-341474 | 12/2004 |
| WO | WO 96/19749 | 6/1996 |

OTHER PUBLICATIONS

H.J. Tiziani "Optische Grundgesetze" 2001 Institut Fur Technische Optik, Stuttgart, XP002426972.
European Search Report of EP 04799705.1, dated May 2, 2007.

* cited by examiner

*Primary Examiner*—Ricky L Mack
*Assistant Examiner*—James R Greece
(74) *Attorney, Agent, or Firm*—Kenyon & Kenyon LLP

(57) ABSTRACT

The invention relates to a zoom optical system that makes it possible to offer a sensible tradeoff between cost savings and size reductions and an electronic system that incorporates it. The zoom optical system comprises a lens group having negative refracting power and a lens group having positive refracting power. At least one lens is formed by molding of a first lens blank (11) that provides a surface including at least an optical function surface after molding, and a second lens blank (12) that provides a surface other than said surface including at least an optical function surface after molding, wherein the first lens blank (11) and the second lens blank (12) are integrated into a one-piece lens (10).

4 Claims, 58 Drawing Sheets

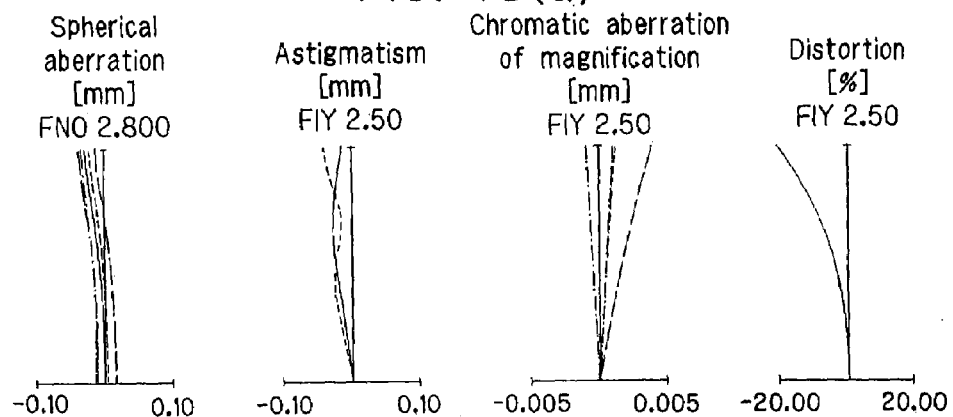
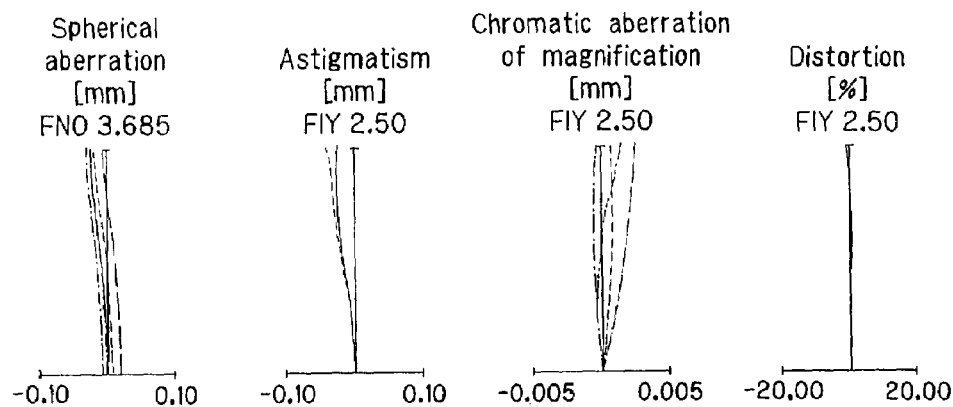
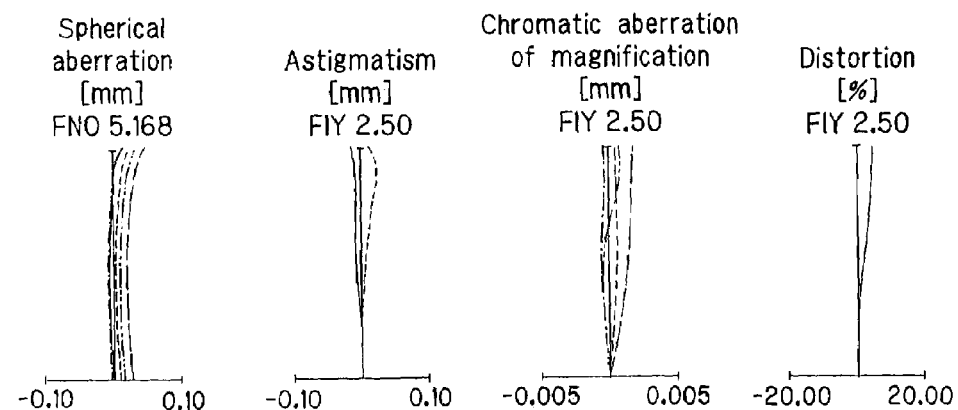

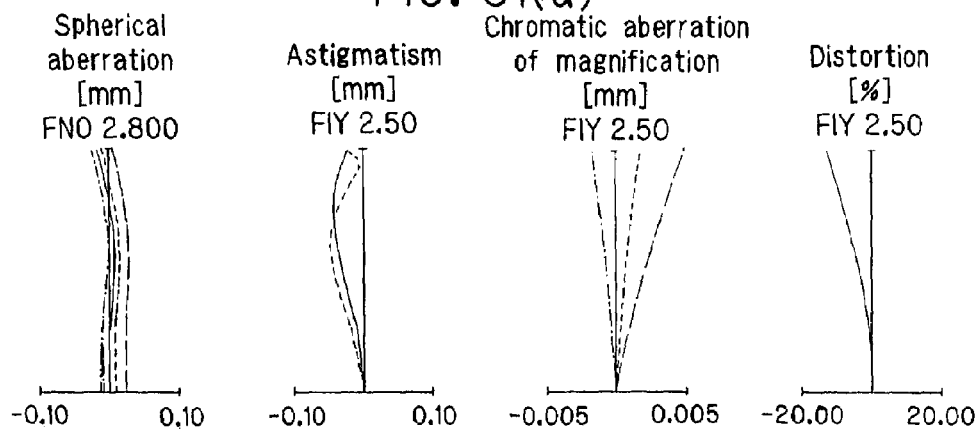
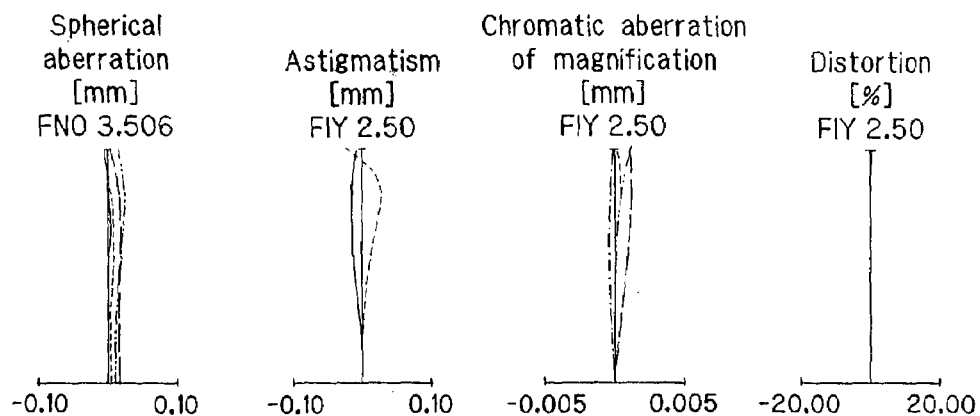
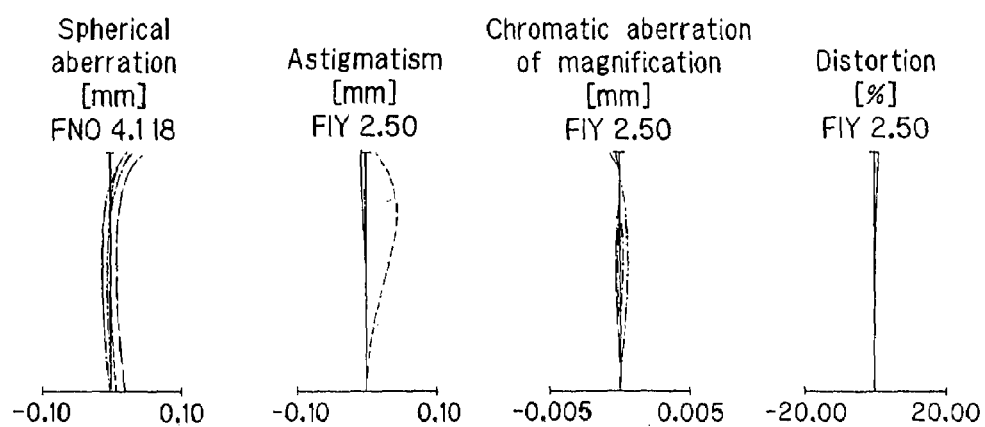

ZOOM OPTICAL SYSTEM AND ELECTRONIC SYSTEM INCORPORATING IT

CROSS REFERENCE TO RELATED APPLICATION

This application is a division of prior U.S. patent application Ser. No. 10/559,830, filed Dec. 6, 2005, which is a 371 national phase application of PCT/JP2004/017028 filed 10 Nov. 2004, claiming priority to Japanese Patent Applications No. 2003-386162 and No. 2003-386163, both filed 17 Nov. 2003, No. 2003-389222 and No. 2003-389223, both filed 19 Nov. 2003 and No. 2003-393936, No. 2003-393937 and No. 2003-393938, all filed 25 Nov. 2003, the entirety of each of which is incorporated herein by reference thereto.

TECHNICAL ART

The present invention relates generally to a zoom optical system and an electronic system incorporating it, and more particularly to a compact zoom optical system and an electronic system incorporating it. This electronic system, for instance, includes digital cameras, video cameras, digital video units, personal computers, mobile computers, cellular phones and personal digital assistants.

BACKGROUND ART

Recently, personal digital assistants acronymed as PDAs and cellular phones have undergone explosive growth in demand. Some such systems have digital camera or digital video functions added to them. To implement these functions, CCD (charge coupled device) or CMOS (complementary metal oxide semiconductor) sensors are now used as image pickup devices. To reduce the sizes of such systems, it is preferable to use an image pickup device having a relatively small light receiving area. In this case, a sensible tradeoff between size reductions and cost savings must be made while the performance of an optical system is kept high. Size reductions are now achieved by reducing the number of lenses used. On the other hand, cost reductions by use of a fewer step, for instance, is now achieved by use of a fabrication process wherein lenses are formed under pressure in a lens holder.

For reductions in the number of lenses that form an optical system, it is necessary to use aspheric lenses. For the fabrication of such aspheric lenses, use is generally made of a fabrication process wherein a preform is pressed in a state softened by heating (hereinafter called the prior art lens processing). With this prior art lens processing, an aspheric lens is formed larger than the required outer diameter, and rounding is carried out in such a way as to incorporate it in a lens barrel. For this reason, for instance, the thickness of the outer periphery of the lens at the necessary outer diameter will become larger than that of the lens during rounding. A reduction in the number of lenses for compactness will result in an increase in lens thickness, because the refracting power of each of lenses inclusive of a positive lens will become strong. For this reason and to give the lens a sufficient peripheral thickness, the peripheral thickness of the lens at the necessary outer diameter will become far larger. Thus, no sufficient effect on size reductions will still be obtained.

On the other hand, Patent Publication 1 says nothing about not only size reductions but also conditions for size reductions.

Patent Publication 1

JP (A) 61-114822

SUMMARY OF THE INVENTION

Such being the prior art situations, the primary object of the invention is to provide a zoom optical system that can offer an effective tradeoff between cost reductions and size reductions, and an electronic system incorporating it.

According to the first aspect of the invention, there is provided a zoom optical system comprising a lens group having negative refracting power and a lens group having positive refracting power, characterized in that at least one lens is formed by molding of a first lens blank that provides a surface including at least an optical function surface after molding, and a second lens blank that provides a surface other than said surface including at least an optical function surface after molding, wherein the first lens blank and the second lens blank are integrated into a one-piece lens.

In one preferable embodiment of the invention, the second lens blank is characterized by having shading capability.

In another preferable embodiment of the invention, the second lens blank is characterized by being a metal, cermet or ceramics.

Yet another embodiment of the invention is characterized in that an organic-inorganic composite lens blank is used as an optical lens blank for at least one optical element that forms a part of the optical system.

Further, the invention includes an electronic system comprising the above zoom optical system and an electronic image pickup device located on an image side thereof.

BRIEF DESCRIPTION OF THE DRAWINGS

FIG. 1 is generally illustrative of how to fabricate the one-piece lens for use with the invention.

FIG. 3 is generally illustrative of another fabrication process of the one-piece lens for use with the zoom optical system.

FIG. 5 is generally illustrative of yet another fabrication process of the one-piece lens for use with the zoom optical system.

FIG. 43 is an aberration diagram for Example 6-3 of the sixth zoom optical system, showing aberrations at a wide-angle end (a), in an intermediate setting (b) and at a telephoto end (c) upon focusing on an infinite object point.

FIG. 51 is an aberration diagram for Example 7-2 of the seventh zoom optical system, showing aberrations at a wide-angle end (a), in an intermediate setting (b) and at a telephoto end (c) upon focusing on an infinite object point.

BEST MODES OF CARRYING OUT THE INVENTION

Figure 1A:
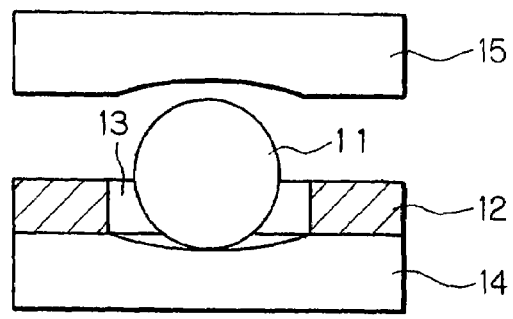
FIG. 1(a) is illustrative of how a lens blank is located before lens molding.

The present invention provides a zoom optical system comprising a lens group having negative refracting power and a lens group having positive refracting power, wherein at least one lens is formed by molding of a first lens blank that provides a surface including at least an optical function surface after molding, and a second lens blank that provides a surface other than said surface including at least an optical function surface after molding, and the first lens blank and the second lens blank are integrated into a one-piece lens.

A zoom optical system may generally be broken down into the following seven types:

(1) the first group is a negative lens group, and the second group is a positive lens group;

(2) the first group is a positive lens group, and the second group is a negative lens group;

(3) the first group is a negative lens group, the second group is a positive lens group, and the third group is a positive lens group;

(4) the first group is a negative lens group, the second group is a positive lens group, the third group is a positive lens group, and the fourth group is a negative lens;

(5) the first group is a negative lens group, the second group is a positive lens group, the third group is a negative lens group, and the fourth group is a positive lens group;

(6) the first group is a negative lens group, the second group is a positive lens group, the third group is a positive lens group, and the fourth group is a positive lens group; and (7) the first group is a positive lens group, the second group is a negative lens group, the third group is a positive lens group, and the fourth group is a positive lens group.

Each type will be described at great length later.

In such zoom optical systems, at least one one-piece lens should preferably satisfy the following condition (1) with respect to the thickness of its thinnest portion.

$$0.1 \text{ mm} < t < 0.5 \text{ mm} \tag{1}$$

Here t is the thickness of the thinnest portion of the one-piece lens.

The advantage of, and the requirement for, the above arrangement is now explained. The reduction in the thickness of the thinnest portion of the one-piece lens enables it to be formed so small that the total length of the lens system can be made short. In other words, the satisfaction of condition (1) ensures that size reductions are achievable while optical performance is kept intact. As the lower limit of 0.1 mm to condition (1) is not reached, the lens becomes too thin to stand up deformation due to external pressure, temperature, etc., having difficulty in keeping the optical performance. Exceeding the upper limit of 0.5 mm causes the thinnest portion to become large, rendering the lens large.

More preferably, the following condition (1-2) should be satisfied, so that the optical system can be more slimmed down while the optical performance is maintained.

$$0.15 \text{ mm} < t < 0.4 \text{ mm} \tag{1-2}$$

Even more preferably, the following condition (1-3) should be satisfied, so that the optical system can be much more slimmed down while the optical performance is maintained.

$$0.2 \text{ mm} < t < 0.35 \text{ mm} \tag{1-3}$$

For the one-piece lens that satisfies the above conditions, it is also preferable to have positive refracting power.

The advantage of, and the requirement for, this arrangement is now explained. With the positive lens formed as a one-piece lens, its edge thickness difference can be diminished, resulting in a decrease in the total length of the lens system.

When the one-piece lens is molded, it is preferable to simultaneously form a plurality of optical function surfaces on a single molding machine.

The advantage of, and the requirement for, this arrangement is now explained. Simultaneous formation of a plurality of parallel optical function surfaces on a single molding machine allows for a reduction in the processing time for each surface, and ensues as well that the service life of a press per the number of surfaces is extended. Therefore, some significant cost reductions are achievable.

Preferably, the first lens blank should be a glass.

The advantage of, and the requirement for, this arrangement is now explained. Use of a high-refractive-index glass as the first lens blank allows for satisfactory correction of various aberrations such as spherical aberrations and field curvature with a fewer lenses. The glass is less susceptible of influences of temperature changes. It is thus possible to achieve an optical system that has limited back focus fluctuations with temperature changes. It is understood that plastic or organic-inorganic composite lens blanks could be used as the first lens blank.

Preferably, the second lens blank should have shading capability.

The advantage of, and the requirement for, this arrangement is now explained. With the shading capability of the second lens blank, light rays coming from surfaces other than the optical function surface arriving at the image plane can be so minimized that ghost light and flare light can be prevented.

Preferably, the second lens blank should be a metal, cermet or ceramics.

The advantage of, and the requirement for, this arrangement is now explained. If the second lens blank is a metal, cermet (a ceramic-metal composite lens blank) or ceramics, shaping is easily achievable.

Preferably, an organic-inorganic composite lens blank should be used as an optical lens blank for at least one optical element that forms a part of the optical system.

The advantage of, and the requirement for, this arrangement is now explained. As the organic-inorganic composite material is used as the optical material of an optical element, it allows various optical properties (refractive index, chromatic dispersion) to show up (or be obtained) depending on the types and content ratios of the organic and inorganic components. Thus, if the organic and inorganic components are blended at any desired ratio, it is then possible to achieve optical materials having the desired, or higher, optical properties. This in turn enables an optical element having ever high performance to be so obtained that various aberrations can be corrected with a fewer lenses, resulting in cost savings and size reductions of an optical system.

Preferably, the organic-inorganic composite material should contain zirconia in a nano-particle form.

Preferably, the organic-inorganic composite material should contain zirconia and alumina in a nano-particle form.

Preferably, the organic-inorganic composite material should contain a niobium oxide in a nano-particle form.

Preferably, the organic-inorganic composite material should contain a zirconium alkoxide hydrolyzate and alumina in a nano-particle form.

The advantage of, and the requirement for, this arrangement is now explained. These inorganic materials in a nano-particle form are examples of the inorganic component. If such nano-particles are dispersed through the organic component, typically a plastic component at a given ratio, various optical properties (refractive index, chromatic dispersion) can then be developed.

How to fabricate the one-piece lens is explained with reference to FIG. 1. Referring to FIG. 1(a), reference numerals 14 and 15 represent a bottom force and a top force of a one-piece lens molding press, respectively. At a given area of the bottom force 14, there is provided a one-piece lens bottom surface dish (hereinafter called simply the bottom surface dish), which corresponds to an optical function surface portion of the post-molding one-piece lens. At a given area of the top force 15, too, there is provided a one-piece lens top cavity (hereinafter called simply the top surface cavity), which corresponds to an optical function surface portion of the post-molding one-piece lens.

A one-piece lens 10 is molded of a first lens blank 11 and a second lens blank 12. The first lens blank 11 is to be provided with a surface including at least an optical function surface after the formation of the one-piece lens by molding, and the second lens blank 12 is to be provided with a surface other than the surface including at least an optical function surface after the formation of the one-piece lens by molding. This surface other than the surface including an optical function surface is formed at and around the surface formed by the first lens blank 11. For instance, this surface is to provide a surface to contact a lens barrel to support the one-piece lens or a centering surface.

The second lens blank 12 is provided with a cavity 13. Therefore, when the one-piece lens 10 is fabricated, the first lens blank 11 is placed together with the second lens blank 12 on the bottom force 14 of the one-piece lens molding press, as shown in FIG. 1(a), while the first lens blank 11 is fitted into the cavity 13. In this state, the first lens blank 11 is heated to a temperature at which it is deformable, and which could be a suitable temperature higher than the transition point of the first lens blank 11. Then, when the suitable temperature is reached, the top force 15 of the one-piece lens molding press goes down from above until it contacts the surface of the second lens blank 12. This permits the first lens blank 11 to be pressed by the bottom and top forces. As a result, the first lens blank 11 is molded into a form commensurate with the bottom and top forces, providing the one-piece lens 10, as shown generally in FIG. 1(b).

Figure 1B:
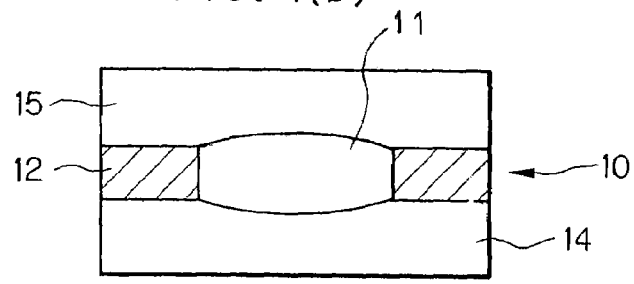
FIG. 1(b) is illustrative of how the lens blank is molded into the one-piece lens after lens molding.

After removal of the top force 15 of FIG. 1(b), the one-piece lens 10 is easily released from within the bottom force 14. In the one-piece lens 10, the first lens blank 11 is integrally fused to the cavity in the second lens blank 12, as shown in the perspective view of FIG. 2. In FIG. 1, a set of the first and second lens blanks 11 and 12 are placed in a pair of forces 14 and 15 by way of illustration alone. Another embodiment of this arrangement is now explained.

Figure 3A:
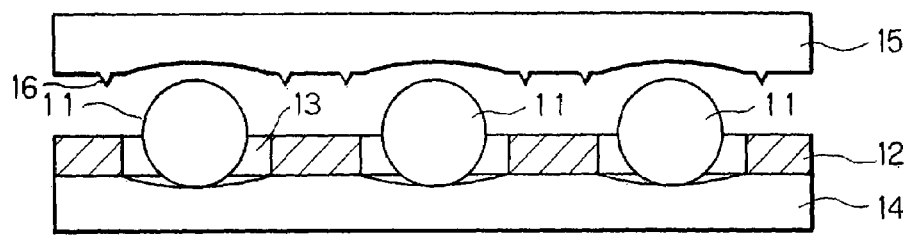
FIG. 3(a) is illustrative of how lens blanks are located before lens molding.

In another embodiment of FIG. 3, a pair of bottom force 14 and top force 15 of a molding press are provided with a plurality of dishes in a parallel fashion. A plurality of the first and second lens blanks 11 and 12 are located in correspondence to the respective dishes. Thus, a plurality of one-piece lenses are simultaneously molded. In FIG. 3(a), reference numerals 14 and 15 are the bottom and top forces of the one-piece lens molding press. At a given area of the bottom force 14, there are provided a plurality of one-piece lens bottom surface dishes (hereinafter called simply the bottom surface dishes). These bottom surface dishes are each to provide an optical function surface portion of the post-molding one-piece lens. At a given area of the top force 15, too, there are provided a plurality of one-piece lens top surface dishes (hereinafter called simply the top surface dishes). These top surface dishes, too, are each to provide an optical function surface portion of the post-molding one-piece lens.

As shown in FIG. 3(a), the one-piece lens of this embodiment, too, is molded of the first lens blank 11 and the second lens blank 12. The first lens blank 11 is to provide a surface including at least an optical function surface after the formation of an individual one-piece lens by molding, and the second lens blank 12 is to provide a surface other than the surface including at least an optical function surface after the formation of an individual one-piece lens by molding. This surface other than the surface including an optical function surface is formed at and around the surface formed by the first lens blank 11. For instance, this surface is to provide a surface to contact a lens barrel to support the one-piece lens or a centering surface.

Figure 2:
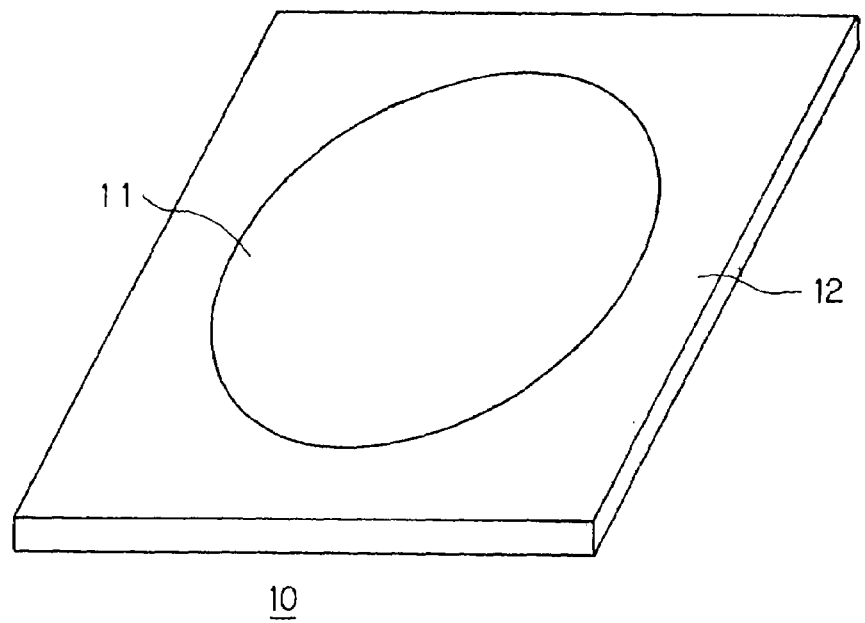
FIG. 2 is a perspective view of the one-piece lens molded by the fabrication process of FIG. 1.

The second lens blank 12 is provided with a plurality of cavities 13. In this embodiment, therefore, one-piece lenses are formed in an array fashion. Then, one-piece lenses 10' formed in an array fashion (hereinafter called the array lenses 10') are individually cut off to obtain individual one-piece lenses 10' as shown in FIG. 2. For the fabrication of the array lenses 10', a plurality of the first lens blanks 11 are placed together with the second lens blank 12 on the bottom force 14 of the one-piece lens molding press, while the first lens blanks 11 are each fitted into the cavity 13. In this state, the first lens blanks 11 are heated to a temperature at which they are deformable, and which could be a suitable temperature higher than their transition point. Then, when the suitable temperature is reached, the top force 15 of the one-piece lens press goes down from above until it contacts the surface of the second lens blank 12. This permits the first lens blanks 11 to be each pressed by the bottom and top forces. As a result, the first lens blanks 11 are formed in a form commensurate with the bottom and top dishes, giving the array lenses 10', as shown generally in FIG. 3(b).

Figure 3B:
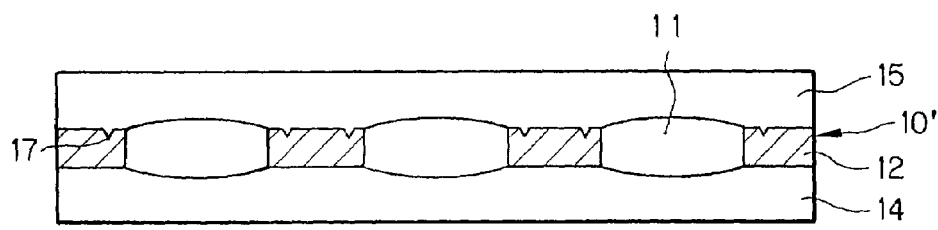
FIG. 3(b) is illustrative of how the lens blanks are molded into the one-piece lenses after lens molding.
Figure 4:
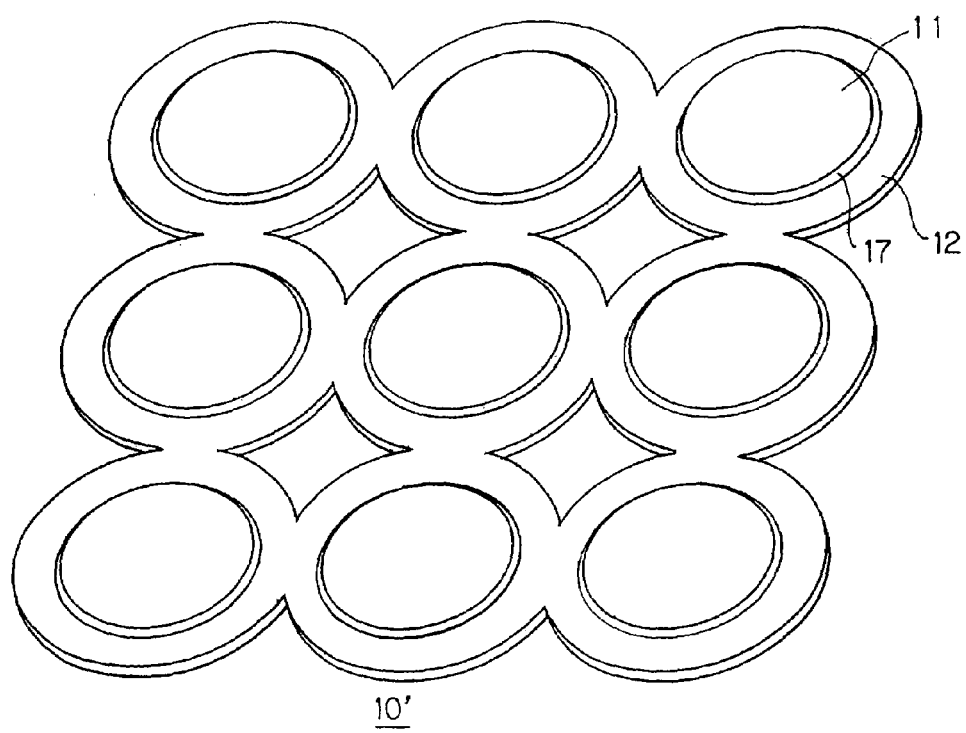
FIG. 4 is illustrative in perspective of a one-piece lens fabricated by the fabrication process of FIG. 2.

In this embodiment, rims 16 are provided on the top force 15, as shown in FIG. 3. The rims 16 are transferred onto the second lens blank in a slot form simultaneously with molding. After removal of the top force 15 of FIG. 3(b), the array lenses 10' are easily released from within the bottom force 14. In these array lenses 10', the first lens blanks 11 are each integrally fused to the cavity 13 in the second lens blank 12. Thereafter, the second lens blank 12 is cut off to obtain a plurality of one-piece lenses 10. In FIGS. 3 and 4, a 3×3 lens array is shown; however, how many lenses are to be obtained is not critical.

Figure 5A:
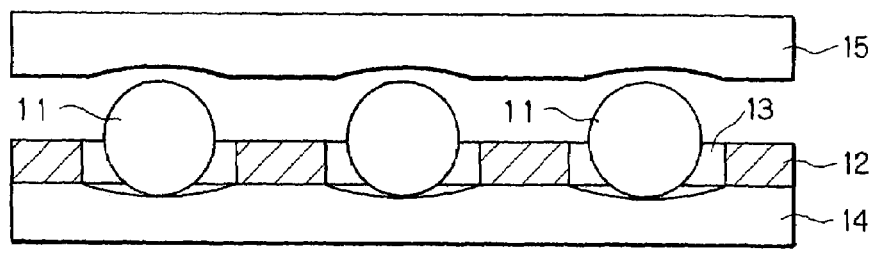
FIG. 5(a) is illustrative of how lens blanks are located before lens molding.
Figure 5B:
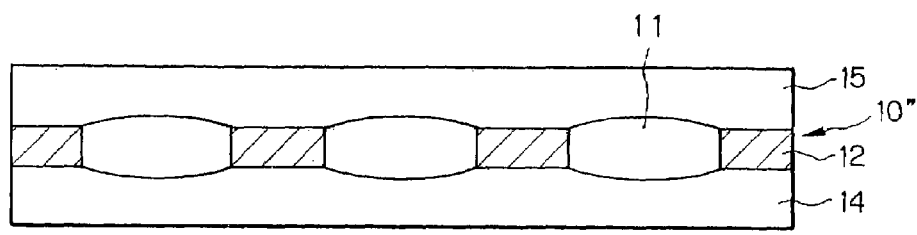
FIG. 5(b) is illustrative of how the lens blanks are molded into the one-piece lenses after lens molding.
Figure 6:
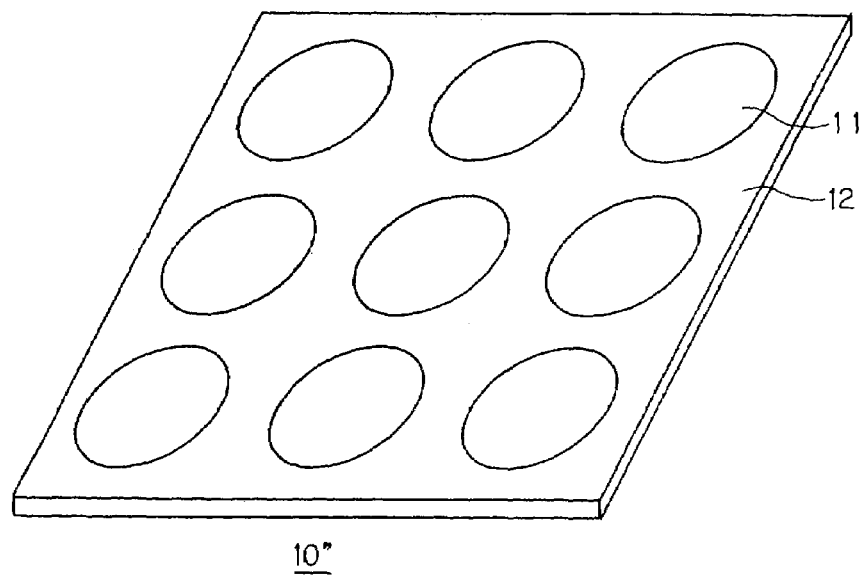
FIG. 6 is illustrative in perspective of a one-piece lens fabricated by the fabrication process of FIG. 5.

Yet another embodiment is shown in FIGS. 5 and 6. This embodiment is different from the embodiment of FIGS. 3 and 4 only in that there are no rims 16 on the top force 15. Thus, the second lens blank 12 has no slots 17.

Each type of the zoom optical system is now explained.

(1) First of all, reference is made to the type wherein the first group is a negative lens group and the second group is a positive lens group.

The first zoom optical system of the invention comprises, in order from its object side, a first group having negative refracting power and a second group having positive refracting power, wherein at least one lens is formed by molding of a first lens blank that provides a surface including at least an optical function surface after molding and a second lens blank that provides a surface other than the surface including at least an optical function surface after molding. In other words, at least one lens comprises a one-piece lens wherein the first lens blank and the second lens blank are integrated together.

The advantage of, and the requirement for, the above arrangement is now explained. Such a zoom optical system of negative-positive group construction can be set up with a reduced number of lenses, and so is best suited for size reductions and cost savings. With the one-piece lens, further size reductions are achievable. This is because for the one-piece lens any peripheral thickness for rounding is not required, when compared with the prior art lens processing, as described just below.

For the prior art lens processing, rounding is essential. For this reason, the outer peripheral portion of a lens prior to rounding must have some thickness or edge thickness difference, resulting in an increased center thickness (the thickness of a center portion). However, the one-piece lens for use with the first zoom optical system has a limited edge thickness difference, so that the optical system can be diminished in total length. With the prior art lens processing, the stronger the power of a positive lens, the larger the thickness of its outer peripheral portion becomes at the necessary outer diameter. For the first zoom optical system, however, it is not necessary to ensure the thickness of the outer peripheral portion at the time of rounding. Therefore, the stronger the power of the positive lens, the more significant the effect on size reductions becomes.

Such a one-piece lens is also easy to handle, leading to savings of the cost for zoom lens system fabrication.

With the first zoom optical system, zooming from its wide-angle end to its telephoto end, for instance, is carried out as follows. The first group moves in a concave locus toward the object side, and the second lens group moves toward the object side.

Preferably for the first zoom optical system, the one-piece lens should be cemented to other lens.

The advantage of, and the requirement for, the above arrangement is now explained. If the one-piece lens is cemented to other lens as mentioned above, the sensitivity to decentration (decentration errors) can then be more reduced as compared with the case where individual lenses are independently assembled. Therefore, setting up the optical system becomes easy, leading to low costs.

Preferably for the first zoom optical system, at least one optical function surface of the one-piece lens should be an aspheric surface. To put it another way, the one-piece lens should be an aspheric one-piece lens.

The advantage of, and the requirement for, the above arrangement is now explained. The use of such an aspheric surface ensures that various aberrations are held back, with the result that the number of lenses in the whole system can be diminished, and size reductions and cost savings are achievable as well.

Preferably for the first zoom optical system, the first group should comprise at least one positive lens.

The advantage of, and the requirement for, the above arrangement is now explained. The first group, because of having negative power, includes at least one negative lens. Therefore, if the positive lens is incorporated in the first group, it is then possible to hold back fluctuations with zooming of various aberrations inclusive of spherical aberrations, coma and chromatic aberration of magnification.

Preferably for the first zoom optical system, the first group should include a negative lens nearest to its object side.

The advantage of, and the requirement for, the above arrangement is now explained. With this arrangement, the effective diameter of the lenses in the first group and the total length of the lens system can be shortened.

Preferably for the first zoom optical system, the first group should comprise at least one one-piece lens.

The advantage of, and the requirement for, the above arrangement is now explained. Because the lenses in the first group have a large effective diameter, there is an increase in the volume necessary for it. Therefore, if the one-piece lens is used for any of the lenses in the first group, the volume of the optical material can then be diminished. As a result, cost reductions are achievable.

Also, because the volume of the lenses themselves becomes small, the optical system can be slimmed down. Further, because the one-piece lens is easy to handle, the cost for the fabrication of the optical system can be cut short.

Preferably for the first zoom optical system, at least one of the one-piece lenses in the first group should have positive refracting power.

The advantage of, and the requirement for, the above arrangement is now explained. For correction of chromatic aberration of magnification, etc., it is preferable to locate a positive lens in the first group. Here, if a one-piece lens is used as this positive lens, it is then possible to make the edge thickness difference of the positive lens small and, hence, shorten the total length of the lens system.

Preferably for the positive lens in the first group, it is preferable to use a high-refractive-index, high-dispersion optical material for the purpose of correcting chromatic aberration of magnification, and spherical aberrations, etc. at the telephoto end. It is generally noted that the high-refractive-index, high-dispersion material costs much. To add up to this, for the positive lens in the first lens group, it is required to have a large volume, because of its large effective diameter. Here, if a one-piece lens is used as this positive lens, it is then possible to decrease the volume of the optical material necessary for the positive lens. Therefore, cost reductions are achievable. Further, the volume of the lens itself becomes small, and so the optical system can be slimmed down.

Preferably for the first zoom optical system, at least one positive lens in the first group should satisfy the following condition.

$$0.1 < HH1/\phi1 < 10 \tag{2A}$$

Here, HH1 is the principal point spacing (mm) of the positive lens in the first group, and $\phi1$ is the refracting power of the positive lens in the first group.

The advantage of, and the requirement for, the above arrangement is now explained. With a negative lens located in the first group (and nearest to its object side), there is chromatic aberration of magnification. To correct the chromatic aberration of magnification, etc. with a fewer lenses, i.e., at low costs, it is preferable to have a positive lens of increased power in the first group.

With the prior art lens processing, however, a lens is formed somewhat larger than the necessary outer diameter, and rounding is carried out in such a way as to incorporate it in a lens barrel. For this reason, when a positive lens is formed by molding, the thickness of its outer peripheral portion at the necessary outer diameter becomes larger than that of the lens at the time of rounding. Further, as the power of the positive lens increases, the thickness of the outer peripheral portion at the necessary outer diameter becomes far larger because of the need of ensuring the outer peripheral thickness of the lens at the time of rounding. As a result, it is difficult to make a sensible compromise between the reduction in the whole lens length and the size reduction of each lens or between cost savings and size reductions.

However, if a one-piece lens is used as the positive lens in the first group, it is unnecessary to form the positive lens larger than the necessary outer diameter, and the satisfaction of condition (2A) enables large power to be achieved with a thin lens. It is thus possible to achieve cost savings and size reductions at the same time.

As the lower limit of 0.1 to condition (2A) is not reached, the power becomes too large relative to the principal point spacing. This does not only result in an increased sensitivity to decentration, but also has difficulty in keeping the optical performance intact. As the upper limit of 10 is exceeded, the power becomes small relative to the principal point spacing. Thus, chromatic aberration of magnification or the like produced at the negative lens in the first group remains undercorrected. Alternatively, more lenses must be used for correction of chromatic aberration of magnification or the like.

More preferably, $$0.5 < HH1/\phi1 < 6 \tag{2A-2}$$

In this case, the optical system can be more slimmed down at the same low cost.

Even more preferably, $$1 < HH1/\phi1 < 3 \tag{2A-3}$$

In this case, the optical system can be much more slimmed down at the same low cost.

Preferably for the first zoom optical system, at least one one-piece lens in the first group should have at least one aspheric surface.

The advantage of, and the requirement for, the above arrangement is now explained. At the wide-angle end of the first zoom optical system, light rays gain height at the first group. For this reason, it is preferable to include at least one aspheric surface in the first group. This allows for good correction of off-axis aberrations such as astigmatism, distortion and coma with a fewer lenses. Therefore, the optical system can be reduced in terms of both size and cost.

At the telephoto end, the diameter of a light beam through the first group grows large. Therefore, if at least one aspheric surface is included in the first group, spherical aberrations, coma, etc. can then be well corrected with a fewer lenses. In this case, too, the optical system can be reduced in terms of both size and cost.

Preferably for the first zoom optical system, the second group should comprise at least one negative lens.

The advantage of, and the requirement for, the above arrangement is now explained. The second group, because of having positive power, comprises at least one positive lens. Therefore, if it includes a negative lens, fluctuations with zooming of various aberrations such as coma, astigmatism and longitudinal chromatic aberration can then be held back.

Preferably for the first zoom optical system, the second group should have a positive lens located nearest to its object side.

The advantage of, and the requirement for, the above arrangement is now explained. At the second group, it is required to converge light diverged at the first group of negative power. Thus, the lens located nearest to the object side should preferably be a positive lens.

Preferably for the first zoom optical system, the second lens group should have a negative lens located nearest to its image side.

The advantage of, and the requirement for, the above arrangement is now explained. The location of the negative lens nearest to the image side of the second group provides the two following advantages: (1) the principal point position displaces toward the first group side, so that the principal point spacing between the first group and the second group can be shortened, resulting in a decrease in the total length of the lens system; and (2) the second group is so increased in terms of magnification that the amount of movement of the second group with zooming can be decreased, resulting in a decrease in the total length.

Preferably for the first zoom optical system, the second group should comprise at least one one-piece lens and at least one of one-piece lenses should have positive refracting power.

The advantage of, and the requirement for, the above arrangement is now explained. The use of the one-piece lens as the positive lens allows for a decrease in the edge thickness difference of the positive lens, with the result that the whole length of the lens system can be shortened.

The positive lens in the second group should also preferably be formed of a high-refractive-index, low-dispersion optical material for the purpose of holding back longitudinal chromatic aberration, spherical aberration, astigmatism, etc. Commonly, however, the high-refractive-index, low-dispersion optical material costs much. Therefore, it is preferable to use a one-piece lens for that positive lens, because the volume of the optical material necessary for the positive lens can be reduced and, hence, cost can be cut short.

Further, the volume of the lens itself becomes so small that the optical system can be slimmed down. Furthermore, since that one-piece lens is easy to handle, it is possible to cut short the cost for the fabrication of the zoom optical system.

Preferably for the first zoom optical system, at least one positive lens in the second group should satisfy the following condition.

$$0.1 < HH2/\phi2 < 10 \tag{3A}$$

Here, HH2 is the principal point spacing (mm) of the positive lens in the second group, and $\phi2$ is the refracting power of the positive lens in the second group.

The advantage of, and the requirement for, the above arrangement is now explained. By increasing the power of the positive lens located in the second group, the distance of movement of the second group can be made short. This leads to a reduction in the whole length of the lens system. However, the prior art lens processing has difficulty in reconciling the reduction in the whole length of the lens system with slimming down each lens, as already detailed with reference to condition (2A).

However, if that positive lens is molded as a one-piece lens, it is then unnecessary to form it larger than the necessary outer diameter. The satisfaction of condition (3A) enables large power to be achieved with a thin lens. In this way, further size reductions are achievable.

As the lower limit of 0.1 to condition (3A) is not reached, the power becomes too large relative to the principal point spacing. This does not only result in an increased sensitivity to decentration, but also has difficulty in keeping the optical performance intact. As the upper limit of 10 is exceeded, the power becomes small relative to the principal point spacing, failing to decrease the amount of movement of the second group, and resulting in an increase in the whole length of the lens system.

It is more preferable to satisfy the following condition (3A-2), because the reduction in the whole length of the lens system can be reconciled with slimming down each lens.

$$0.5 < HH2/\phi2 < 2 \tag{3A-2}$$

It is even more preferable to satisfy the following condition (3A-2), because the tradeoff between the reduction in the whole length of the lens system and slimming down each lens is more easily achievable.

$$1 < HH2/\phi2 < 1.5 \tag{3A-3}$$

Preferably for the first zoom optical system, at least one one-piece lens in the second group should be cemented to other lens.

The advantage of, and the requirement for, the above arrangement is now explained. The incorporation of a cemented lens in the second group allows for a decrease in the sensitivity to decentration, which in turn makes the assembling of the optical system easy, leading to cost savings.

Preferably for the first zoom optical system, at least one one-piece lens in the second group should have at least one aspheric surface.

The advantage of, and the requirement for, the above arrangement is now explained. The first group has negative refracting power. In this case, a light beam is enlarged through the first group into a light beam of larger diameter, which is then incident on the second group. Thus, the light beam through the second group has a larger diameter, and if at least one aspheric surface is introduced in the second group, good aberration correction can be made. For lens diameter reductions, the power of each group must be increased. As the positive power of the second group increases, however, there are large transverse magnification and aberration changes of the second group with zooming. If the aspheric surface is introduced in the second group, it is possible to make correction for aberrations produced at the second group and hold back aberration fluctuations with zooming.

(2) Reference is then made to the type wherein the first group is a positive lens group and the second group is a negative lens group.

The second zoom optical system of the invention comprises, in order from its object side, a first group having positive refracting power and a second group having negative refracting power, wherein at least one lens is formed by molding of a first lens blank that provides a surface including at least an optical function surface after molding and a second lens blank that provides a surface other than the surface including at least an optical function surface after molding. In other words, at least one lens comprises a one-piece lens wherein the first lens blank and the second lens blank are integrated together.

The advantage of, and the requirement for, the above arrangement is now explained. As in the zoom optical system of negative-positive group construction, the zoom optical system of such negative-positive group construction can be set up with a reduced number of lenses, and so is best suited for size reductions and cost savings. With the one-piece lens, further size reductions are achievable. This is because for the one-piece lens any peripheral thickness for rounding is not required, when compared with the prior art lens processing, as previously described in conjunction with the first zoom optical system.

Such a one-piece lens is also easy to handle, leading to savings of the cost for zoom lens system fabrication.

Here, with the second zoom optical system, zooming from the wide-angle end to the telephoto end, for instance, is carried out as described just below. The first group and the second group move to the object side of the optical system while the space between the first group and the second group becomes narrow.

Preferably for the second zoom optical system, the one-piece lens should be cemented to other lens, and at least one optical function surface should be an aspheric surface. In other words, the one-piece lens should preferably be an aspheric one-piece lens.

The advantage of, and the requirement for, the above arrangement is the same as in the first zoom optical system.

Preferably for the second zoom optical system, the first group should comprise at least one negative lens.

The advantage of, and the requirement for, the above arrangement is now explained. The first group, because of having positive power, includes at least one positive lens. Therefore, if the negative lens is incorporated in the first group, it is then possible to hold back fluctuations with zooming of various aberrations inclusive of spherical aberration, coma and chromatic aberration of magnification.

Preferably for the second zoom optical system, the first group should include a positive lens nearest to its image side.

The advantage of, and the requirement for, the above arrangement is now explained. The location of the positive lens nearest to the image side of the first group allows for a decrease in the spacing between the rear principal point of the first group and the front principal point of the second group, resulting in the achievement of size reductions.

Preferably for the second zoom optical system, the first group should comprise at least one one-piece lens, wherein the one-piece lens is a positive lens.

The advantage of, and the requirement for, the above arrangement is the same as in the first zoom optical system.

The use of the one-piece lens as the positive lens enables the edge thickness difference of the positive lens to become small. Therefore, the whole length of the lens system can be shortened.

Preferably for the second zoom optical system, the positive lens in the first group should satisfy the following condition.

$$0.1 < HH1/\phi1 < 15 \quad (2B)$$

Here, HH1 is the principal point spacing (mm) of the positive lens in the first group, and $\phi1$ is the refracting power of the positive lens in the first group.

The advantage of, and the requirement for, the above arrangement is now explained. In order from the optical system to be of a telephoto type having a shortened total length, it is preferable that the positive lens in the first group have large power. However, the prior art lens processing has difficulty in offering a sensible tradeoff between low cost and slimming-down, as already detailed in conjunction with the first zoom optical system.

However, if a one-piece lens is used as the positive lens in the first group, it is unnecessary to form the positive lens larger than the necessary outer diameter, and the satisfaction of condition (2B) enables large power to be achieved with a thin lens. It is thus possible to achieve cost savings and size reductions at the same time.

As the lower limit of 0.1 to condition (2B) is not reached, the power becomes too large relative to the principal point spacing. This does not only result in an increased sensitivity to decentration, but also has difficulty in keeping the optical performance intact. As the upper limit of 15 is exceeded, the effect of the telephoto type becomes slender, because the power becomes small relative to the principal point spacing. Therefore, the whole length of the lens system becomes long. Alternatively, a lot more lenses must be used for setting up the telephoto type.

It is more preferable to satisfy the following condition (2B-2). In this case, the reduction in the whole length of the lens system and slimming down each lens are achievable at the same time.

$$0.5 < HH1/\phi1 < 6 \quad (2B-2)$$

It is even more preferable to satisfy the following condition (2B-3). In this case, it is easier to achieve the reduction in the whole length of the lens system and slimming down each lens at the same time.

$$1 < HH1/\phi1 < 2 \quad (2B-3)$$

Preferably for the second zoom optical system, at least one one-piece lens in the first group should be cemented to other lens.

The advantage of, and the requirement for, the above arrangement is now explained. By the incorporation of such a cemented lens in the first group, the sensitivity to decentration can be so diminished that the assembling of the optical system is facilitated, leading to cost savings.

Preferably for the second zoom optical system, at least one one-piece lens in the first group should has at least one aspheric surface.

The advantage of, and the requirement for, the above arrangement is now explained. In the zoom optical system of positive-negative group construction, there is a large light beam diameter at the first group. Therefore, if at least one aspheric surface is included in the first group, spherical aberration, coma or other aberrations can then be well corrected.

Preferably for the second zoom optical system, the second group should comprise at least one positive lens.

The advantage of, and the requirement for, the above arrangement is now explained. At the wide-angle end of the zoom optical system of positive-negative group construction, light rays gain height at the second group. Therefore, if at least one positive lens is included in the second group, fluctuations with zooming of various aberrations such as astigmatism and chromatic aberration of magnification can then be held back.

At the telephoto end, a light beam through the second group has a large diameter. Therefore, if at least one positive lens is introduced in the second group, fluctuations with zooming of spherical aberration, coma, etc. can then be held back.

Preferably for the second zoom optical system, the second group should have a negative lens nearest to its image side.

The advantage of, and the requirement for, the above arrangement is now explained. The location of the negative lens nearest to the image side of the second group provides the two following advantages: (1) the principal point position displaces toward the first group side, so that the principal point spacing between the first group and the second group can be shortened, resulting in a decrease in the total length of the lens system; and (2) the second group is so increased in terms of magnification that the amount of movement of the second group with zooming can be decreased, resulting in a decrease in the total length.

Preferably for the second zoom optical system, the second group should comprise at least one one-piece lens.

The advantage of, and the requirement for, the above arrangement is now explained. The second group, because of having a large effective diameter, grows large in terms of the necessary volume. Therefore, if the one-piece lens is used for the lens in the second group, the volume of the optical material can then be diminished, resulting in cost savings.

Also, because the volume of the one-piece lens itself becomes small, the optical system can be slimmed down. In addition, the one-piece lens is so easy to handle that the cost for the fabrication of the optical system can be cut short.

Preferably for the second zoom optical system, at least one of the one-piece lenses in the second group should be a positive lens.

The advantage of, and the requirement for, the above arrangement is now explained. If the one-piece lens is used as the positive lens, the edge thickness difference of the positive lens can then be diminished, resulting in a reduction in the whole length of the lens system.

The positive lens in the second group should also preferably be formed of a high-refractive-index, low-dispersion optical material for the purpose of holding back chromatic aberration of magnification, spherical aberration, etc. Commonly, however, the high-refractive-index, low-dispersion optical material costs much. In addition, to be more effective, the positive lens in the second group increases in the necessary volume. Therefore, it is preferable to use a one-piece lens for that positive lens, because the volume of the optical material necessary for the positive lens can be reduced and, hence, cost can be cut short.

Further, the volume of the lens itself becomes so small that the optical system can be slimmed down. Furthermore, since that one-piece lens is easy to handle, it is possible to cut short the cost for the fabrication of the zoom optical system.

Preferably for the second zoom optical system, at least one positive lens in the second group should satisfy the following condition.

$$0.1 < HH2/\phi2 < 6 \quad (3B)$$

Here, HH2 is the principal point spacing (mm) of the positive lens in the second group, and $\phi 2$ is the refracting power of the positive lens in the second group.

The advantage of, and the requirement for, the above arrangement is now explained. By increasing the power of the positive lens located in the second group, the lens system is permitted to be of the telephoto type, leading to a decrease in the whole length of the lens system. At the wide-angle end, astigmatism and chromatic aberration of magnification fluctuations with zooming are well correctable with a fewer lenses, and at the telephoto end, fluctuations with zooming of various aberrations such as spherical aberration and coma can be well corrected again with a fewer lenses. With the above arrangement that allows the lens system to be set up with a fewer lenses, size reductions and cost savings are thus achievable. Still, there is difficulty in reconciling the reduction in the whole length of the lens system with slimming down each lens, as previously detailed with reference to the first zoom optical system.

However, if that positive lens is formed as a one-piece molded lens, it is then unnecessary to form it larger than the necessary outer diameter. The satisfaction of condition (3B) enables large power to be achieved with a thin lens. In this way, further size reductions are achievable.

As the lower limit of 0.1 to condition (3B) is not reached, the power becomes too large relative to the principal point spacing. This does not only result in an increased sensitivity to decentration, but also has difficulty in keeping the optical performance intact. As the upper limit of 6 is exceeded, the power becomes small relative to the principal point spacing and, hence, with one positive lens, it is difficult to hold back fluctuations of the above aberrations. In other words, a plurality of lenses must be used for obtaining good performance.

It is more preferable to satisfy the following condition (3B-2). In this case, good performance is obtainable with a reduced number of lenses.

$$0.5 < HH2/\phi 2 < 3 \tag{3B-2}$$

It is even more preferable to satisfy the following condition (3B-3). In this case, it is easier to obtain good performance with a limited number of lenses.

$$1 < HH2/\phi 2 < 1.5 \tag{3B-3}$$

Preferably for the second zoom optical system, at least one one-piece lens in the second group should have at least one aspheric surface.

The advantage of, and the requirement for, the above arrangement is now explained. At the second group, light rays gain height. Therefore, if at least one aspheric surface is introduced into the second group, it is then possible to make effective correction for off-axis aberrations like astigmatism and coma.

(3) Reference is now made to the type wherein the first group is a negative lens group, the second group is a positive lens group and the third group is a positive lens group.

The third zoom optical system of the invention comprises, in order from its object side, a first group having negative refracting power, a second group having positive refracting power and a third group having positive refracting power, wherein at least one lens is formed by molding of a first lens blank that provides a surface including at least an optical function surface after molding and a second lens blank that provides a surface other than the surface including at least an optical function surface after molding. In other words, at least one lens comprises a one-piece lens wherein the first lens blank and the second lens blank are integrated together.

The advantage of, and the requirement for, the above arrangement is now explained. A zoom optical system comprising, in order from its object side, a lens group of negative refracting power, a lens group of positive refracting power and a lens group of positive refracting power, can be set up with a limited or reduced number of lenses, and so is best suited for size reductions and cost savings. With the one-piece lens, further size reductions are achievable. This is because for the one-piece lens any peripheral thickness for rounding is not required, when compared with the prior art lens processing, as previously described in conjunction with the first zoom optical system.

Such a one-piece lens is also so easy to handle that the cost for the fabrication of the zoom optical system can be cut short.

Here, with the third zoom optical system, zooming from its wide-angle end to its telephoto end, for instance, is at least carried out as described just below. The first group moves in a concave locus toward the object side, and the second group moves toward the object side. During zooming, the third group could move, too.

Preferably for the third zoom optical system, the one-piece lens should be cemented to other lens.

Preferably for the third zoom optical system, the one-piece lens should be an aspheric one-piece lens wherein at least one optical function surface is an aspheric surface.

Preferably for the third zoom optical system, the first group should comprise at least one positive lens.

Preferably for the third zoom optical system, the first group should have a negative lens located nearest to its object side.

Preferably for the third zoom optical system, the first group should comprise at least one one-piece lens.

Preferably for the third zoom optical system, at least one of the one-piece lenses should have positive refracting power.

The advantages of, and the requirements for, the above arrangements are the same as in the first zoom optical system.

Preferably for the third zoom optical system, at least one positive lens in the first group should satisfy the following condition.

$$0.1 < HH1/\phi 1 < 15 \tag{2C}$$

Here, HH1 is the principal point spacing (mm) of the positive lens in the first group, and $\phi 1$ is the refracting power of the positive lens in the first lens group.

The advantage of, and the requirement for, the above arrangement is the same as already detailed in conjunction with the first zoom optical system.

As the lower limit of 0.1 to condition (2C) is not reached, the power becomes too large relative to the principal point spacing. This does not only result in an increased sensitivity to decentration, but also has difficulty in keeping the optical performance intact. As the upper limit of 15 is exceeded, the power becomes small relative to the principal point spacing. For this reason, chromatic aberration of magnification or other aberrations produced at the negative lens in the first group remain undercorrected. Otherwise, a lot more lenses must be used for correction of chromatic aberration of magnification or the like.

It is more preferable to satisfy the following condition (2C-2). In this case, the optical system can be more slimmed down at the same low cost.

$$0.5 < HH1/\phi 1 < 7 \tag{2C-2}$$

It is even more preferable to satisfy the following condition (2C-3). In this case, the optical system can be much more slimmed down at the same low cost.

$$1 < HH1/\phi 1 < 4 \tag{2C-3}$$

Preferably for the third zoom optical system, at least one one-piece lens in the first group should be cemented to other lens.

The advantage of, and the requirement for, the above arrangement is now explained. The incorporation of such a cemented lens in the first group enables the sensitivity to decentration to be so diminished that the assembling of the optical system can be facilitated, leading to cost savings.

Preferably for the third zoom optical system, at least one one-piece lens in the first group should has at least one aspheric surface.

Preferably for the third zoom optical system, the second group should comprise at least one negative lens.

Preferably for the third zoom optical system, the second group should have a positive lens located nearest to its object side.

Preferably for the third zoom optical system, the second group should have a negative lens located nearest to its image side.

Preferably for the third zoom optical system, the second group should comprise at least one one-piece lens, wherein at least one of the one-piece lenses has positive refracting power.

The advantages of, and the requirements for, the above arrangements are the same as described in conjunction with the first zoom optical system.

Preferably for the third zoom optical system, at least one positive lens in the second group should satisfy the following condition.

$$0.1 < HH2/\phi2 < 10 \quad (3C)$$

Here, HH2 is the principal point spacing (mm) of the positive lens in the second group, and $\phi2$ is the refracting power of the positive lens in the second group.

The advantage of, and the requirement for, the above arrangement is the same as described with reference to the first zoom optical system.

As the lower limit of 0.1 to condition (3C) is not reached, the power becomes too large relative to the principal point spacing. This does not only result in an increased sensitivity to decentration, but also has difficulty in keeping the optical performance intact. As the upper limit of 10 is exceeded, the power becomes small relative to the principal point spacing and, hence, the amount of movement of the second group can never be reduced, resulting in an increase in the whole length of the lens system.

It is more preferable to satisfy the following condition (3C-2). In this case, the reduction in the whole length of the lens system can be reconciled with slimming down each lens.

$$0.5 < HH2/\phi2 < 2 \quad (3C-2)$$

It is even more preferable to satisfy the following condition (3C-3). In this case, it is easier to offer a sensible compromise between the reduction in the whole length of the lens system and slimming down each lens.

$$1 < HH2/\phi2 < 1.5 \quad (3C-3)$$

Preferably for the third zoom optical system, at least one one-piece lens in the second group should has at least one aspheric surface.

The advantage of, and the requirement for, the above arrangement is now explained. A light beam incident on the first group having negative refracting power travels through it, where the diameter of the light beam is enlarged. Thus, the light beam incident on the second group has a large diameter. Therefore, if at least one aspheric surface is introduced in the second group, fluctuations with zooming of various aberrations such as spherical aberration and coma can be well corrected with a more reduced number of lenses, so that the size and cost of the optical system can be reduced.

Preferably for the third zoom optical system, the third group should comprise at least one one-piece lens.

The advantage of, and the requirement for, the above arrangement is now explained. The lens in the third group, because of having a large effective area, increases in terms of the volume of the optical material necessary for it. Therefore, if the one-piece lens is used as the lens in the third group, the volume of that optical material can then be diminished with the result of cost savings. In addition, the one-piece lens is so easy to handle that the cost for the fabrication of the zoom optical system can be cut short.

Preferably for the third zoom optical system, at least one of the one-piece lenses in the third group should be a positive lens having positive refracting power.

The advantage of, and the requirement for, the above arrangement is now explained. If the one-piece lens is used as the positive lens, the edge thickness difference of that positive lens can then be so diminished that the whole length of the lens system can be shortened. The positive lens in the third group increases in terms of the volume of the optical material necessary for it by reason of its large effective diameter. Therefore, if the one-piece lens is used as that positive lens, the volume of that optical material becomes small so that cost savings are achievable.

Preferably for the third zoom optical system, at least one positive lens in the third group should satisfy the following condition.

$$0.1 < HH3/\phi3 < 20 \quad (4C)$$

Here, HH3 is the principal point spacing (mm) of the positive lens in the third group and $\phi3$ is the refracting power of the positive lens in the third group.

The advantage of, and the requirement for, the above arrangement is now explained. Increasing the power of the positive lens in the third group means that the general power of the third group becomes strong. Increasing the power of the positive lens in the third group provides the two following advantages: (1) at the wide-angle end, the exit pupil position is spaced away from the image plane, so that it is easy to ensure telecentric capability on the image side; and (2) the whole length of the lens system can be shortened, because the range of movement of the third group along the optical axis for focusing purposes can become narrow, and the space between it and the second group remains narrow as well. Still, it is difficult to offer a sensible tradeoff between the reduction in the whole length of the lens system and slimming down each lens, as set forth with reference to the prior art lens processing regarding the first zoom optical system.

However, if that positive lens is formed as a one-piece molded lens, it is unnecessary to form it larger than the necessary outer diameter. The satisfaction of condition (4C) enables large power to be obtained with a thin lens, so that further size reductions are achievable.

As the lower limit of 0.1 to condition (4C) is not reached, the power becomes too large relative to the principal point spacing. This does not only result in an increased sensitivity to decentration, but also has difficulty in keeping the optical performance intact. As the upper limit of 20 is exceeded, the exit pupil position at the wide-angle end comes close to the image plane, because the power becomes small relative to the principal point spacing. As a result, it is impossible to ensure telecentric capability on the image side.

It is more preferable to satisfy the following condition (4C-2). In this case, the reduction in the whole length of the lens system can be well reconciled with slimming down each lens.

$$0.5 < HH3/\phi3 < 8 \tag{4C-2}$$

It is even more preferable to satisfy the following condition (4C-3). In this case, it is easier to reconcile the reduction in the whole length of the lens system with slimming down each lens.

$$1 < HH3/\phi3 < 5 \tag{4C-3}$$

Preferably for the third zoom optical system, at least one one-piece lens in the third group should has at least one aspheric surface.

The advantage of, and the requirement for, the above arrangement is now explained. Referring to the third zoom optical system, light rays at the third group gains height at the telephoto end. Therefore, if at least one aspheric surface is included in the third group, off-axis aberrations such as astigmatism, distortion and coma can then be well corrected with a more reduced number of lenses, so that the size and cost of the optical system can be reduced.

(4) Reference is made to the type wherein the first group is a negative lens group, the second group is a positive lens group, the third group is a positive lens group and the fourth group is a negative lens group.

The fourth zoom optical system of the invention comprises, in order from its object side, a first group having negative refracting power, a second group having positive refracting power, a third group having positive refracting power and a fourth group having negative refracting power, wherein at least one lens is formed by molding of a first lens blank that provides a surface including at least an optical function surface after molding and a second lens blank that provides a surface other than the surface including at least an optical function surface after molding. In other words, at least one lens comprises a one-piece lens wherein the first lens blank and the second lens blank are integrated together.

The advantage of, and the requirement for, the above arrangement is now explained. A zoom optical system comprising, in order from its object side, a lens group of negative refracting power, a lens group of positive refracting power, a lens group of positive refracting power and a lens group of negative refracting power, can be set up with a limited or reduced number of lenses, and so is best suited for size reductions and cost savings. With the one-piece lens, further size reductions are achievable. This is because for the one-piece lens any peripheral thickness for rounding is not required, when compared with the prior art lens processing, as previously described in conjunction with the first zoom optical system.

Such a one-piece lens is also so easy to handle that the fabrication cost of the zoom optical system can be cut short.

Here, with the fourth zoom optical system, zooming from its wide-angle end to its telephoto end, for instance, is at least carried out as described just below. Upon zooming, the space between the first group and the second group varies, and the space between the second group and the third group varies. It is noted that zooming could be carried out with a varying space between other lens groups and a varying space between the fourth group and an image plane, and the third group could be used as a moving lens group for focusing.

Preferably for the fourth zoom optical system, the one-piece lens should be cemented to other lens, or the one-piece lens should be an aspheric one-piece lens wherein at least one optical function surface is an aspheric surface.

Preferably for the fourth zoom optical system, the first group should comprise at least one positive lens.

Preferably for the fourth zoom optical system, the first group should have a negative lens located nearest to its object side.

Preferably for the fourth zoom optical system, the first group should comprise at least one one-piece lens.

Preferably for the fourth zoom optical system, at least one of the one-piece lenses should have positive refracting power.

The advantages of, and the requirements for, the above arrangements are the same as in the first zoom optical system.

Preferably for the fourth zoom optical system, at least one positive lens in the first group should satisfy the following condition.

$$0.1 < HH1/\phi1 < 10 \tag{2D}$$

Here, HH1 is the principal point spacing (mm) of the positive lens in the first group, and $\phi1$ is the refracting power of the positive lens in the first group.

The advantage of, and the requirement for, the above arrangement is the same as already set forth in conjunction with the first zoom optical system.

As the lower limit of 0.1 to condition (2D) is not reached, the power becomes too large relative to the principal point spacing. This does not only result in an increased sensitivity to decentration, but also has difficulty in keeping the optical performance intact. As the upper limit of 10 is exceeded, the power becomes small relative to the principal point spacing. For this reason, chromatic aberration of magnification or other aberrations produced at the negative lens in the first group remain undercorrected. Otherwise, a lot more lenses must be used for correction of chromatic aberration of magnification or the like.

It is more preferable to satisfy the following condition (2D-2). In this case, the optical system can be more slimmed down at the same low cost.

$$0.5 < HH1/\phi1 < 5 \tag{2D-2}$$

It is even more preferable to satisfy the following condition (2D-3). In this case, the optical system can be much more slimmed down at the same low cost.

$$1 < HH1/\phi1 < 2.5 \tag{2D-3}$$

Preferably for the fourth zoom optical system, at least one one-piece lens should be cemented to other lens.

The advantage of, and the requirement for, the above arrangement is the same as in the third zoom optical system.

Preferably for the fourth zoom optical system, at least one one-piece lens in the first group should comprise at least one aspheric surface.

Preferably for the fourth zoom optical system, the second group should comprise at least one negative lens.

Preferably for the fourth zoom optical system, the second group should have a positive lens located nearest to its object side.

Preferably for the fourth zoom optical system, the second group should have a negative lens located nearest to its image side.

Preferably for the fourth zoom optical system, the second group should comprise at least one one-piece lens, wherein at least one of the one-piece lenses has positive refracting power.

The advantages of, and the requirements for, the above arrangements are the same as described in conjunction with the first zoom optical system.

Preferably for the fourth zoom optical system, at least one positive lens in the second group should satisfy the following condition.

$$0.1 < HH2/\phi2 < 10 \tag{3D}$$

Here, HH2 is the principal point spacing (mm) of the positive lens in the second group, and $\phi2$ is the refracting power of the positive lens in the second group.

The advantage of, and the requirement for, the above arrangement is the same as described with reference to the first zoom optical system.

As the lower limit of 0.1 to condition (3D) is not reached, the power becomes too large relative to the principal point spacing. This does not only result in an increased sensitivity to decentration, but also has difficulty in keeping the optical performance intact. As the upper limit of 10 is exceeded, the power becomes small relative to the principal point spacing and, hence, the amount of movement of the second group can never be reduced, resulting in an increase in the whole length of the lens system.

It is more preferable to satisfy the following condition (3D-2). In this case, the reduction in the whole length of the lens system can be reconciled with slimming down each lens.

$$0.5 < HH2/\phi2 < 5 \tag{3D-2}$$

It is even more preferable to satisfy the following condition (3D-3). In this case, it is easier to offer a sensible compromise between the reduction in the whole length of the lens system and slimming down each lens.

$$1 < HH2/\phi2 < 3.5 \tag{3D-3}$$

Preferably for the fourth zoom optical system, at least one one-piece lens in the second group should comprise at least one aspheric surface.

Preferably for the fourth zoom optical system, the third group should comprise at least one one-piece lens.

Preferably for the fourth zoom optical system, at least one of the one-piece lenses in the third group should be a positive lens having positive refracting power.

The advantage of, and the requirement for, the above arrangement is the same as in the third zoom optical system.

Preferably for the fourth zoom optical system, at least one positive lens in the third group should satisfy the following condition.

$$0.1 < HH3/\phi3 < 20 \tag{4D}$$

Here, HH3 is the principal point spacing (mm) of the positive lens in the third group and $\phi3$ is the refracting power of the positive lens in the third group.

The advantage of, and the requirement for, the above arrangement is the same as in the third zoom optical system.

As the lower limit of 0.1 to condition (4D) is not reached, the power becomes too large relative to the principal point spacing. This does not only result in an increased sensitivity to decentration, but also has difficulty in keeping the optical performance intact. As the upper limit of 20 is exceeded, the exit pupil position at the wide-angle end comes close to the image plane, because the power becomes small relative to the principal point spacing. As a result, it is impossible to ensure telecentric capability on the image side.

It is more preferable to satisfy the following condition (4D-2). In this case, the reduction in the whole length of the lens system can be well reconciled with slimming down each lens.

$$0.5 < HH3/\phi3 < 9 \tag{4D-2}$$

It is even more preferable to satisfy the following condition (4D-3). In this case, it is easier to reconcile the reduction in the whole length of the lens system with slimming down each lens.

$$1 < HH3/\phi3 < 4 \tag{4D-3}$$

Preferably for the fourth zoom optical system, at least one one-piece lens in the third group should comprise at least one aspheric surface.

The advantage of, and the requirement for, the above arrangement is now explained. Referring to the fourth zoom optical system, at the wide-angle end, the diameter of a light beam through the third group is large. Therefore, if at least one aspheric surface is introduced in the third group, fluctuations with zooming of various aberrations such as spherical aberration and coma can then be well corrected with a more reduced number of lenses, resulting in size reductions and cost savings of the optical system.

Preferably for the fourth zoom optical system, a one-piece lens should be used in the fourth group (or the fourth group should comprise at least one one-piece lens).

The advantage of, and the requirement for, the above arrangement is now explained. The volume of the optical material necessary for the lens in the fourth group becomes large because of its large effective diameter. Therefore, if a one-piece lens is used as that lens in the fourth group, the volume of that optical material then becomes small, resulting in cost savings. The one-piece lens is also so easy to handle that the fabrication cost of the zoom optical system can be cut short.

Preferably for the fourth zoom optical system, at lest one one-piece lens in the fourth group should comprise at least one aspheric surface.

The advantage of, and the requirement for, the above arrangement is now explained. At the fourth group, light rays gain height. Therefore, if at least one aspheric surface is introduced in the fourth group, off-axis aberrations such as distortion and astigmatism can then be well corrected with a more reduced number of lenses, resulting in size reductions and cost savings of the optical system.

(5) Reference is made to the type wherein the first group is a negative lens group, the second group is a positive lens group, the third group is a negative lens group and the fourth group is a positive lens group.

The fifth zoom optical system of the invention comprises, in order from its object side, a first group having negative refracting power, a second group having positive refracting power, a third group having negative refracting power and a fourth group having positive refracting power, wherein at least one lens is formed by molding of a first lens blank that provides a surface including at least an optical function surface after molding and a second lens blank that provides a surface other than the surface including at least an optical function surface after molding. In other words, at least one lens comprises a one-piece lens wherein the first lens blank and the second lens blank are integrated together.

The advantage of, and the requirement for, the above arrangement is now explained. A zoom optical system comprising, in order from its object side, a lens group of negative refracting power, a lens group of positive refracting power, a lens group of negative refracting power and a lens group of positive refracting power, can be set up with a limited or reduced number of lenses, and so is best suited for size reductions and cost savings. With the one-piece lens, further size reductions are achievable. This is because for the one-piece lens any peripheral thickness for rounding is not required, when compared with the prior art lens processing, as previously described in conjunction with the first zoom optical system.

Such a one-piece lens is also so easy to handle that the fabrication cost of the zoom optical system can be cut short.

Here, with the fifth zoom optical system, zooming from its wide-angle end to its telephoto end, for instance, is carried out as described just below. Upon zooming, the second group and the third group move toward the object side in an independent fashion. It is understood that upon zooming, the first group or the first group, too, could move.

Preferably for the fifth zoom optical system, the one-piece lens should be cemented to other lens, and the one-piece lens should be an aspheric one-piece lens wherein at least one optical function surface is an aspheric surface.

Preferably for the fifth zoom optical system, the first group should comprise at least one positive lens.

Preferably for the fifth zoom optical system, the first group should have a negative lens located nearest to its object side.

Preferably for the fifth zoom optical system, the first group should comprise at least one one-piece lens.

Preferably for the fifth zoom optical system, at least one of the one-piece lenses should have positive refracting power.

The advantages of, and the requirements for, the above arrangements are the same as in the first zoom optical system.

Preferably for the fifth zoom optical system, at least one positive lens in the first group should satisfy the following condition.

$$0.1 < HH1/\phi1 < 10 \tag{2E}$$

Here, HH1 is the principal point spacing (mm) of the positive lens in the first group, and $\phi1$ is the refracting power of the positive lens in the first group.

The advantage of, and the requirement for, the above arrangement is the same as already set forth in conjunction with the first zoom optical system.

As the lower limit of 0.1 to condition (2E) is not reached, the power becomes too large relative to the principal point spacing. This does not only result in an increased sensitivity to decentration, but also has difficulty in keeping the optical performance intact. As the upper limit of 10 is exceeded, the power becomes small relative to the principal point spacing. For this reason, chromatic aberration of magnification or other aberrations produced at the negative lens in the first group remain undercorrected. Otherwise, a lot more lenses must be used for correction of chromatic aberration of magnification or the like.

It is more preferable to satisfy the following condition (2E-2). In this case, the optical system can be more slimmed down at the same low cost.

$$0.5 < HH1/\phi1 < 6 \tag{2E-2}$$

It is even more preferable to satisfy the following condition (2E-3). In this case, the optical system can be much more slimmed down at the same low cost.

$$1 < HH1/\phi1 < 4 \tag{2E-3}$$

Preferably for the fifth zoom optical system, at least one one-piece lens in the first group should be cemented to other lens.

The advantage of, and the requirement for, the above arrangement is the same as in the third zoom optical system.

Preferably for the fifth zoom optical system, at least one one-piece lens in the first group should comprise at least one aspheric surface.

The advantage of, and the requirement for, the above arrangement is the same as in the first zoom optical system.

Preferably for the fifth zoom optical system, the second group should comprise at least one negative lens.

The advantage of, and the requirement for, the above arrangement is now explained. The second group, because of having positive power, comprises at least one positive lens. Therefore, if the negative lens is introduced in the second group, fluctuations of chromatic aberration of magnification or the like with zooming can then be held back.

Preferably for the fifth zoom optical system, the second group should have a positive lens located nearest to its object side.

Preferably for the fifth zoom optical system, the second group should have a negative lens located nearest to its image side.

Preferably for the fifth zoom optical system, the second group should comprise at least one one-piece lens, wherein at least one of the one-piece lenses has positive refracting power.

The advantages of, and the requirements for, the above arrangements are the same as described in conjunction with the first zoom optical system.

Preferably for the fifth zoom optical system, at least one positive lens in the second group should satisfy the following condition.

$$0.1 < HH2/\phi2 < 6 \tag{3E}$$

Here, HH2 is the principal point spacing (mm) of the positive lens in the second group, and $\phi2$ is the refracting power of the positive lens in the second group.

The advantage of, and the requirement for, the above arrangement is the same as described with reference to the first zoom optical system.

As the lower limit of 0.1 to condition (3E) is not reached, the power becomes too large relative to the principal point spacing. This does not only result in an increased sensitivity to decentration, but also has difficulty in keeping the optical performance intact. As the upper limit of 6 is exceeded, the power becomes small relative to the principal point spacing and, hence, the amount of movement of the second group can never be reduced, resulting in an increase in the whole length of the lens system.

It is more preferable to satisfy the following condition (3E-2). In this case, the reduction in the whole length of the lens system can be reconciled with slimming down each lens.

$$0.5 < HH2/\phi2 < 3 \tag{3E-2}$$

It is even more preferable to satisfy the following condition (3E-3). In this case, it is easier to offer a sensible compromise between the reduction in the whole length of the lens system and slimming down each lens.

$$1 < HH2/\phi2 < 2 \tag{3E-3}$$

Preferably for the fifth zoom optical system, at least one one-piece lens in the second lens group should be cemented to other lens.

The advantage of, and the requirement for, the above arrangement is the same as described with reference to the first zoom optical system.

Preferably for the fifth zoom optical system, at least one one-piece lens in the second group should comprise at least one aspheric surface.

As a light beam is incident on the first group having negative refracting power, its diameter grows large. Therefore, if at least one aspheric surface is introduced in the second group, fluctuations of various aberrations can then be well corrected, resulting in the achievement of size reductions and cost savings. To decrease lens diameter, the power of each lens must be increased. As the positive power of the second group increases, however, there are significant changes in the transverse magnification and aberrations of the second group with zooming. Therefore, the second group should preferably include an aspheric surface for the purposes of making correction for aberrations produced at the second group and held back aberration fluctuations with zooming.

Preferably for the fifth zoom optical system, the third group should comprise at least one one-piece lens.

The advantage of, and the requirement for, the above arrangement is now explained. As previously stated, the one-piece lens is so easy to handle that the fabrication cost of the zoom optical system can be cut short.

Preferably for the fifth zoom optical system, the fourth group should comprise at least one one-piece lens.

The advantage of, and the requirement for, the above arrangement is the same as set forth with reference to the fourth zoom optical system.

Preferably for the fifth zoom optical system, at least one of the one-piece lenses in the fourth group should be a positive lens having positive refracting power.

The advantage of, and the requirement for, the above arrangement is now explained. If the one-piece lens is used as the positive lens, the edge thickness difference of that positive lens can then be diminished, resulting in a decrease in the whole length of the lens system.

The volume of the optical material necessary for the lens in the fourth group grows large because of its large effective diameter. Therefore, if the one-piece lens is used as the lens in the fourth group, the volume of that optical material can then be decreased, resulting in cost savings. The one-piece lens is also so easy to handle that the fabrication cost of the zoom optical system can be cut short.

Preferably for the fifth zoom optical system, at least one positive lens in the fourth group should satisfy the following condition.

$$0.1 < HH4/\phi 4 < 10 \tag{5E}$$

Here, HH4 is the principal point spacing (mm) of the positive lens in the fourth group and $\phi 4$ is the refracting power of the positive lens in the fourth group.

The advantage of, and the requirement for, the above arrangement is now explained.

The advantage of, and the requirement for, the above arrangement is now explained. Increasing the power of the positive lens in the fourth group means that the general power of the third group becomes strong, resulting in a reduction in the whole length of the lens system. Increasing the power of the positive lens in the fourth group provides the following advantage: at the wide-angle end, the exit pupil position is spaced away from the image plane, so that it is easy to ensure telecentric capability on the image side. With the prior art lens processing, it is still difficult to offer a sensible tradeoff between the reduction in the whole length of the lens system and slimming down each lens, as set forth with reference to the prior art lens processing regarding the first zoom optical system.

However, if that positive lens is formed as a one-piece molded lens, it is unnecessary to form it larger than the necessary outer diameter. The satisfaction of condition (5E) enables large power to be obtained with a thin lens, so that further size reductions are achievable.

As the lower limit of 0.1 to condition (5E) is not reached, the power becomes too large relative to the principal point spacing. This does not only result in an increased sensitivity to decentration, but also has difficulty in keeping the optical performance intact. Exceeding the upper limit of 10 is not preferable, because the power becomes small relative to the principal point spacing, and so the exit pupil position at the wide-angle end comes close to the image plane. As a result, it is impossible to ensure telecentric capability on the image side.

It is more preferable to satisfy the following condition (5E-2). In this case, the reduction in the whole length of the lens system and the achievement of telecentric capability on the image side can be well reconciled with slimming down each lens.

$$0.5 < HH4/\phi 4 < 7 \tag{5E-2}$$

It is even more preferable to satisfy the following condition (5E-3). In this case, it is easier to reconcile the reduction in the whole length of the lens system and the achievement of telecentric capability on the image side with slimming down each lens.

$$1 < HH4/\phi 4 < 5 \tag{5E-3}$$

(6) Reference is made to the type wherein the first group is a negative lens group, the second group is a positive lens group, the third group is a positive lens group and the fourth group is a positive lens group.

The sixth zoom optical system of the invention comprises, in order from its object side, a first group having negative refracting power, a second group having positive refracting power, a third group having positive refracting power and a fourth group having positive refracting power, wherein at least one lens is formed by molding of a first lens blank that provides a surface including at least an optical function surface after molding and a second lens blank that provides a surface other than the surface including at least an optical function surface after molding. In other words, at least one lens comprises a one-piece lens wherein the first lens blank and the second lens blank are integrated together.

The advantage of, and the requirement for, the above arrangement is now explained. A zoom optical system comprising, in order from its object side, a lens group of negative refracting power, a lens group of positive refracting power, a lens group of positive refracting power and a lens group of positive refracting power, can be set up with a limited or reduced number of lenses, and so is best suited for size reductions and cost savings. With the one-piece lens, further size reductions are achievable. This is because for the one-piece lens any peripheral thickness for rounding is not required, when compared with the prior art lens processing, as previously described in conjunction with the prior art lens processing regarding the first zoom optical system.

Such a one-piece lens is also so easy to handle that the fabrication cost of the zoom optical system can be cut short.

Here, with the sixth zoom optical system, zooming from its wide-angle end to its telephoto end, for instance, is at least carried out as follows. Upon zooming, the first group moves in a concave locus toward the object side, and the second lens group moves toward the object side. It is understood that upon zooming, the third group and the fourth groups could move.

Preferably for the sixth zoom optical system, the one-piece lens should be cemented to other lens.

Preferably for the sixth zoom optical system, the one-piece lens should be an aspheric one-piece lens wherein at least one optical function surface is an aspheric surface.

Preferably for the sixth zoom optical system, the first group should comprise at least one positive lens.

Preferably for the sixth zoom optical system, the first group should have a negative lens located nearest to its object side.

Preferably for the sixth zoom optical system, the first group should comprise at least one one-piece lens.

Preferably for the sixth zoom optical system, at least one of the one-piece lenses should have positive refracting power.

The advantages of, and the requirements for, the above arrangements are the same as in the first zoom optical system.

Preferably for the sixth zoom optical system, at least one positive lens in the first group should satisfy the following condition.

$$0.1 < HH1/\phi1 < 15 \qquad (2F)$$

Here, HH1 is the principal point spacing (mm) of the positive lens in the first group, and $\phi1$ is the refracting power of the positive lens in the first group.

The advantage of, and the requirement for, the above arrangement is the same as already set forth in conjunction with the first zoom optical system.

As the lower limit of 0.1 to condition (2F) is not reached, the power becomes too large relative to the principal point spacing. This does not only result in an increased sensitivity to decentration, but also has difficulty in keeping the optical performance intact. As the upper limit of 15 is exceeded, the power becomes small relative to the principal point spacing. For this reason, chromatic aberration of magnification or other aberrations produced at the negative lens in the first group remain undercorrected. Otherwise, a lot more lenses must be used for correction of chromatic aberration of magnification or the like.

It is more preferable to satisfy the following condition (2F-2). In this case, the optical system can be more slimmed down at the same low cost.

$$0.5 < HH1/\phi1 < 7 \qquad (2F-2)$$

It is even more preferable to satisfy the following condition (2F-3). In this case, the optical system can be much more slimmed down at the same low cost.

$$1 < HH1/\phi1 < 4 \qquad (2F-3)$$

Preferably for the sixth zoom optical system, at least one one-piece lens in the first group should be cemented to other lens.

The advantage of, and the requirement for, the above arrangement is the same as in the third zoom optical system.

Preferably for the sixth zoom optical system, at least one one-piece lens in the first group should have at least one aspheric surface.

The advantage of, and the requirement for, the above arrangement is now explained. Referring to the sixth zoom optical system, at the wide-angle end, the diameter of a light beam through the third group is large. Therefore, if at least one aspheric surface is introduced in the third group, fluctuations with zooming of various aberrations such as spherical aberration and coma can then be well corrected with a more reduced number of lenses, resulting in size reductions and cost savings of the optical system.

At the telephoto end, on the other hand, the diameter of a light beam through the first group grows large. Therefore, if at least one aspheric surface is introduced in the third group, fluctuations with zooming of various aberrations such as spherical aberration and coma can then be well corrected with a more reduced number of lenses, again resulting in size reductions and cost savings of the optical system.

Preferably for the sixth zoom optical system, the second group should comprise at least one negative lens.

Preferably for the sixth zoom optical system, the second group should have a positive lens located nearest to its object side.

Preferably for the sixth zoom optical system, the second group should have a negative lens located nearest to its image side.

Preferably for the fifth zoom optical system, the second group should comprise at least one one-piece lens, wherein at least one of the one-piece lenses has positive refracting power.

The advantages of, and the requirements for, the above arrangements are the same as described in conjunction with the first zoom optical system.

Preferably for the sixth zoom optical system, at least one positive lens in the second group should satisfy the following condition.

$$0.1 < HH2/\phi2 < 10 \qquad (3F)$$

Here, HH2 is the principal point spacing (mm) of the positive lens in the second group, and $\phi2$ is the refracting power of the positive lens in the second group.

The advantage of, and the requirement for, the above arrangement is the same as described with reference to the first zoom optical system.

As the lower limit of 0.1 to condition (3F) is not reached, the power becomes too large relative to the principal point spacing. This does not only result in an increased sensitivity to decentration, but also has difficulty in keeping the optical performance intact. As the upper limit of 10 is exceeded, the power becomes small relative to the principal point spacing and, hence, the amount of movement of the second group can never be reduced, resulting in an increase in the whole length of the lens system.

It is more preferable to satisfy the following condition (3F-2). In this case, the reduction in the whole length of the lens system can be reconciled with slimming down each lens.

$$0.5 < HH2/\phi2 < 2 \qquad (3F-2)$$

It is even more preferable to satisfy the following condition (3F-3). In this case, it is easier to offer a sensible compromise between the reduction in the whole length of the lens system and slimming down each lens.

$$1 < HH2/\phi2 < 1.5 \qquad (3F-3)$$

Preferably for the sixth zoom optical system, at least one one-piece lens in the second group should have at least one aspheric surface.

Preferably for the sixth zoom optical system, the third group should comprise at least one one-piece lens.

Preferably for the sixth zoom optical system, at least one of the one-piece lenses in the third group should be a positive lens having positive refracting power.

Preferably for the sixth zoom optical system, at least one positive lens in the third group should satisfy the following condition.

$$0.1 < HH3/\phi3 < 20 \qquad (4F)$$

Here, HH3 is the principal point spacing (mm) of the positive lens in the third group and $\phi3$ is the refracting power of the positive lens in the third group.

The advantage of, and the requirement for, the above arrangement is the same as set forth with reference to the third zoom optical system.

As the lower limit of 0.1 to condition (4F) is not reached, the power becomes too large relative to the principal point spacing. This does not only result in an increased sensitivity to decentration, but also has difficulty in keeping the optical performance intact. Exceeding the upper limit of 20 is not preferable, because the power becomes small relative to the principal point spacing, and so the exit pupil position at the wide-angle end comes close to the image plane. As a result, it is impossible to ensure telecentric capability on the image side.

It is more preferable to satisfy the following condition (4F-2). In this case, the reduction in the whole length of the lens system can be reconciled with slimming down each lens.

$$0.5 < HH3/\phi3 < 8 \quad (4F\text{-}2)$$

It is even more preferable to satisfy the following condition (4F-3). In this case, it is easier to reconcile the reduction in the whole length of the lens system with slimming down each lens.

$$1 < HH3/\phi3 < 5 \quad (4F\text{-}3)$$

Preferably for the sixth zoom optical system, at least one one-piece lens in the third group should have at least one aspheric surface.

Preferably for the sixth zoom optical system, the fourth group should comprise at least one one-piece lens.

The advantages of, and the requirements for, the above arrangements are the same as set fourth in conjunction with the fourth zoom optical system.

Preferable for the sixth zoom optical system, the at least one of the one-piece lenses should have positive refracting power.

The advantage of, and the requirement for, the above arrangement is the same as set forth in connection with the fifth zoom optical system.

Preferably for the sixth zoom optical system, at least one positive lens in the fourth group should satisfy the following condition.

$$0.1 < HH4/\phi4 < 20 \quad (5F)$$

Here, HH4 is the principal point spacing (mm) of the positive lens in the fourth group and $\phi3$ is the refracting power of the positive lens in the fourth group.

The advantage of, and the requirement for, the above arrangement is the same as set forth with reference to the fifth zoom optical system.

As the lower limit of 0.1 to condition (5F) is not reached, the power becomes too large relative to the principal point spacing. This does not only result in an increased sensitivity to decentration, but also has difficulty in keeping the optical performance intact. As the upper limit of 20 is exceeded, the power becomes small relative to the principal point spacing, and so the exit pupil position at the wide-angle end comes close to the image plane. As a result, it is impossible to ensure telecentric capability on the image side.

It is more preferable to satisfy the following condition (5F-2). In this case, the reduction in the whole length of the lens system and the telecentric capability on the image side can be reconciled with slimming down each lens.

$$0.5 < HH4/\phi4 < 8 \quad (5F\text{-}2)$$

It is even more preferable to satisfy the following condition (5F-3). In this case, it is easier to reconcile the reduction in the whole length of the lens system and the telecentric capability on the image side with slimming down each lens.

$$1 < HH4/\phi4 < 5 \quad (5F\text{-}3)$$

Preferably for the sixth zoom optical system, at least one one-piece lens in the third group should have at least one aspheric surface.

The advantage of, and the requirement for, the above arrangement is now explained. At the wide-angle end, the diameter of a light beam through the fourth group becomes large. Therefore, if at least one aspheric surface is included in the fourth group, fluctuations with zooming of various aberrations such as spherical aberration and coma can then be well corrected with a reduced number of lenses. This is preferable to size reductions and cost savings.

(7) Reference is made to the type wherein the first group is a positive lens group, the second group is a negative lens group, the third group is a positive lens group and the fourth group is a positive lens group.

The seventh zoom optical system of the invention comprises, in order from its object side, a first group having positive refracting power, a second group having negative refracting power, a third group having positive refracting power and a fourth group having positive refracting power, wherein in at least one lens is formed by molding of a first lens blank that provides a surface including at least an optical function surface after molding and a second lens blank that provides a surface other than the surface including at least an optical function surface after molding. In other words, at least one lens comprises a one-piece lens wherein the first lens blank and the second lens blank are integrated together.

The advantage of, and the requirement for, the above arrangement is now explained. A zoom optical system comprising, in order from its object side, a lens group of positive refracting power, a lens group of negative refracting power, a lens group of positive refracting power and a lens group of positive refracting power, can be set up with a limited or reduced number of lenses, providing an optical system of high performance and having a fixed total length, and so is best suited for size reductions and cost savings. With the one-piece lens, further size reductions are achievable. This is because for the one-piece lens any peripheral thickness for rounding is not required, when compared with the prior art lens processing, as previously described in conjunction with the prior art lens processing regarding the first zoom optical system.

Such a one-piece lens is also so easy to handle that the fabrication cost of the zoom optical system can be cut short.

Here, with the seventh zoom optical system, zooming from its wide-angle end to its telephoto end, for instance, is carried out as follows. Upon zooming, the second group moves toward the image side, and the third group and the fourth group moves toward the object side with their space becoming wide. It is understood that the first group, too, could move during zooming.

Preferably for the seventh zoom optical system, the one-piece lens should be cemented to other lens. Preferably for the seventh zoom optical system, the one-piece lens should be an aspheric one-piece lens wherein at least one optical function surface is an aspheric surface.

The advantages of, and the requirements for, the above arrangements are the same as set forth in conjunction with the first zoom optical system.

Preferably for the seventh zoom optical system, the first group should comprise at least one positive lens.

The advantage of, and the requirement for, the above arrangement is now explained. The lens in the first group, because of having a large effective diameter, grows large in terms of the necessary volume. With one-piece lens used in the first lens group, however, the volume of the optical system can be diminished. As a result, cost savings are achievable. The volume of the lens itself, too, becomes so small that the optical system can be slimmed down. The one-piece lens is also so easy to handle that the fabrication cost of the optical system can be cut short.

Preferably for the seventh zoom optical system, at least one of the one-piece lenses in the first group should have positive refracting power.

The advantage of, and the requirement for, the above arrangement is now explained. For the positive lens in the first group, it is preferable to use a high-refractive-index, high-dispersion optical material so as to make correction for chromatic aberration, spherical aberration, etc. Commonly, however, the high-refractive-index, high-dispersion optical material costs much. In addition, the positive lens in the first group, because of having a large effective diameter, grows large in terms of the necessary volume. However, it is preferable to use a one-piece lens as that positive lens, because the volume of such an optical material can be diminished, resulting in cost savings.

Also, the volume of the lens itself becomes so small that the optical system can be slimmed down. The use of a one-piece lens as the positive lens ensures that the edge thickness difference of the positive lens becomes small. Accordingly, the total length of the optical system can be shortened.

Preferably for the seventh zoom optical system, at least one positive lens in the first group should satisfy the following condition.

$$0.1 < HH1/\phi1 < 20 \tag{2G}$$

Here, HH1 is the principal point spacing (mm) of the positive lens in the first group, and $\phi1$ is the refracting power of the positive lens in the first group.

The advantage of, and the requirement for, the above arrangement is now explained. As the positive lens in the first group is weak, it incurs an increase in the total length of the lens system simultaneously with an increase the diameter of the front lens. Thus, the positive lens in the first group should preferably have large power. With the conventional lens processing, however, it is difficult to offer a sensible tradeoff between cost savings and size reductions, as detailed in conjunction with the first zoom optical system.

However, if this positive lens is formed by molding as a one-piece lens, it is then unnecessary to form it larger than the necessary outer diameter. The satisfaction of condition (2G) enables larger power to be achieved by a thin lens. Thus, cost savings and size reductions are simultaneously achievable.

As the lower limit of 0.1 to condition (2G) is not reached, the power becomes too large relative to the principal point spacing. This does not only result in an increased sensitivity to decentration, but also has difficulty in keeping the optical performance intact. As the upper limit of 20 is exceeded, the power becomes small relative to the principal point spacing. This does not only result in an increase in the total length of the lens system, but also incurs an increase in the diameter of the front lens, rendering the size reductions of the optical system difficult.

It is more preferable to satisfy the following condition (2G-2). In this case, the optical system can be more slimmed down at the same low cost.

$$0.5 < HH1/\phi1 < 10 \tag{2G-2}$$

It is even more preferable to satisfy the following condition (2G-3). In this case, the optical system can be much more slimmed down at the same low cost.

$$1 < HH1/\phi1 < 5 \tag{2G-3}$$

Preferably for the seventh zoom optical system, the second group should comprise at least one positive lens.

The advantage of, and the requirement for, the above arrangement is now explained. The second group, because of having negative power, comprises at least one negative lens. Therefore, if a positive lens is included in the second group, fluctuations with zooming of various aberrations such as spherical aberration and chromatic aberration of magnification can then be held back.

Preferable for the seventh optical system, the second group should have a positive lens located nearest to its object side.

The advantage of, and the requirement for, the above arrangement is now explained. It is possible to reduce the effective diameters of the lenses in the second group and the whole length of the lens system.

Preferably for the seventh zoom optical system, the second group should comprise at least one one-piece lens.

The advantage of, and the requirement for, the above arrangement is the same as set forth in connection with the second zoom optical system.

Preferably for the seventh zoom optical system, at least one of the one-piece lenses in the second group should have positive refracting power.

The second group, because of having negative power, comprises at least one negative lens. Therefore, if a positive lens is included in the second group, fluctuations with zooming of various aberrations such as spherical aberration and chromatic aberration of magnification can then be held back.

For the positive lens in the second group, it is preferable to use a high-refractive-index, high-dispersion optical material so as to make correction for chromatic aberration, spherical aberration, etc. Commonly, however, the high-refractive-index, high-dispersion optical material costs much. In addition, the positive lens in the second group, because of having a large effective diameter, grows large in terms of the necessary volume. Therefore, it is preferable to use a one-piece lens as that positive lens, because the volume of such an optical material can be diminished, resulting in cost savings.

Also, the volume of the lens itself becomes so small that the optical system can be slimmed down. The one-piece lens is also easy to handle that the fabrication cost of the optical system can be cut short.

Preferably for the seventh zoom optical system, at least one positive lens in the second group should satisfy the following condition.

$$0.1 < HH2/\phi2 < 15 \tag{3G}$$

Here, HH2 is the principal point spacing (mm) of the positive lens in the second group, and $\phi1$ is the refracting power of the positive lens in the second group.

The advantage of, and the requirement for, the above arrangement is now explained. To reduce the effective diameters of the lenses and the whole length of the lens system, it is preferable for the negative lens in the second group to have large power. To make good correction for fluctuations of spherical aberration, coma, etc. with zooming, therefore, it is preferable for the second group to comprise a positive lens of large power. With the prior art lens processing, however, there is difficulty in balancing cost savings against size reductions, as detailed in conjunction with the first zoom optical system.

However, if this positive lens is formed by molding as a one-piece lens, it is then unnecessary to form it larger than the necessary outer diameter. The satisfaction of condition (3G) enables larger power to be achieved by a thin lens. Thus, cost savings and size reductions are simultaneously achievable.

As the lower limit of 0.1 to condition (3G) is not reached, the power becomes too large relative to the principal point spacing. This does not only result in an increased sensitivity to decentration, but also has difficulty in keeping the optical performance intact. As the upper limit of 15 is exceeded, the power becomes small relative to the principal point spacing.

This has difficulty in holding back fluctuations with zooming of various aberrations such as spherical aberration and coma produced at the negative lens in the second group. As a result, a lot more lenses will be needed to obtain satisfactory performance.

It is more preferable to satisfy the following condition (3G-2). In this case, the reduction in the overall length of the lens system can be reconciled with slimming down each lens.

$$0.5 < HH2/\phi2 < 7 \quad (3G-2)$$

It is even more preferable to satisfy the following condition (3G-3). In this case, it is easier to reconcile the reduction in the overall length of the lens system with slimming down each lens.

$$1 < HH2/\phi2 < 4 \quad (3G-3)$$

Preferably for the sixth zoom optical system, at least one one-piece lens in the second group should be cemented to other lens.

The advantage of, and the requirement for, the above arrangement is the same as in the third zoom optical system.

Preferably for the seventh zoom optical system, at least one one-piece lens in the second group should have at least one aspheric surface.

The advantage of, and the requirement for, the above arrangement is now explained. Referring to the seventh zoom optical system, at the wide-angle end, light rays through the second group gain height. Therefore, if at least one aspheric surface is introduced in the second group, off-axis aberrations such as astigmatism, distortion, coma, etc. can then be well corrected with a more reduced number of lenses, leading to size reductions and cost savings of the optical system.

At the telephoto end, on the other hand, the diameter of a light beam through the second group grows large. Therefore, if at least one aspheric surface is introduced in the second group, spherical aberration, coma and so on can then be well corrected with a more reduced number of lenses, again resulting in size reductions and cost savings of the optical system. Again, the optical system can be slimmed down at low costs.

Preferably for the seventh zoom optical system, the third group should comprise at least one negative lens.

The advantage of, and the requirement for, the above arrangement is now explained. The third group, because of having positive power, comprises at least one positive lens. Therefore, if a negative lens is included in it, fluctuations with zooming of various aberrations such as coma, astigmatism and longitudinal chromatic aberration can then be held back.

Preferably for the seventh zoom optical system, the third group should have a positive lens located nearest to its object side.

The advantage of, and the requirement for, the above arrangement is now explained. By locating the positive lens nearest to the object side of the third group, the principal points are allowed to move toward the second group, so that the principal point spacing between the second group and the third group can be shortened, leading to a reduction in the whole length of the lens system.

Preferably for the seventh zoom optical system, the third group should comprise at least one one-piece lens, wherein at least one of the one-piece lenses has positive refracting power.

The advantage of, and the requirement for, the above arrangement is now explained. By using a one-piece lens as the positive lens, the edge thickness difference of the positive lens can be made so small that the whole length of the lens system can be shortened.

Preferably for the positive lens in the third group, it is preferable to use a high-refractive-index, low-dispersion optical material so as to hold back longitudinal chromatic aberration, spherical aberration, astigmatism, etc. Commonly, however, the high-refractive-index, low-dispersion optical material costs much. Therefore, if the positive lens is provided as a one-piece lens, then the volume of the optical material can be made small, resulting in cost savings.

The volume of the lens itself becomes so small that the optical system can be slimmed down. The one-piece lens is also easy to handle that the fabrication cost of the optical system can be cut short.

Preferably for the seventh zoom optical system, at least one positive lens in the third group should satisfy the following condition.

$$0.1 < HH3/\phi3 < 8 \quad (4G)$$

Here, HH3 is the principal point spacing (mm) of the positive lens in the third group, and $\phi3$ is the refracting power of the positive lens in the third group.

The advantage of, and the requirement for, the above arrangement is now explained. By increasing the power of the positive lens located in the third group, the distance of movement of the third group can be shortened. This also results in a decrease in the whole length of the lens system. With the conventional lens processing, however, there is much difficulty in balancing cost savings against size reductions, as detailed in connection with the first zoom optical system.

However, if the positive lens is formed as a one-piece lens, it is then unnecessary to form it larger than the necessary outer diameter. The satisfaction of condition (4G) enables large power to be achieved with a thin lens and, hence, further size reductions to be obtained.

As the lower limit of 0.1 to condition (4G) is not reached, the power becomes too large relative to the principal point spacing. This does not only result in an increased sensitivity to decentration, but also has difficulty in keeping the optical performance intact. As the upper limit of 8 is exceeded, the power becomes small relative to the principal point spacing and, hence, the amount of movement of the second group can never be reduced, resulting in an increase in the whole length of the lens system.

It is more preferable to satisfy the following condition (4G-2). In this case, the reduction in the whole length of the lens system can be reconciled with slimming down each lens.

$$0.5 < HH3/\phi3 < 5 \quad (4G-2)$$

It is even more preferable to satisfy the following condition (4G-3). In this case, it is easier to offer a sensible compromise between the reduction in the whole length of the lens system and slimming down each lens.

$$1 < HH3/\phi3 < 2.5 \quad (4G-3)$$

Preferably for the seventh zoom optical system, at least one one-piece lens in the third group should have at least one aspheric surface.

The advantage of, and the requirement for, the above arrangement is now explained. In the seventh optical system, the diameter of a light beam is enlarged by the second group having negative refracting power, and so at the wide-angle end, the diameter of a light beam through the third group becomes large. With this in mind, at least one aspheric surface is introduced in the third group. As a result, fluctuations with zooming of various aberrations such as spherical aberration and coma can be well corrected with a more reduced number of lenses. Therefore, the optical system can be slimmed down at low cost.

Preferably for the seventh zoom optical system, the fourth group should comprise at least one one-piece lens.

The advantage of, and the requirement for, the above arrangement is the same as in the fourth zoom optical system.

Preferably for the seventh zoom optical system, at least one of the one-piece lenses in the fourth group should be a positive lens having positive refracting power.

The advantage of, and the requirement for, the above arrangement is the same as in the fifth zoom optical system.

Preferably for the seventh zoom optical system, at least one positive lens in the fourth group should satisfy the following condition.

$$0.1 < HH4/\phi 4 < 10 \tag{5G}$$

Here, HH4 is the principal point spacing (mm) of the positive lens in the fourth group and φ4 is the refracting power of the positive lens in the fourth group.

The advantage of, and the requirement for, the above arrangement is the same as set forth with reference to the fifth zoom optical system.

As the lower limit of 0.1 to condition (5G) is not reached, the power becomes too large relative to the principal point spacing. This does not only result in an increased sensitivity to decentration, but also has difficulty in keeping the optical performance intact. Exceeding the upper limit of 10 is not preferable, because the power becomes small relative to the principal point spacing, and so the exit pupil position at the wide-angle end comes close to the image plane. As a result, it is impossible to ensure telecentric capability on the image side.

It is more preferable to satisfy the following condition (5G-2). In this case, the reduction in the whole length of the lens system and the telecentric capability on the image side can be reconciled with slimming down each lens.

$$0.5 < HH4/\phi 4 < 7 \tag{5G-2}$$

It is even more preferable to satisfy the following condition (5G-3). In this case, it is easier to reconcile the reduction in the whole length of the lens system and telecentric capability on the image side with slimming down each lens.

$$1 < HH4/\phi 4 < 4 \tag{5G-3}$$

Preferably for the seventh zoom optical system, at least one one-piece lens in the fourth group should have at least one aspheric surface.

The advantage of, and the requirement for, the above arrangement is now explained. At the wide-angle end, light rays through the fourth group gain height. Therefore, if at least one aspheric surface is included in the fourth group, off-axis aberrations such as distortion and astigmatism can then be well corrected with a more reduced number of lenses. As a result, the optical system can be slimmed down at low cost.

Preferably, the electronic system of the invention should comprise any one of the zoom optical systems as described above, and an electronic image pickup device located on an image side thereof.

The above zoom optical systems are each of smaller size and lower cost than ever before. Therefore, if any one of them is mounted in the form of an imaging optical system on an electronic system, the size and cost of the electronic system can then be much more reduced. It is noted that the electronic system intended herein includes digital cameras, video cameras, digital video units, personal computers, mobile computers, cellar phone, personal digital assistants, etc.

Examples under the categories of the 1$^{st}$ to 7$^{th}$ zoom optical systems (zoom lenses) are now explained with reference to the accompanying drawings. For instance, Example 1 of the first zoom optical system is designated as "Example 1-1", and Example 2 of the fifth zoom optical system as "Example 5-2". Lens section diagrams and aberration diagrams for each lens are provided. Each lens section diagram is taken along the optical axis of each zoom optical system at the wide-angle end (a), in an intermediate setting (b) and the telephoto end (c) upon focusing on an infinite object point. Throughout the drawings, G1 is the first lens group; G2 is the second lens group; G3 is the third lens group; G4 is the fourth lens group; S is an aperture stop; F is plane-parallel plate group such as a near infrared cut filter, a low-pass filter and a cover glass for the electronic image pickup device; and I is an image plane. The aberration diagrams are provided for spherical aberration, astigmatism, chromatic aberration of magnification and distortion at the wide-angle end (a), in the intermediate setting (b) and at the telephoto end (c) upon focusing on an infinite object point. In these aberration diagrams, "FIY" stands for an image height.

Figure 7A:
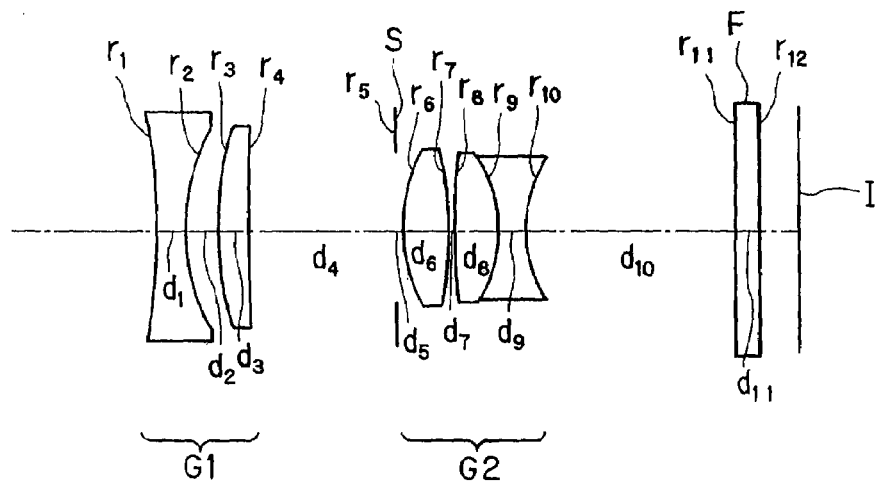
FIG. 7 is illustrative in lens section of Example 1-1 of the first zoom optical system, showing lens sections at a wide-angle end (a), in an intermediate setting (b) and at a telephoto end (c) upon focusing on an infinite object point.
Figure 7B:
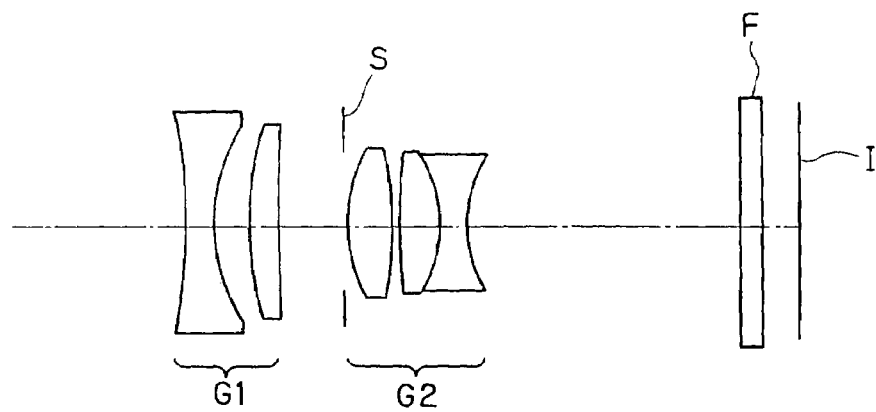
Figure 7C:
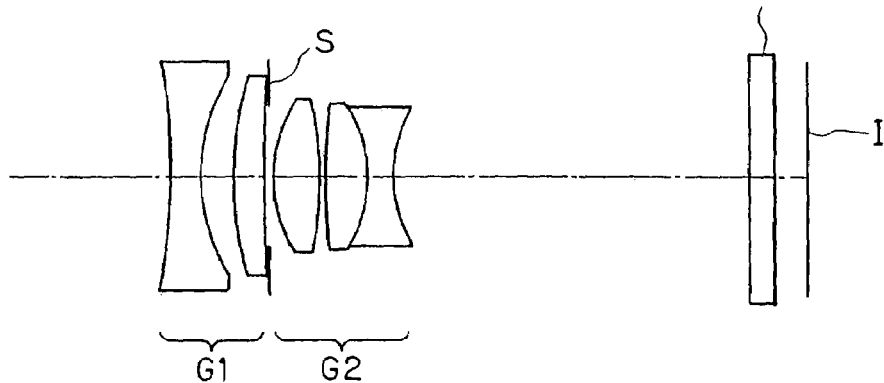
Figure 8A:
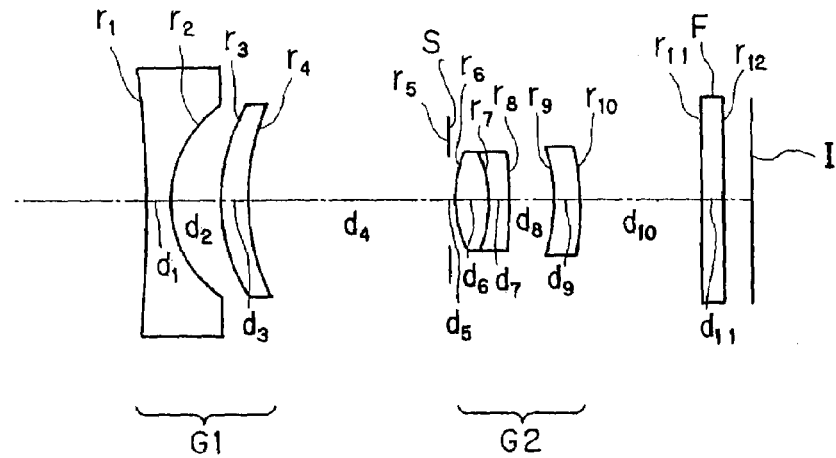
FIG. 8 is illustrative in lens section of Example 1-2 of the first zoom optical system, showing lens sections at a wide-angle end (a), in an intermediate setting (b) and at a telephoto end (c) upon focusing on an infinite object point.
Figure 8B:
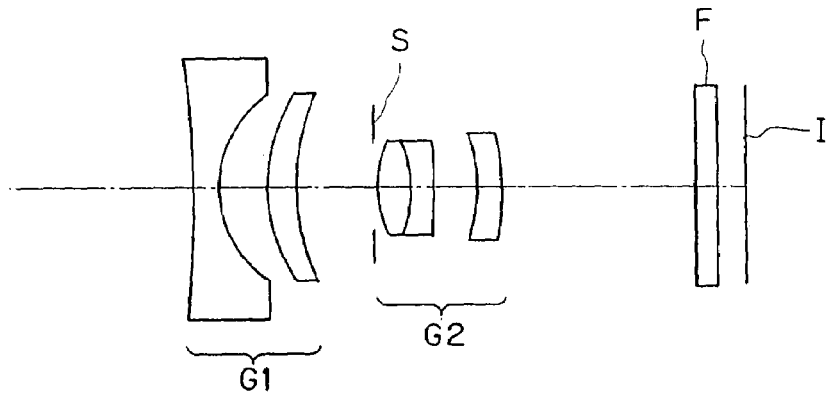
Figure 8C:
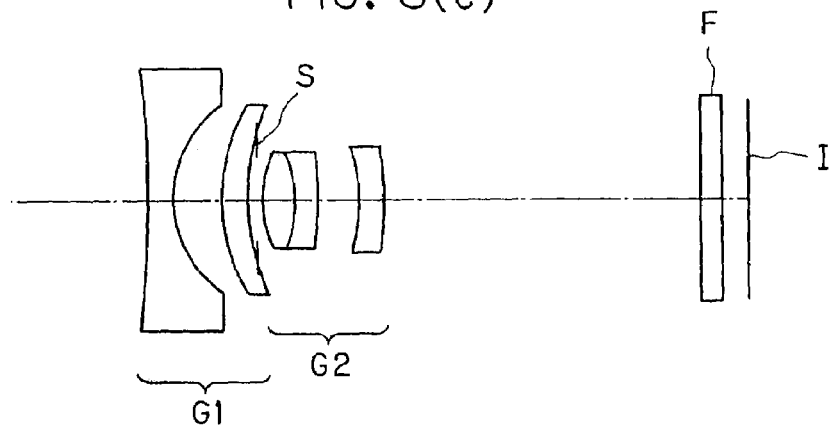
Figure 9A:
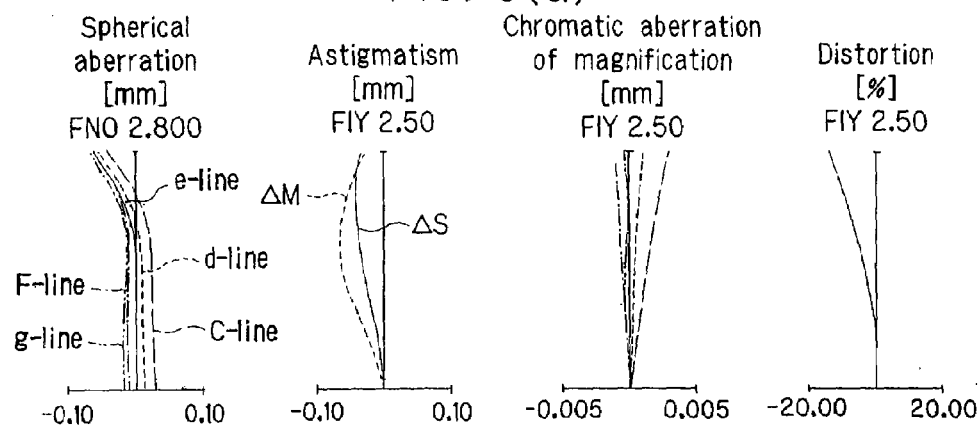
FIG. 9 is an aberration diagram for Example 1-1 of the first zoom optical system, showing aberrations at a wide-angle end (a), in an intermediate setting (b) and at a telephoto end (c) upon focusing on an infinite object point.
Figure 9B:
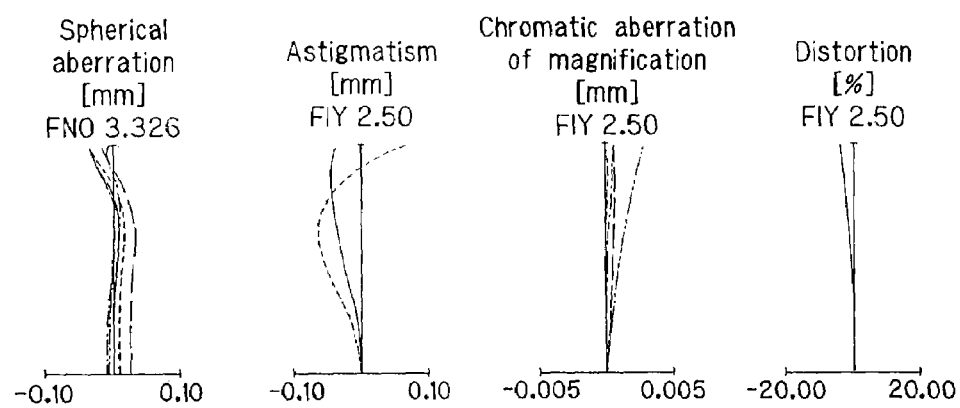
Figure 9C:
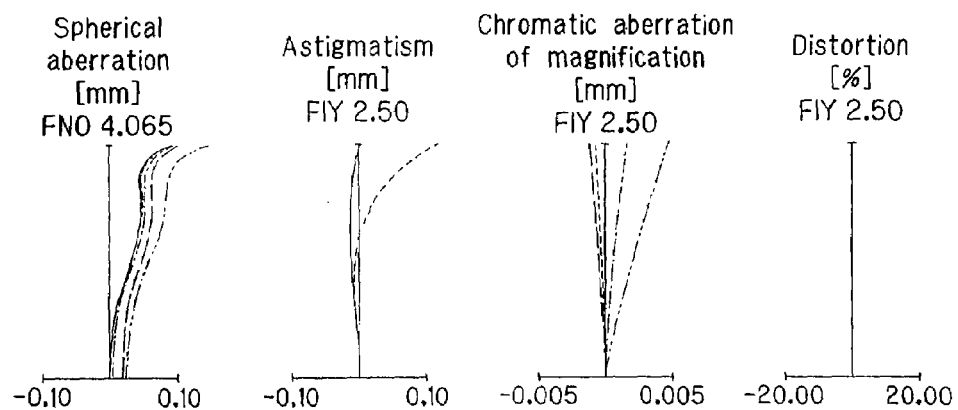
Figure 10A:
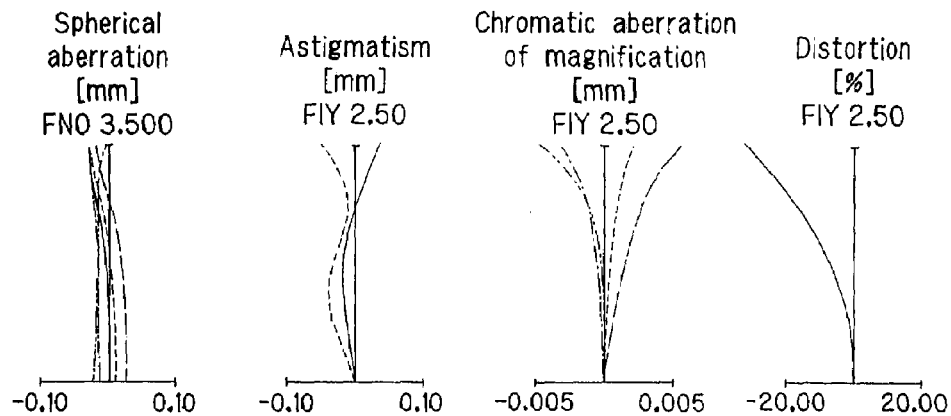
FIG. 10 is an aberration diagram for Example 1-2 of the first zoom optical system, showing aberrations at a wide-angle end (a), in an intermediate setting (b) and at a telephoto end (c) upon focusing on an infinite object point.
Figure 10B:
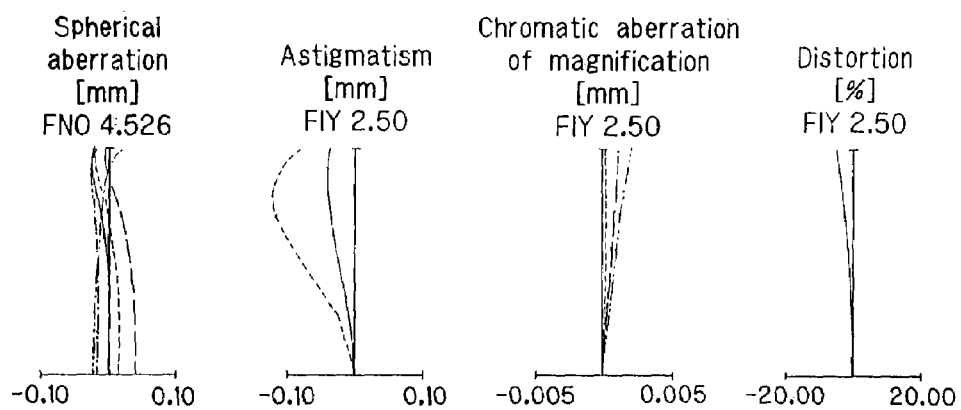
Figure 10C:
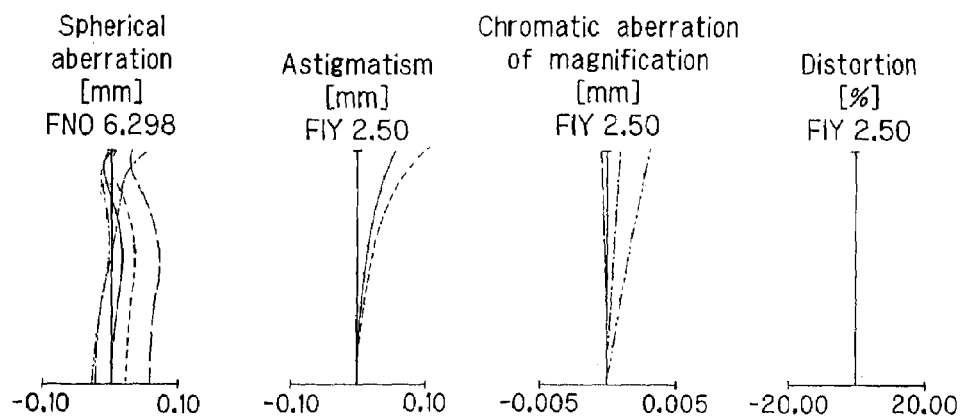

(1) Zoom Optical System Wherein the First Group is a Negative Lens Group and the Second Group is a Positive Lens Group Examples 1-1 and 1-2 of the first zoom optical system (zoom lens) are now explained with reference to the drawings. FIGS. 7 and 8 are illustrative in lens section along the optical axes of Examples 1-1 and 1-2 at the wide-angle ends (a), in intermediate settings (b) and at the telephoto ends (c), respectively, upon focusing on an infinite object point. FIGS. 9 and 10 are aberration diagrams for spherical aberration, astigmatism and chromatic aberration of magnification of Examples 1-1 and 1-2 at the wide-angle ends (a), in the intermediate settings (b) and at the telephoto ends (c), respectively, upon focusing on an infinite object point.

EXAMPLE 1-1

FIG. 7 is illustrative in section of the zoom optical system of Example 1-1, which is made up of, in order from its object side, a first lens group G1, an aperture stop S and a second lens group G2. Upon zooming from the wide-angle end to the telephoto end of the optical system, the first lens group G1 moves in a concave locus toward the object side and is located in the same position at the telephoto end as at the wide-angle end, and the second lens group G2 moves in unison with the aperture stop S toward the object side.

The first lens group G1 has generally negative power, and is composed of, in order from its object side, a double-concave negative lens and a doublet consisting of a double-convex positive lens and a double-concave negative lens. Two aspheric surfaces are used at both surfaces of the double-concave negative lens.

The second lens group G2 has generally positive power, and is composed of, in order from its object side, a double-convex positive lens and a doublet consisting of a double-convex positive lens and a double-concave negative lens. Two aspheric surfaces are applied: one at the surface nearest to the object side and another at the surface nearest to the image side of the second lens group G2.

The lenses that form the zoom optical system of this example are all one-piece lenses except the double-concave negative lens on the image side of the second lens group G2. Each one-piece lens has been fabricated by the process shown in FIG. 1.

Figure 11:
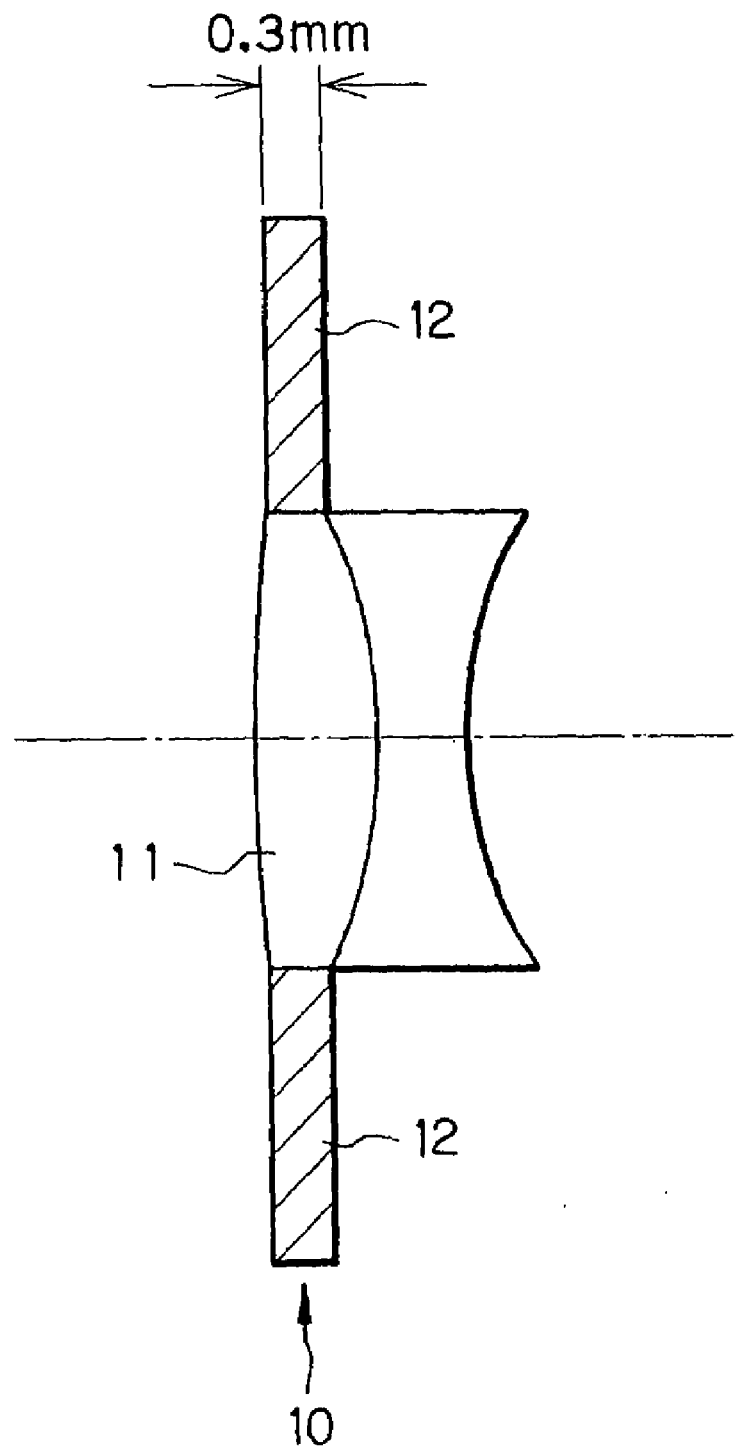
FIG. 11 is illustrative in section of one exemplary one-piece lens used in Example 1-1 of the first zoom optical system.

One exemplary one-piece lens 10 is shown in FIG. 11. This one-piece lens is used on the zoom optical system of this example. FIG. 11 is a sectional view of the doublet in the second lens group G2, wherein a double-convex positive lens on the object side is integrated with the doublet into the one-piece lens 10, and a double-concave negative lens is cemented to its image side. The second lens blank 12 has a thickness of 0.3 mm. Although not shown in FIG. 11, the second lens blank 12 could be processed simultaneously with the formation of a hole or an irregular pattern.

EXAMPLE 1-2

FIG. 8 is illustrative in section of the zoom optical system of Example 1-2, which is made up of, in order from its object side, a first lens group G1, an aperture stop S and a second lens group G2. Upon zooming from the wide-angle end to the telephoto end of the optical system, the first lens group G1 moves in a concave locus toward the object side of the optical system and is located in much the same position at the telephoto end as at the wide-angle end, and the second lens group G2 moves in unison with the aperture stop S toward the object side.

The first lens group has generally negative power, and is composed of, in order from its object side, a double-concave negative lens and a positive meniscus lens concave on its object side. One aspheric surface is applied to the object-side surface of the double-concave negative lens.

The second lens group G2 has generally positive power, and is composed of, in order from its object side, a doublet consisting of a double-convex positive lens and a negative meniscus lens convex on its object side and a negative meniscus lens convex on its image side. Two aspheric surfaces are used: one at the surface nearest to the object side and another at the surface nearest to the image side of the second lens group G2.

The lenses that form the zoom optical system of this example are all one-piece lenses except the negative meniscus lens on the object side of the second lens group G2. Each one-piece lens has been fabricated by the process shown in FIG. 3.

Figure 12:
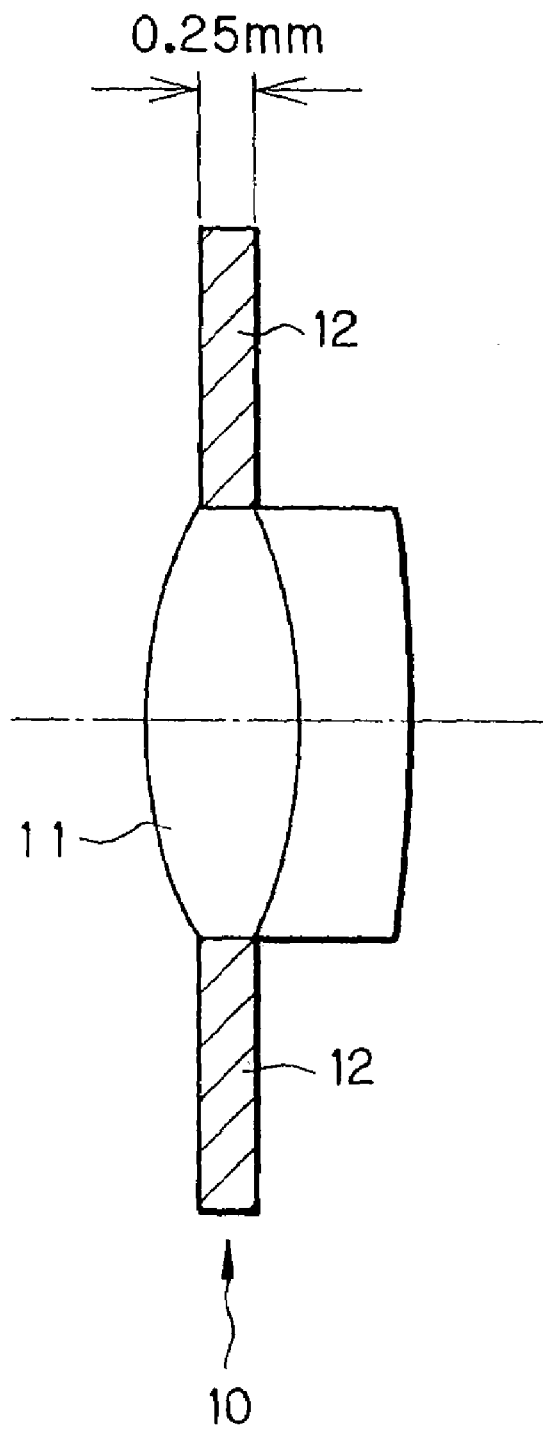
FIG. 12 is illustrative in section of one exemplary one-piece lens used in Example 1-2 of the first zoom optical system.
Figure 13:
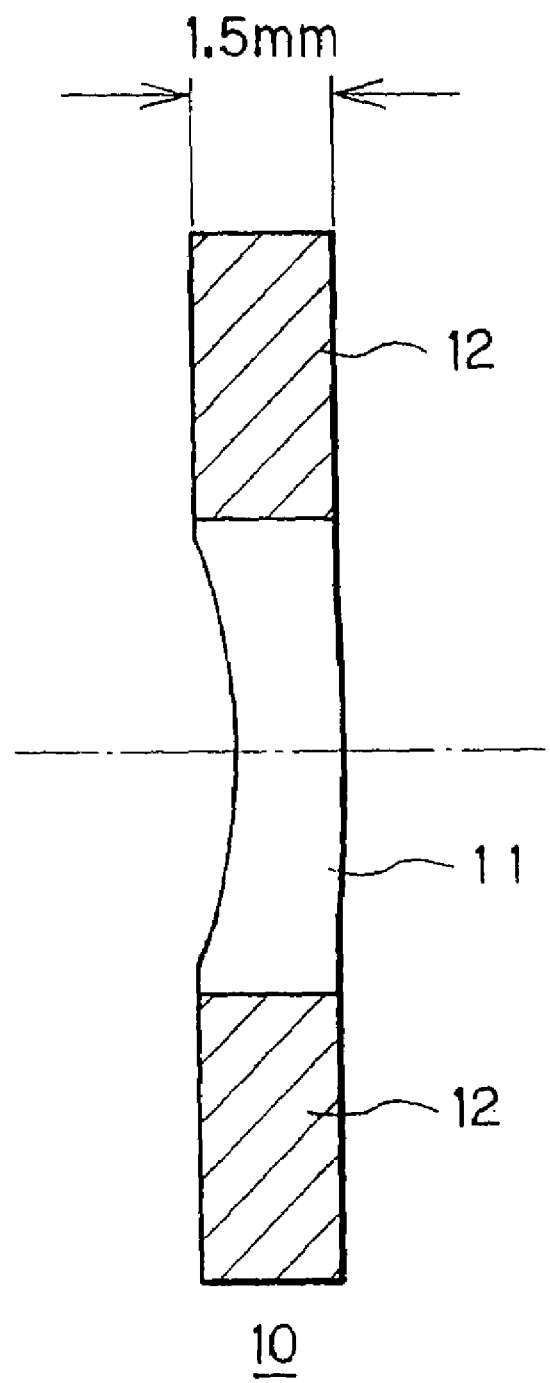
FIG. 13 is illustrative in section of another exemplary one-piece lens used in Example 1-2 of the first zoom optical system.

One exemplary one-piece lens 10 used herein is shown in FIGS. 12 and 13. FIG. 12 is illustrative in section of the doublet in the second lens group G2. In this doublet, the object-side double-convex positive lens is formed as the one-piece lens 10 with the negative meniscus lens cemented to the image side thereof. The second lens blank 12 is 0.25 mm in thickness. FIG. 13 is illustrative in section of the image-side lens in the second lens group G2. In this lens, the negative meniscus lens is formed as the one-piece lens 10. The second lens blank 12 is 1.5 mm in thickness. Although not shown in FIGS. 12 and 13, the second lens blank 12 could be processed simultaneously with the provision of a hole or an irregular pattern (see FIG. 3).

Numerical data on each of the above examples will be enumerated later.

Figure 14A:
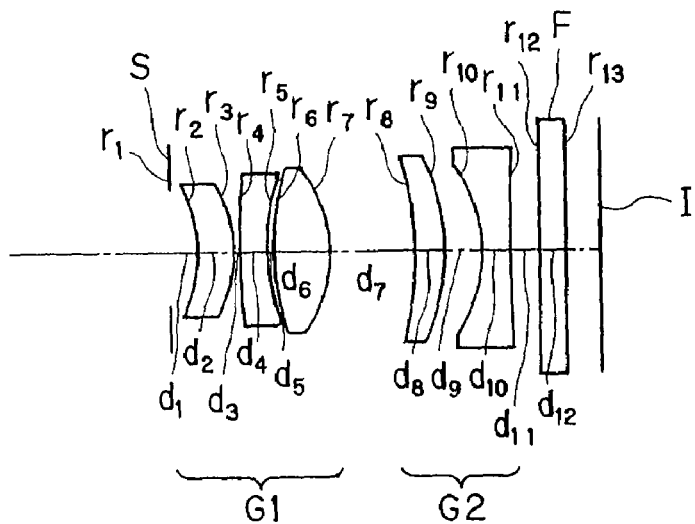
FIG. 14 is illustrative in lens section for Example 2-1 of the second zoom optical system, showing aberrations at a wide-angle end (a), in an intermediate setting (b) and at a telephoto end (c) upon focusing on an infinite object point.
Figure 14B:
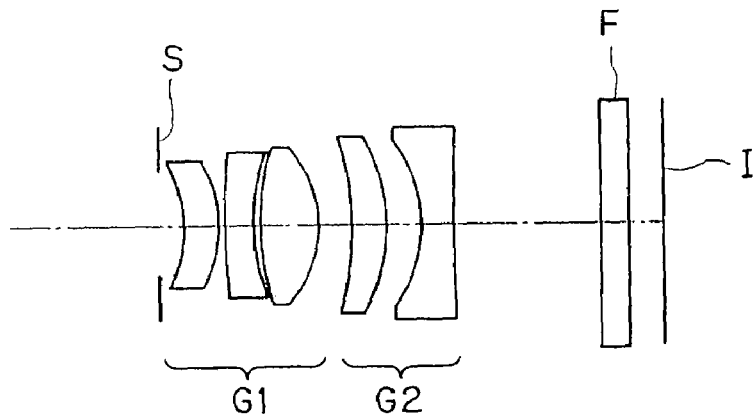
Figure 14C:
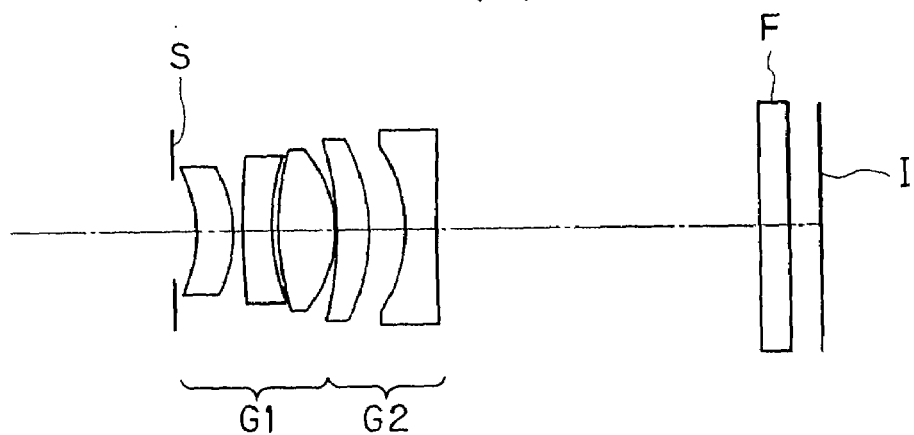
Figure 15A:
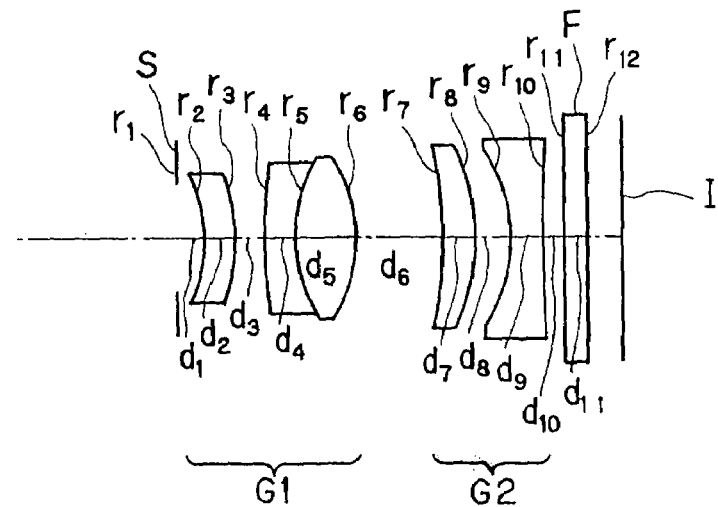
FIG. 15 is illustrative in lens section for Example 2-2 of the second zoom optical system, showing aberrations at a wide-angle end (a), in an intermediate setting (b) and at a telephoto end (c) upon focusing on an infinite object point.
Figure 15B:
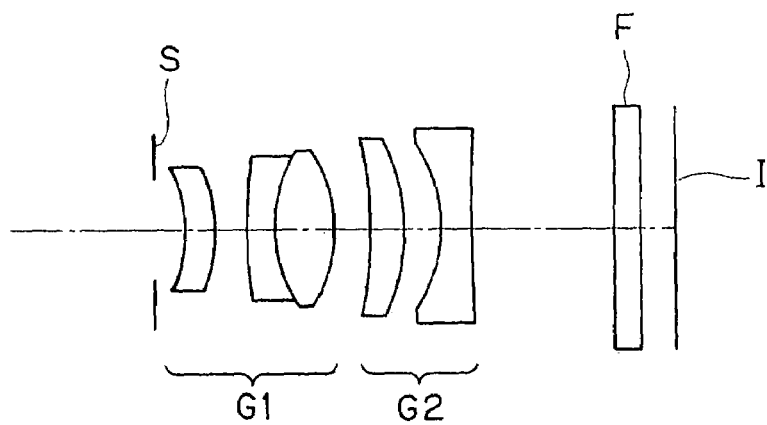
Figure 15C:
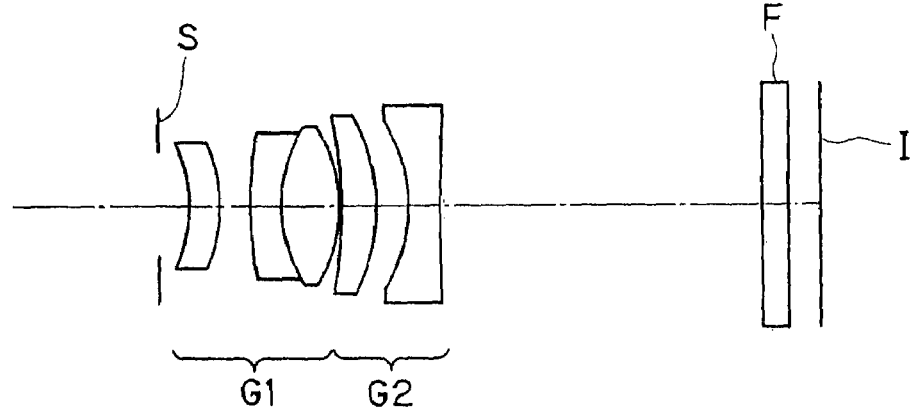
Figure 16A:
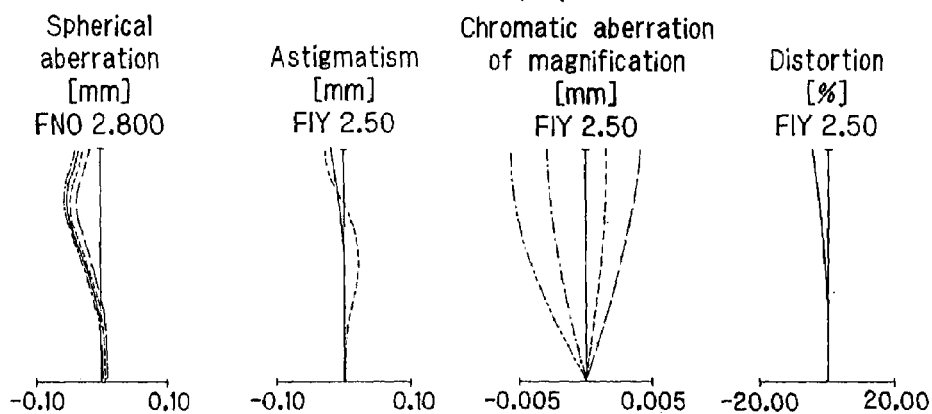
FIG. 16 is an aberration diagram for Example 2-1 of the second zoom optical system, showing aberrations at a wide-angle end (a), in an intermediate setting (b) and at a telephoto end (c) upon focusing on an infinite object point.
Figure 16B:
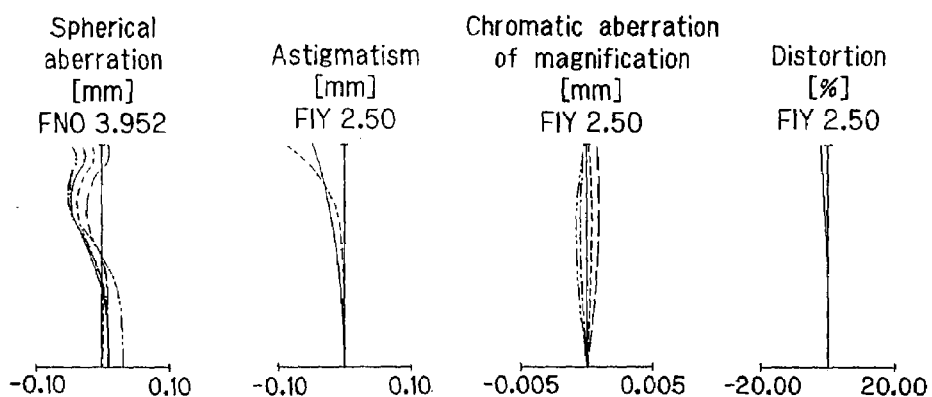
Figure 16C:
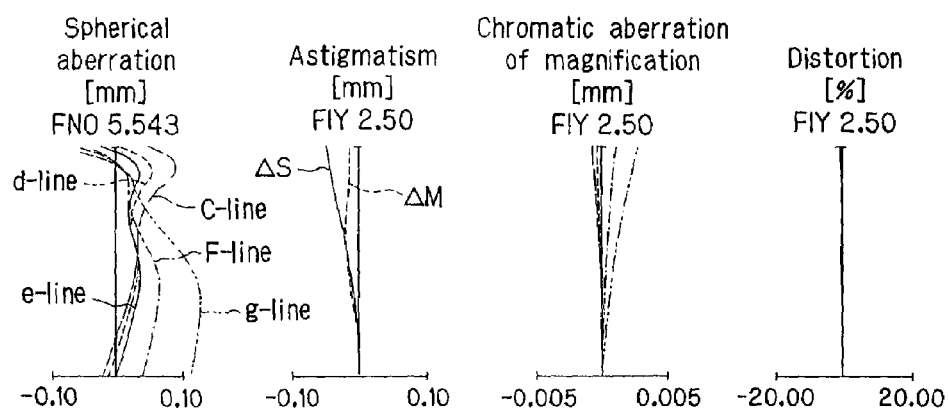
Figure 17A:
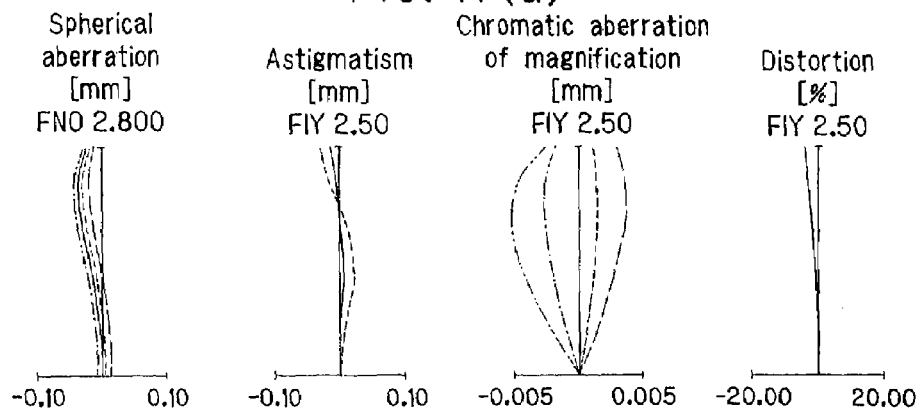
FIG. 17 is an aberration diagram for Example 2-2 of the second zoom optical system, showing aberrations at a wide-angle end (a), in an intermediate setting (b) and at a telephoto end (c) upon focusing on an infinite object point.
Figure 17B:
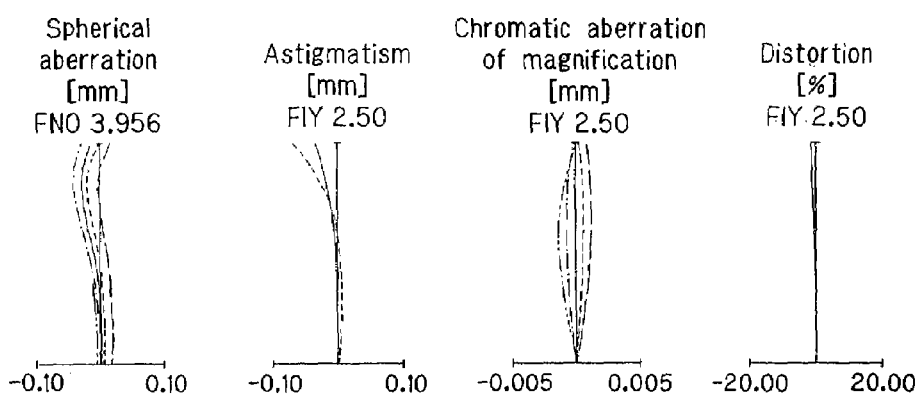
Figure 17C:
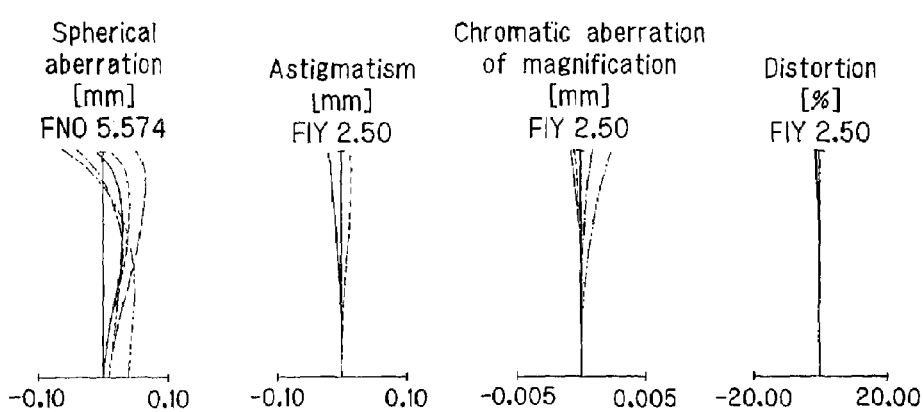
Figure 18:
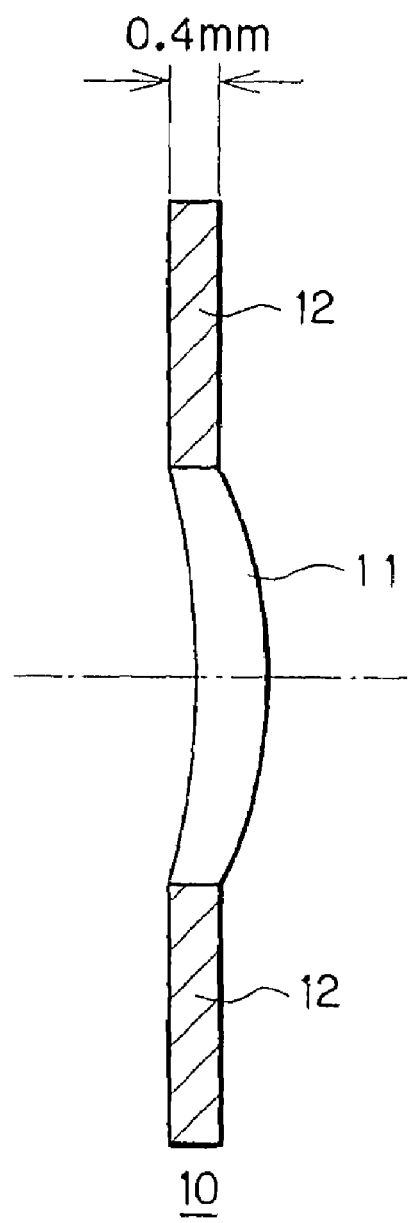
FIG. 18 is illustrative in section of one exemplary one-piece lens used in Example 2-1 of the second zoom optical system.

(2) Zoom Optical System Wherein the First Group is a Positive Lens Group and the Second Group is a Negative Lens Group Examples 2-1 and 2-2 of the second zoom optical system (zoom lens) are now explained with reference to the drawings. FIGS. 14 and 15 are illustrative in lens section along the optical axes of Examples 2-1 and 2-2 at the wide-angle ends (a), in intermediate settings (b) and at the telephoto ends (c), respectively, upon focusing on an infinite object point. FIGS. 16 and 17 are aberration diagrams for spherical aberration, astigmatism and chromatic aberration of magnification of Examples 2-1 and 2-2 at the wide-angle ends (a), in the intermediate settings (b) and at the telephoto ends (c), respectively, upon focusing on an infinite object point.

EXAMPLE 2-1

FIG. 14 is illustrative of the zoom optical system of Example 2-1, which is made up of, in order from its object side, an aperture stop S, a first lens group G1 and a second lens group G2. Upon zooming from the wide-angle end to the telephoto end of the optical system, the first lens group G1 and the aperture stop S move in unison toward the object side, and the second lens group G2 moves toward the object side with a decreasing space between it and the first lens group G1.

The first lens group G1 has generally positive power, and is composed of, in order from its object side, a positive meniscus lens concave on its object side, a negative meniscus lens convex on its object side and a double-convex positive lens. Two aspheric surfaces are applied to both surfaces of the positive meniscus lens, and one aspheric surface is applied to the image-side surface of the double-convex positive lens.

The second lens group G2 has generally negative power, and is composed of, in order from its object side, a positive meniscus lens concave on its object side and a double-concave negative lens. One aspheric surface is applied to the object-side surface of the double-concave negative lens.

The lenses that form the zoom optical system of the example are all one-piece lenses except the image-side negative meniscus lens in the first lens group G1. Each one-piece lens has been fabricated by the process shown in FIG. 3.

Figure 19:
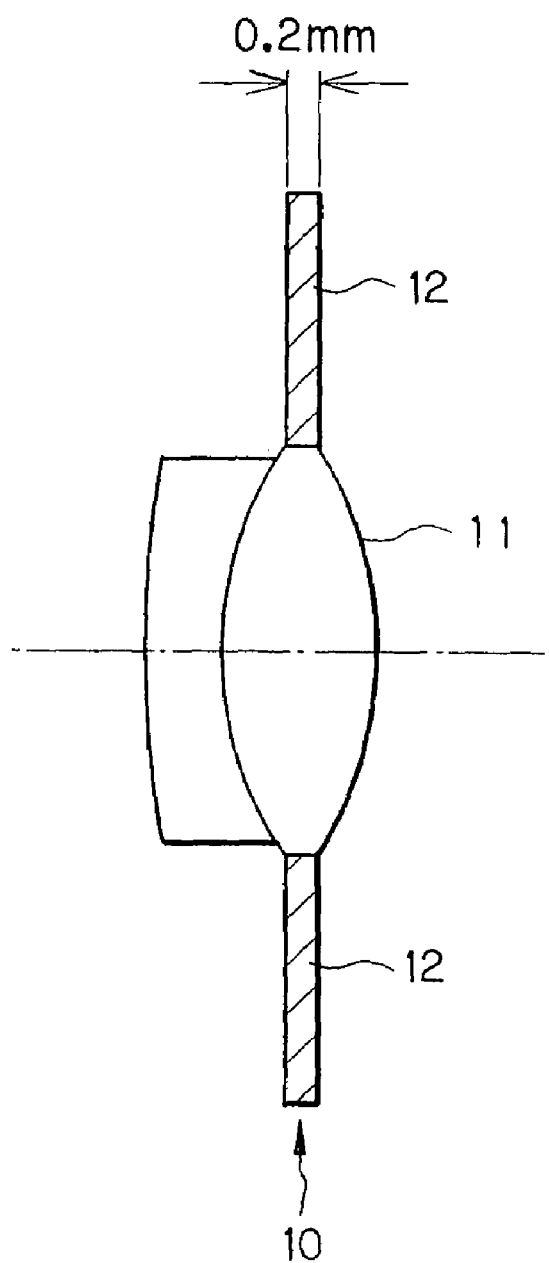
FIG. 19 is illustrative in section of one exemplary one-piece lens used in Example 2-2 of the second zoom optical system.

One exemplary one-piece lens 10 used herein is shown in FIG. 19. FIG. 19 is illustrative in section of the doublet in the first lens group G1, wherein the image-side double-convex positive lens is configured as the one-piece lens 10, with the negative meniscus lens cemented to the object side thereof. The second lens blank 12 is 0.2 mm in thickness. Although not shown in FIG. 19, the second lens blank 12 could be processed simultaneously with the provision of a hole or an irregular pattern (see FIG. 3).

Numerical data on each example will be given later.

Figure 20A:
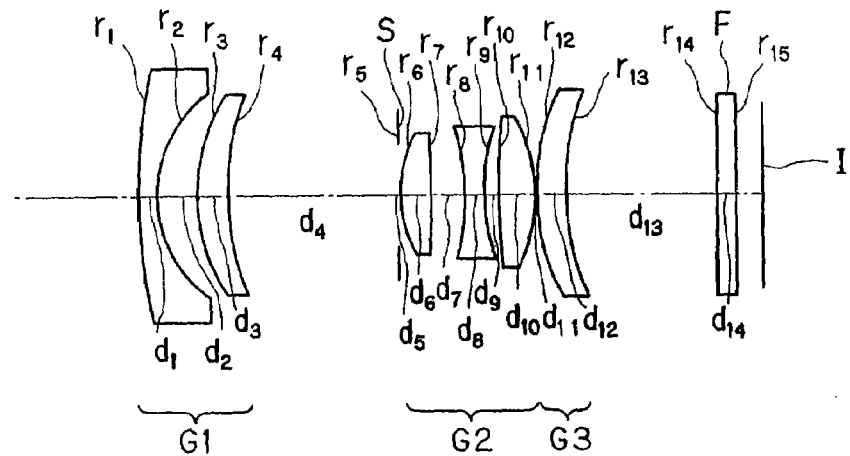
FIG. 20 is illustrative in lens section of Example 3-1 of the third zoom optical system, showing lens sections at a wide-angle end (a), in an intermediate setting (b) and at a telephoto end (c) upon focusing on an infinite object point.
Figure 20B:
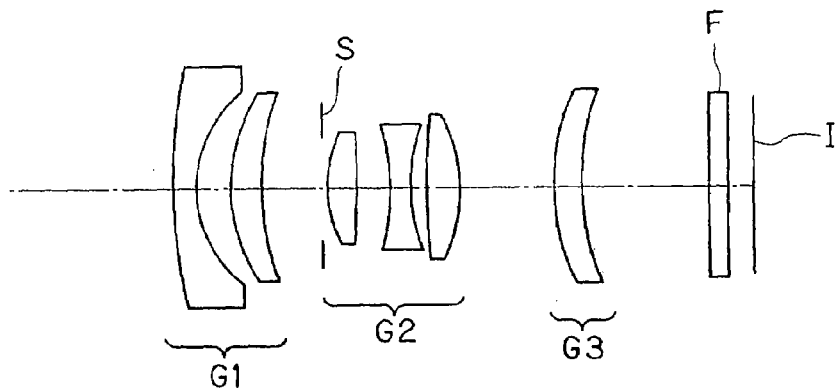
Figure 20C:
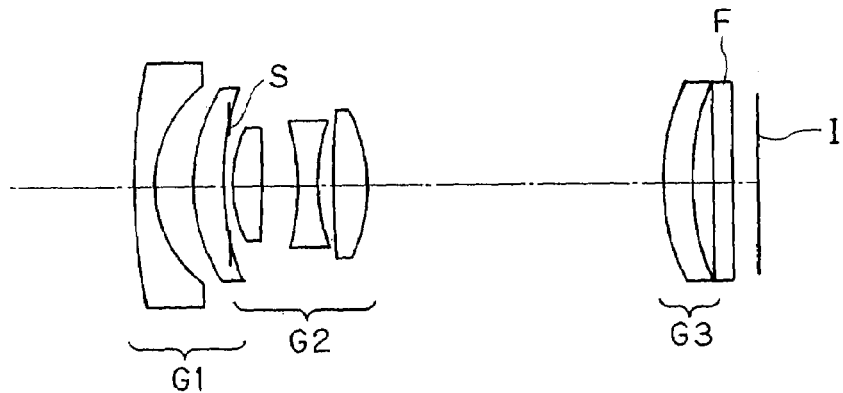
Figure 21A:
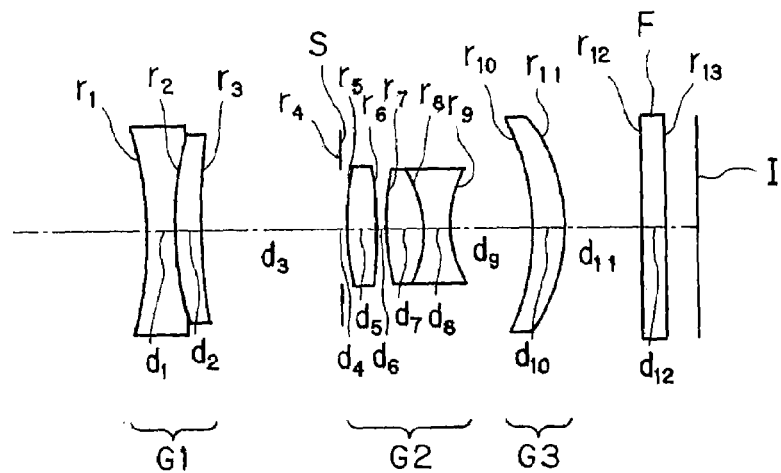
FIG. 21 is illustrative in lens section of Example 3-2 of the third zoom optical system, showing lens sections at a wide-angle end (a), in an intermediate setting (b) and at a telephoto end (c) upon focusing on an infinite object point.
Figure 21B:
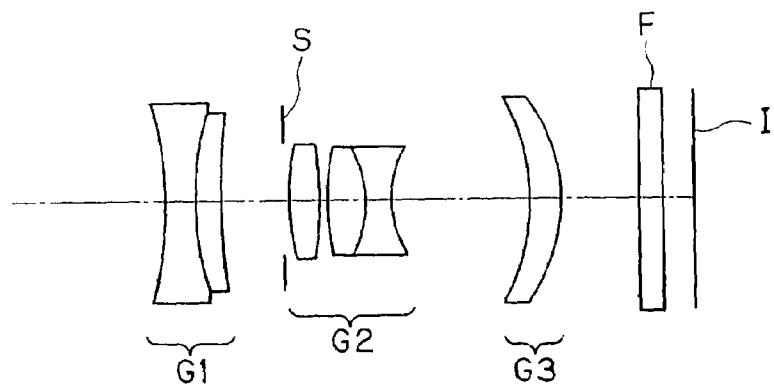
Figure 21C:
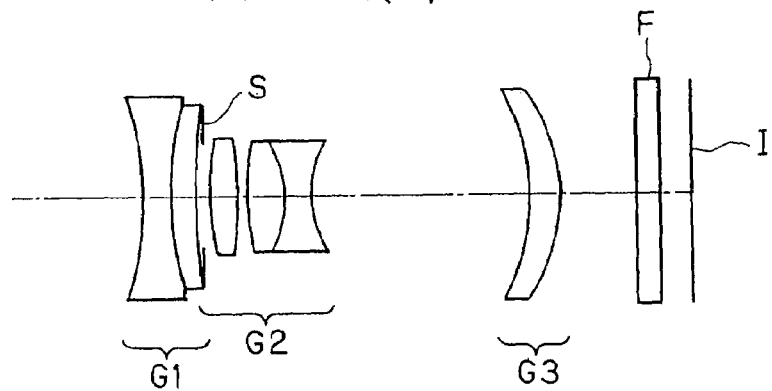
Figure 22A:
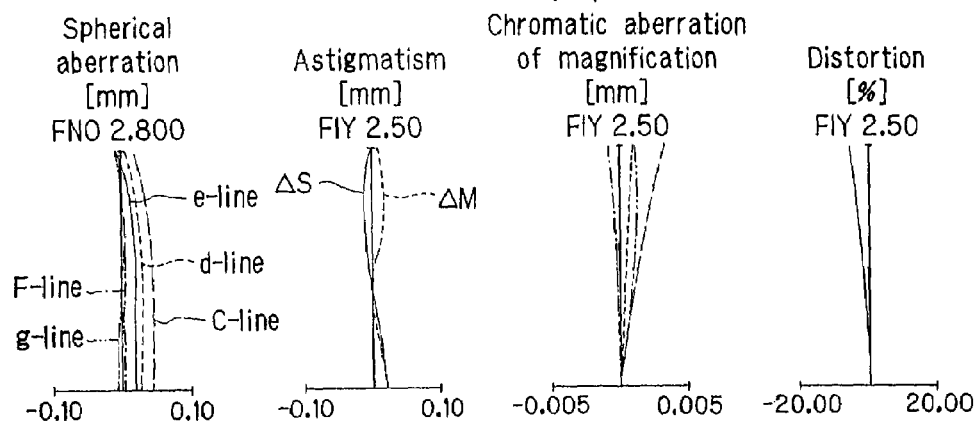
FIG. 22 is an aberration diagram for Example 3-1 of the third zoom optical system, showing aberrations at a wide-angle end (a), in an intermediate setting (b) and at a telephoto end (c) upon focusing on an infinite object point.
Figure 22B:
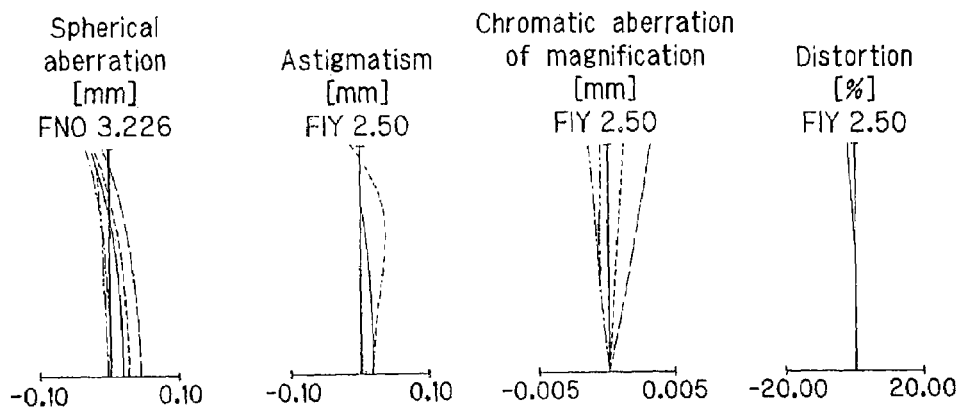
Figure 22C:
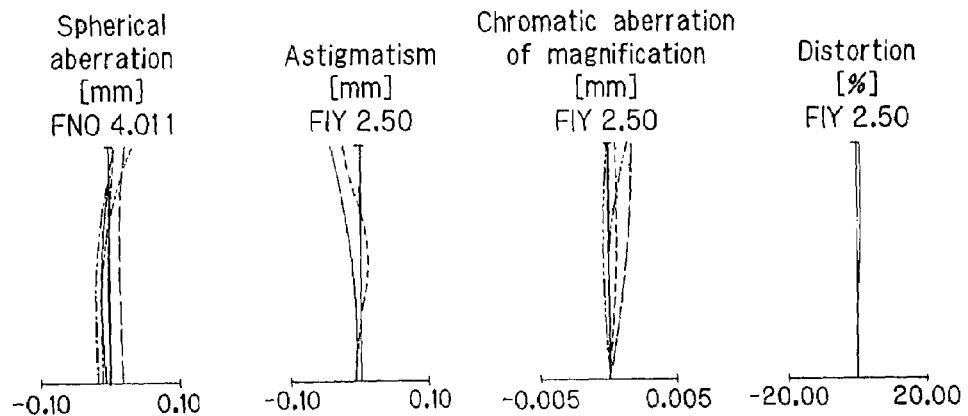
Figure 23A:
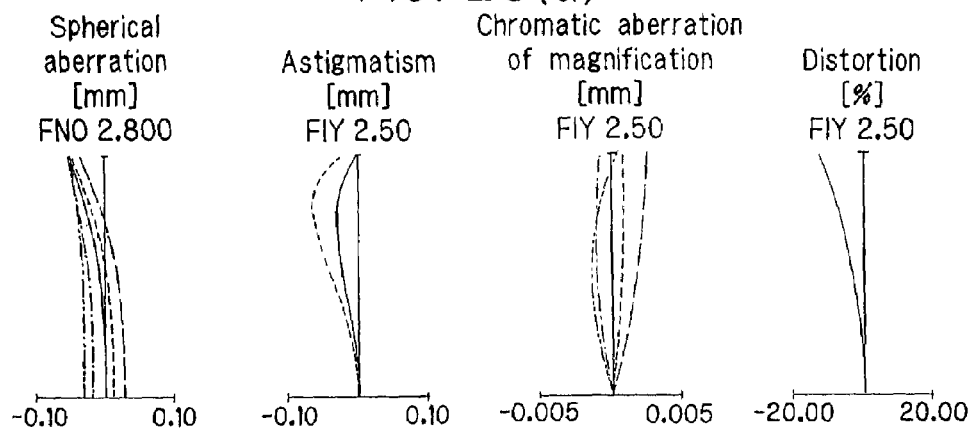
FIG. 23 is an aberration diagram for Example 3-2 of the third zoom optical system, showing aberrations at a wide-angle end (a), in an intermediate setting (b) and at a telephoto end (c) upon focusing on an infinite object point.
Figure 23B:
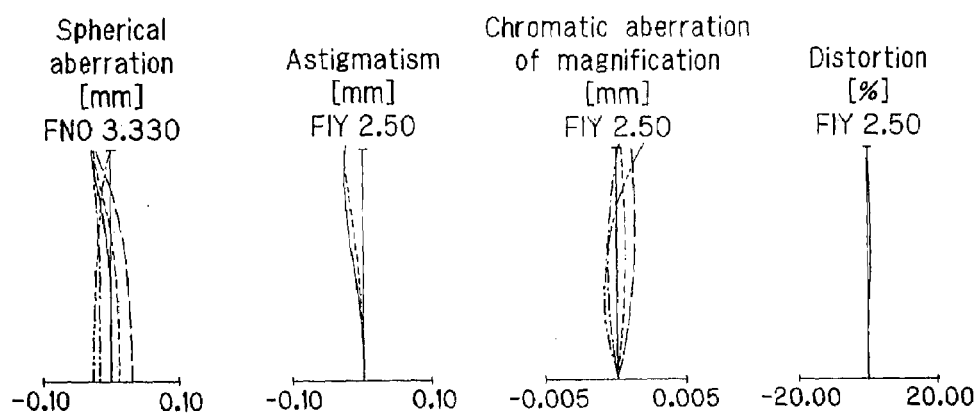
Figure 23C:
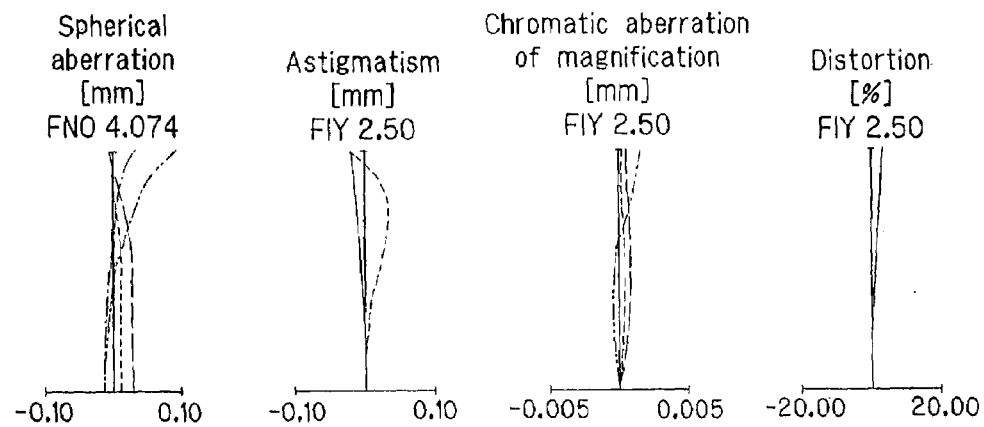

(3) Zoom Optical System Wherein the First Group is a Negative Lens Group, the Second Group is a Positive Lens Group and the Third Group is a Positive Lens Group Examples 3-1 and 3-2 of the third zoom optical system (zoom lens) are now explained with reference to the drawings. FIGS. 20 and 21 are illustrative in lens section along the optical axes of Examples 3-1 and 3-2 at the wide-angle ends (a), in intermediate settings (b) and at the telephoto ends (c), respectively, upon focusing on an infinite object point. FIGS. 20 and 21 are aberration diagrams for spherical aberration, astigmatism and chromatic aberration of magnification of Examples 3-1 and 3-2 at the wide-angle ends (a), in the intermediate settings (b) and at the telephoto ends (c), respectively, upon focusing on an infinite object point.

EXAMPLE 3-1

FIG. 20 is illustrative of the zoom optical system of Example 3-1, which is made up of, in order from its object side, a first lens group G1, an aperture stop S, a second lens group G2 and a third lens group G3. Upon zooming from the wide-angle end to the telephoto end of the optical system, the first lens group G1 moves in a concave locus toward the object side and is located in the same position at the telephoto end as at the wide-angle end, and the second lens group moves in unison with the aperture stop S toward the object side. The third lens group G3 moves toward the image side of the optical system.

The first lens group G1 has generally negative power, and is composed of, in order from its object side, a negative meniscus lens convex on its object side and a positive meniscus lens concave on its image side. One spherical surface is applied to the image-side surface of the negative meniscus lens.

The second lens group G2 has generally positive power, and is composed of, in order from its object side, a double-convex positive lens, a double-concave negative lens and a double-convex positive lens. One aspheric surface is applied to the object-side surface of the double-convex positive lens nearest to the object side.

The third lens group G3 has positive power, and is composed of a positive meniscus lens concave on its image side. One aspheric surface is applied to the object-side surface of the positive meniscus lens.

The lenses that form the zoom optical system used herein are all one-piece lenses except the object-side negative meniscus lens in the first lens group G1. Each one-piece lens has been fabricated by the process shown in FIG. 1.

Figure 24:
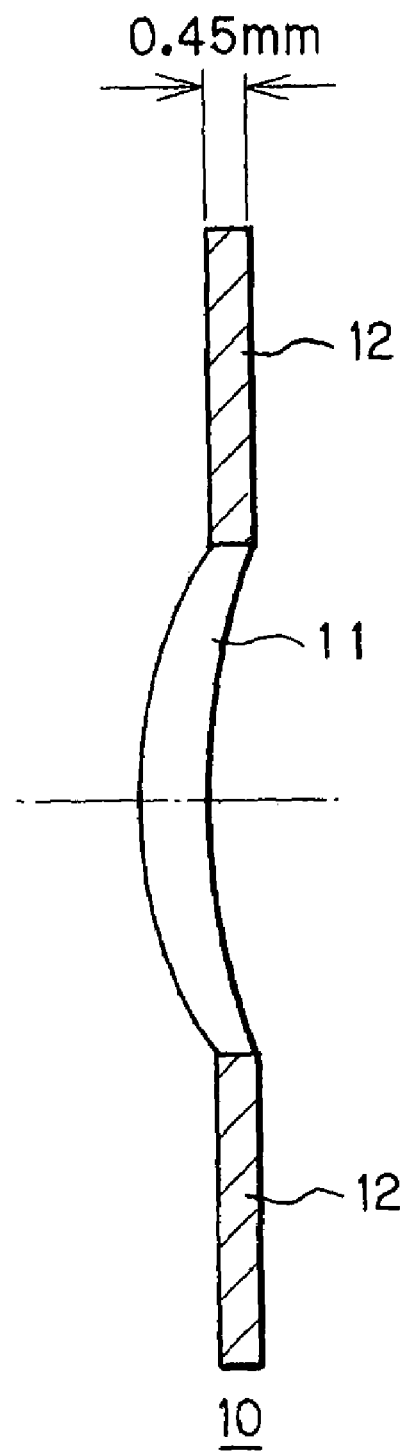
FIG. 24 is illustrative in section of one exemplary one-piece lens used in Example 3-1 of the third zoom optical system.

One exemplary one-piece lens 10 used herein is shown in FIG. 24. FIG. 24 is illustrative in section of the image-side positive meniscus lens in the first lens group G1. In this lens, the positive meniscus lens is configured as a one-piece lens. The second lens blank 12 is 0.45 mm in thickness. Although not depicted in FIG. 24, the second lens blank 12 could be processed simultaneously with the provision of a hole or an irregular pattern.

EXAMPLE 3-2

FIG. 21 is illustrative of the zoom optical system of Example 3-2, which is made up of, in order from its object side, a first lens group G1, an aperture stop S, a second lens group G2 and a third lens group G3. Upon zooming from the wide-angle end to the telephoto end of the optical system, the first lens group G1 moves in a concave locus toward the object side, and is located in much the same position at the telephoto end as at the wide-angle end, and the second lens group G2 moves in unison with the aperture stop S toward the object side. The third lens group G3 remains fixed.

The first lens group G1 has generally negative power, and is composed of a doublet consisting of a double-concave negative lens and a positive meniscus lens concave on its image side. One aspheric surface is applied to the object-side surface of the double-concave negative lens.

The second lens group G2 has generally positive power, and is composed of, in order from its object side, a double-convex positive lens and a doublet consisting of a double-convex positive lens and a double-concave negative lens. One aspheric surface is applied to the object-side surface of the double-convex positive lens nearest to the object side.

The third lens group G3 has positive power, and is composed of a positive meniscus lens concave on its object side. One aspheric surface is applied to the image-side surface of the positive meniscus lens.

The lenses that form the zoom optical system of the example are all one-piece lenses except the double-concave negative lens in the second lens group G2. Each one-piece lens has been fabricated by the process shown in FIG. 3.

Figure 25:
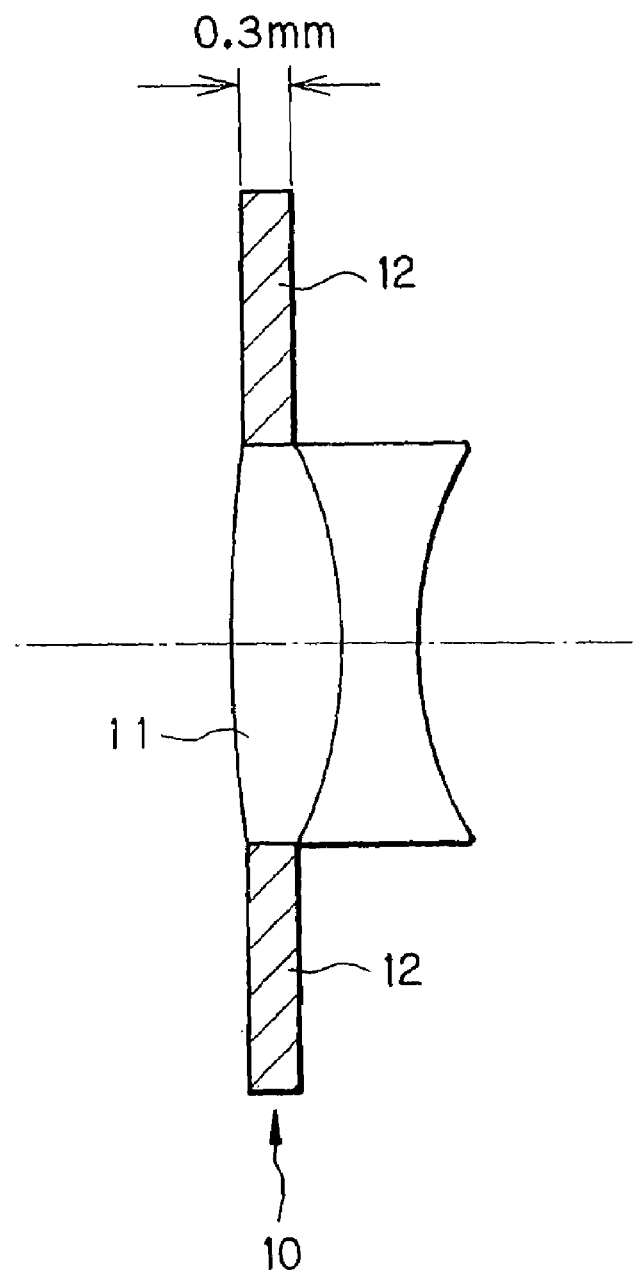
FIG. 25 is illustrative in section of one exemplary one-piece lens used in Example 3-2 of the third zoom optical system.

One exemplary one-piece lens 10 used herein is depicted in FIG. 25. FIG. 25 is illustrative in section of the doublet in the second lens group G2, wherein the object-side double-convex positive lens is configured as the one-piece lens 10, with the double-concave negative lens cemented to the image side thereof. The second lens blank 12 has a thickness of 0.3 mm. Although not shown in FIG. 25, the second lens blank 12 could be processed simultaneously with the provision of a hole or an irregular pattern (see FIG. 3).

Numerical data on each example will be set out later.

Figure 26A:
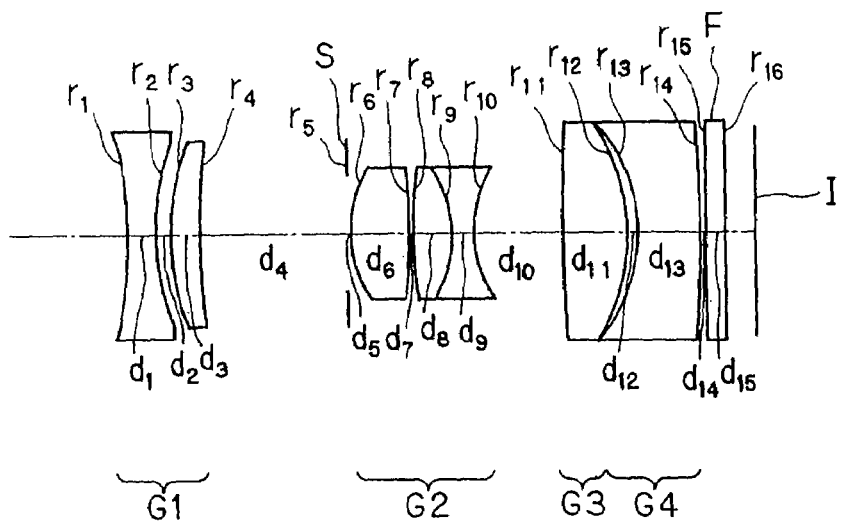
FIG. 26 is illustrative in lens section of Example 4-1 of the fourth zoom optical system, showing lens sections at a wide-angle end (a), in an intermediate setting (b) and at a telephoto end (c) upon focusing on an infinite object point.
Figure 26B:
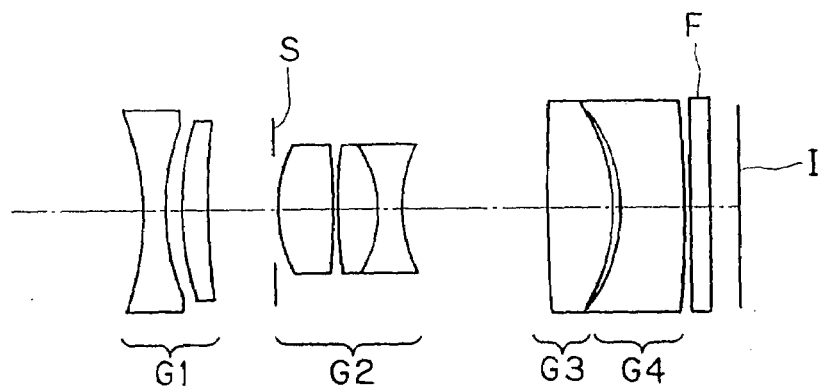
Figure 26C:
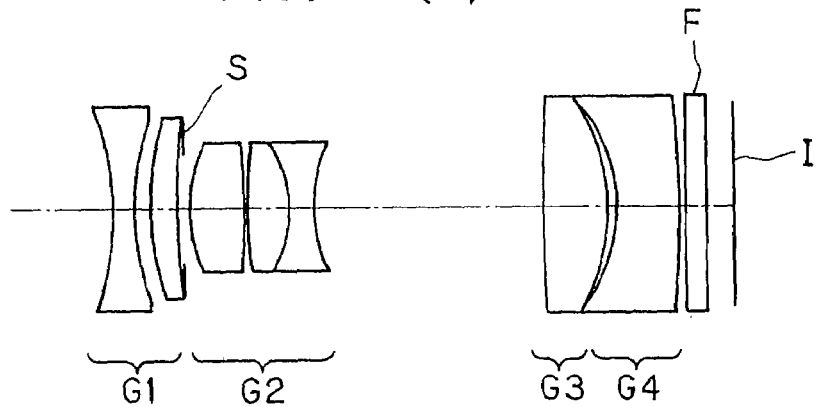
Figure 27A:
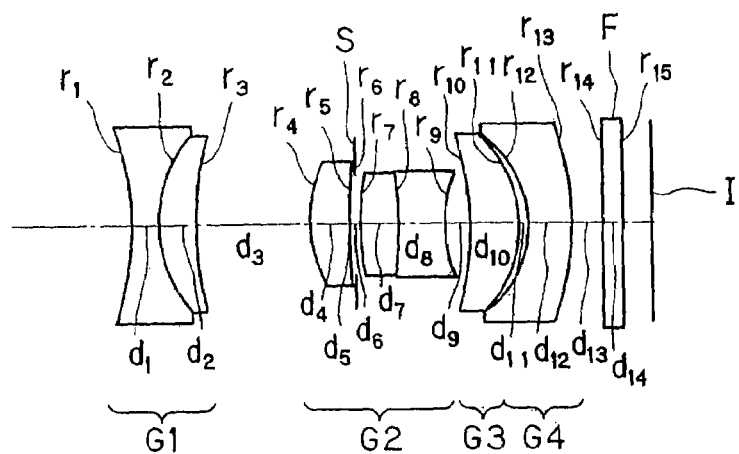
FIG. 27 is illustrative in lens section of Example 4-2 of the fourth zoom optical system, showing lens sections at a wide-angle end (a), in an intermediate setting (b) and at a telephoto end (c) upon focusing on an infinite object point.
Figure 27B:
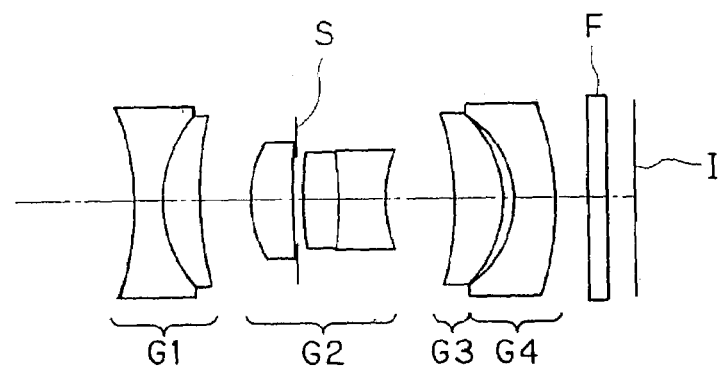
Figure 27C:
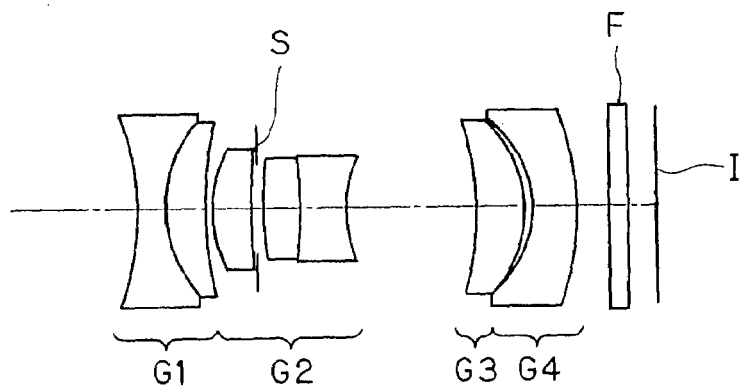
Figure 28A:
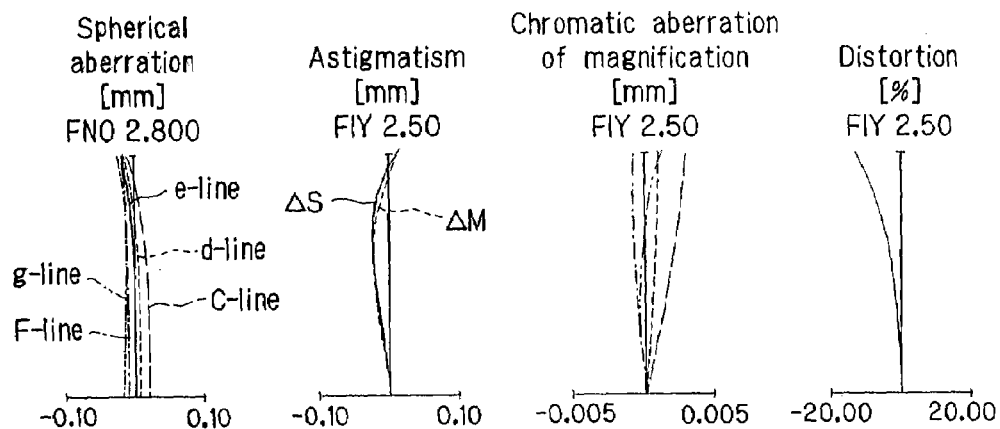
FIG. 28 is an aberration diagram for Example 4-1 of the fourth zoom optical system, showing aberrations at a wide-angle end (a), in an intermediate setting (b) and at a telephoto end (c) upon focusing on an infinite object point.
Figure 28B:
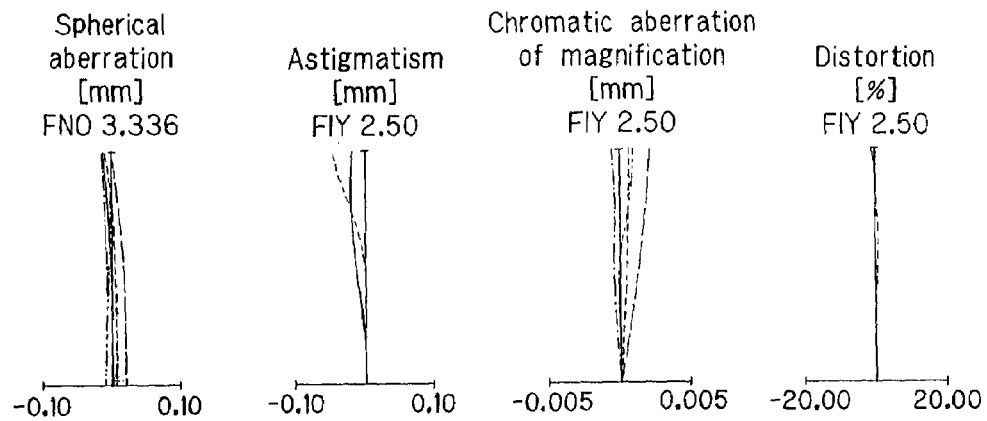
Figure 28C:
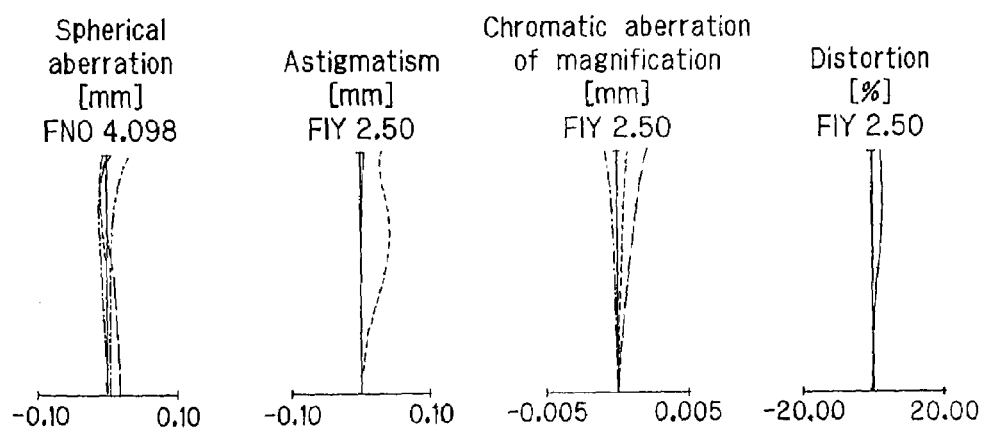
Figure 29A:
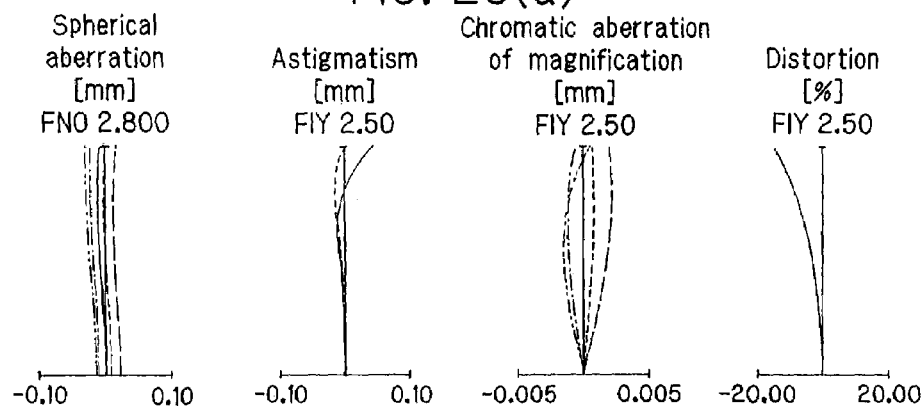
FIG. 29 is an aberration diagram for Example 4-2 of the fourth zoom optical system, showing aberrations at a wide-angle end (a), in an intermediate setting (b) and at a telephoto end (c) upon focusing on an infinite object point.
Figure 29B:
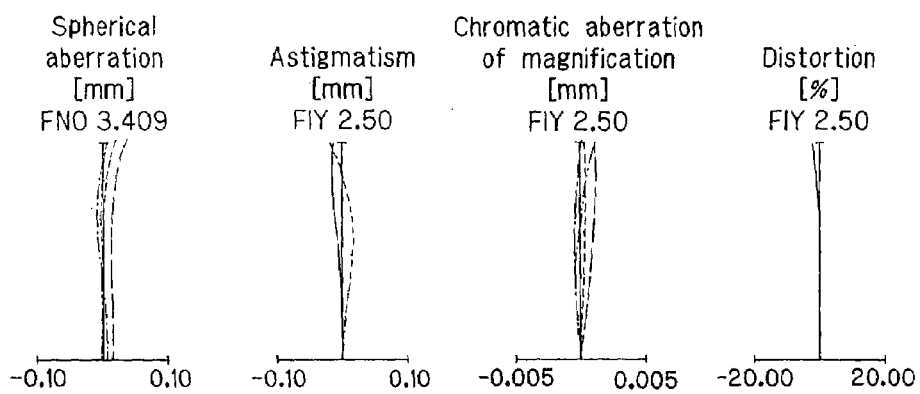
Figure 29C:
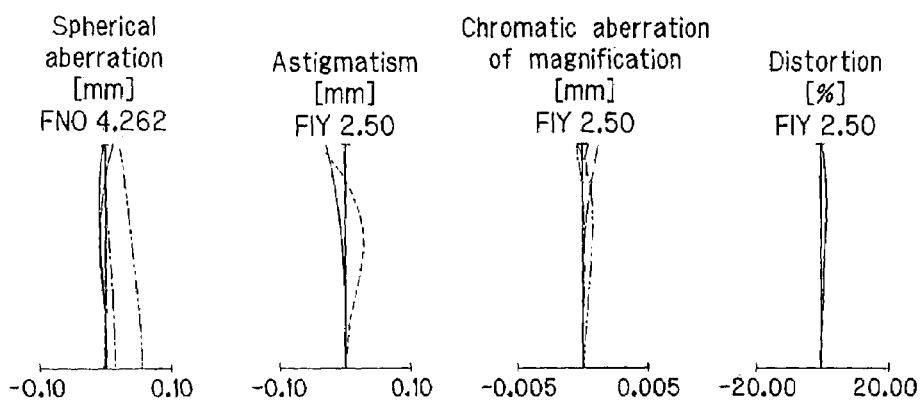

(4) Zoom Optical System Wherein the First Group is a Negative Lens Group, the Second Group is a Positive Lens Group, the Third Group is a Positive Lens Group and the Fourth Group is a Negative Lens Group Examples 4-1 and 4-2 of the fourth zoom optical system (zoom lens) are now explained with reference to the drawings. FIGS. 26 and 27 are illustrative in lens section along the optical axes of Examples 4-1 and 4-2 at the wide-angle ends (a), in intermediate settings (b) and at the telephoto ends (c), respectively, upon focusing on an infinite object point. FIGS. 28 and 29 are aberration diagrams for spherical aberration, astigmatism, chromatic aberration of magnification and distortion of Examples 4-1 and 4-2 at the wide-angle ends (a), in the intermediate settings (b) and at the telephoto ends (c), respectively, upon focusing on an infinite object point.

EXAMPLE 4-1

FIG. 26 is illustrative of the zoom optical system of Example 4-1, which is made up of, in order from its object side, a first lens group G1, an aperture stop S, a second lens group G2, a third lens group G3 and a fourth lens group G4. Upon zooming from the wide-angle end to the telephoto end of the optical system, the first lens group G1 moves in a concave locus toward the object side and is located in much the same position at the telephoto end as at the wide-angle end; the second lens group G2 moves in unison with the aperture stop S toward the object side; and the third and fourth lens groups G3 and G4 remain fixed.

The first lens group G1 has generally negative power, and is composed of, in order from its object side, a double-concave negative lens and a positive meniscus lens concave on its image side. One aspheric surface is applied to the image-side surface of the double-concave negative lens.

The second lens group G2 has generally positive power, and is composed of, in order from its object side, a double-convex positive lens and a doublet consisting of a double-convex positive lens and a double-concave negative lens. Two aspheric surfaces are used: one at the object-side surface of the double-convex positive lens that is a single lens, and another at the surface of the doublet nearest to its object side.

The third lens group G3 has positive power, and consists of a double-convex positive lens. The third lens group G3 moves in the optical axis direction upon focusing alone.

The fourth lens group G4 has negative power, and consists of a negative meniscus lens convex on its image side. One aspheric surface is applied to the image-side surface of the negative meniscus lens.

The lenses that form the zoom optical system of the example are all one-piece lenses. Each one-piece lens has been fabricated by the process shown in FIG. 1.

Figure 30:
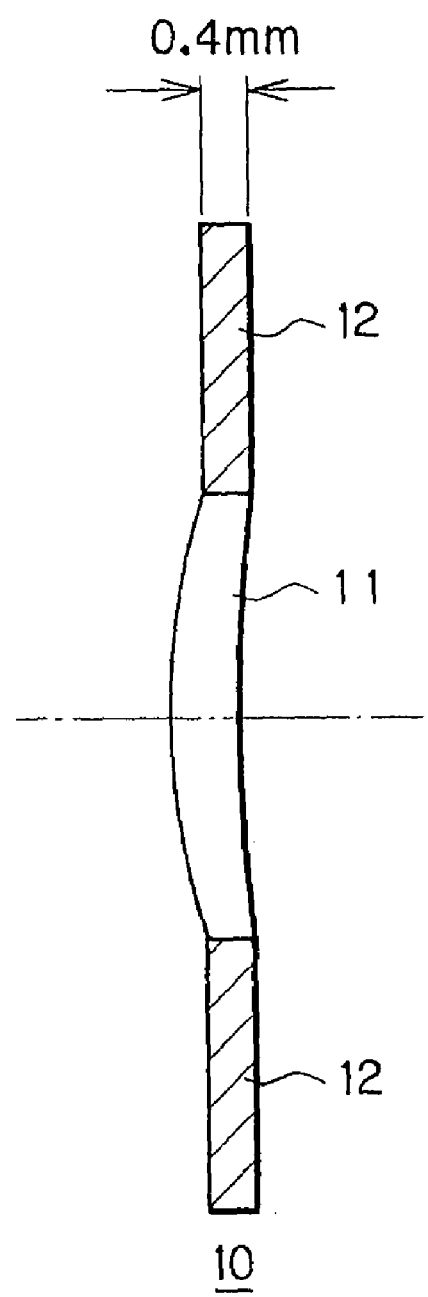
FIG. 30 is illustrative in section of one exemplary one-piece lens used in Example 4-1 of the fourth zoom optical system.

One exemplary one-piece lens 10 used herein is shown in FIG. 30. FIG. 30 is illustrative in section of the second lens as counted from the object side of the first lens group G1, wherein the positive meniscus lens is configured as the one-piece lens. The second lens blank 12 is 0.4 mm in thickness. Although not shown in FIG. 30, the second lens blank 12 could be processed simultaneously with the provision of a hole or an irregular pattern.

EXAMPLE 4-2

FIG. 27 is illustrative of the zoom optical system of the example, which is made up of, in order from its object side, a first lens group G1, a second lens group G2, a third lens group G3 and a fourth lens group G4. An aperture stop S is interposed between the first lens and the second lens in the second lens group G1 in an integration fashion with them. Upon zooming from the wide-angle end to the telephoto end of the optical system, the first lens group G1 moves in a concave locus toward the object side and is located in much the same position at the telephoto end as at the wide-angle end; the second lens group G2 moves in unison with the apertures stop S toward the object side; and the third and fourth lens groups G3 and G4 remain stationary.

The first lens group G1 has generally negative power, and is composed of a doublet consisting of a double-concave negative lens and a positive meniscus lens concave on its image side.

The second lens group G2 has generally positive power, and is composed of, in order from its object side, a positive meniscus lens concave on its image side, an aperture stop S and a doublet consisting of a double-convex positive lens and a double-concave negative lens. Three aspheric surfaces are used: one at the object-side surface of the positive meniscus lens and two at the surfaces of the doublet nearest to its object and image sides.

The third lens group G3 has positive power, and consists of a positive meniscus lens convex on its image side. The third lens group G3 moves in the optical axis direction upon focusing alone.

The fourth lens group G4 has negative power, and consists of a negative meniscus lens convex on its image side. One aspheric surface is applied to the image-side surface of the negative meniscus lens.

The lenses that form the zoom optical system of the example are all one-piece lenses except the double-concave negative lens in the first lens group G1. Each one-piece lens has been fabricated by the process shown in FIG. 3.

Figure 31:
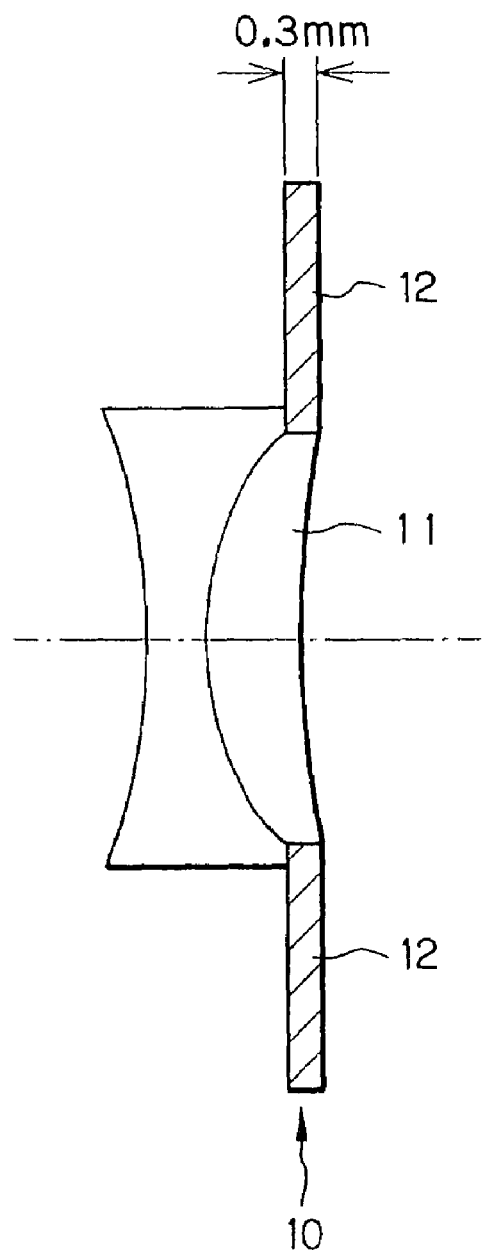
FIG. 31 is illustrative in section of one exemplary one-piece lens used in Example 4-2 of the fourth zoom optical system.

One exemplary one-piece lens 10 used herein is shown in FIG. 31. FIG. 31 is illustrative in section of the doublet in the first lens group G1. In this doublet, the image-side positive meniscus lens is configured as the one-piece lens 10, with the double-concave negative lens cemented to the object side thereof. The second lens blank 12 is 0.3 mm in thickness. Although not depicted in FIG. 31, the second lens blank 12 could be processed simultaneously with the provision of a hole or an irregular pattern (see FIG. 3).

Numerical data on each example will be set out later.

Figure 32A:
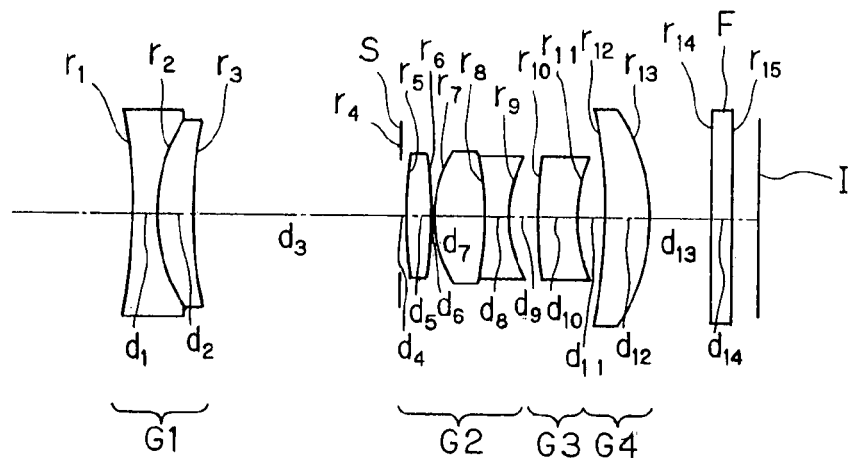
FIG. 32 is illustrative in lens section of Example 5-1 of the fifth zoom optical system, showing lens sections at a wide-angle end (a), in an intermediate setting (b) and at a telephoto end (c) upon focusing on an infinite object point.
Figure 32B:
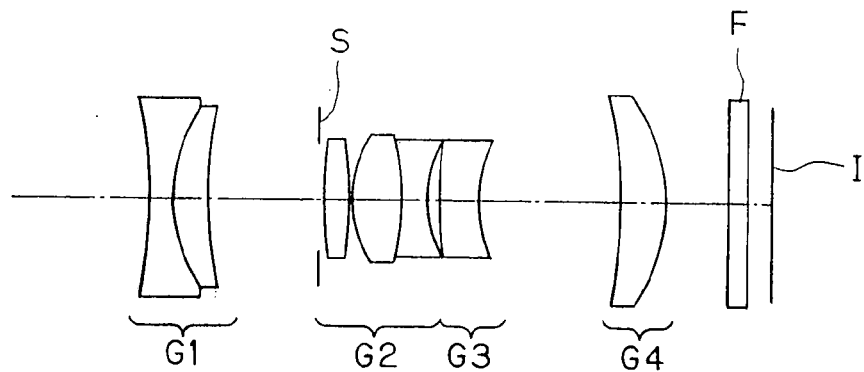
Figure 32C:
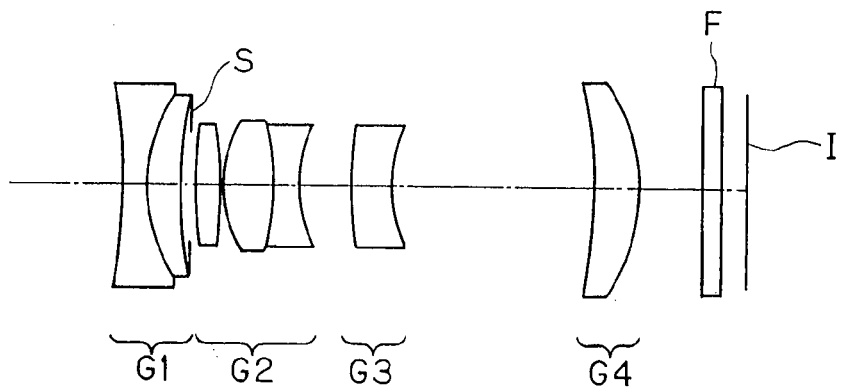
Figure 33A:
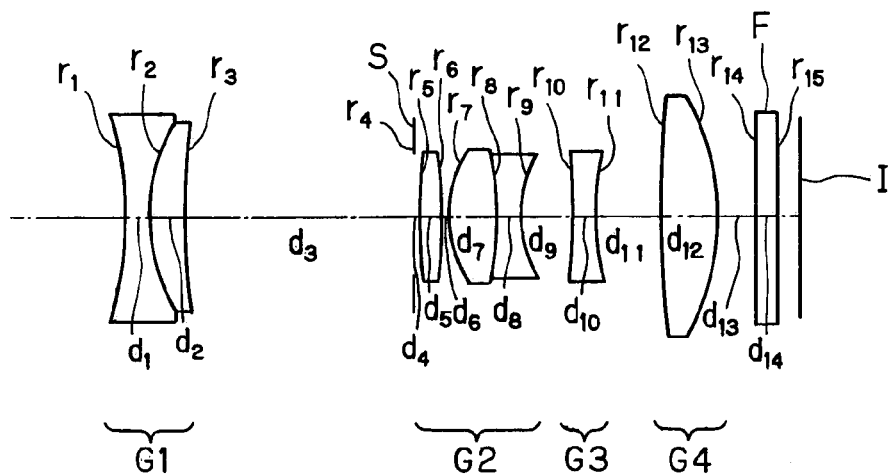
FIG. 33 is illustrative in lens section of Example 5-2 of the fifth zoom optical system, showing lens sections at a wide-angle end (a), in an intermediate setting (b) and at a telephoto end (c) upon focusing on an infinite object point.
Figure 33B:
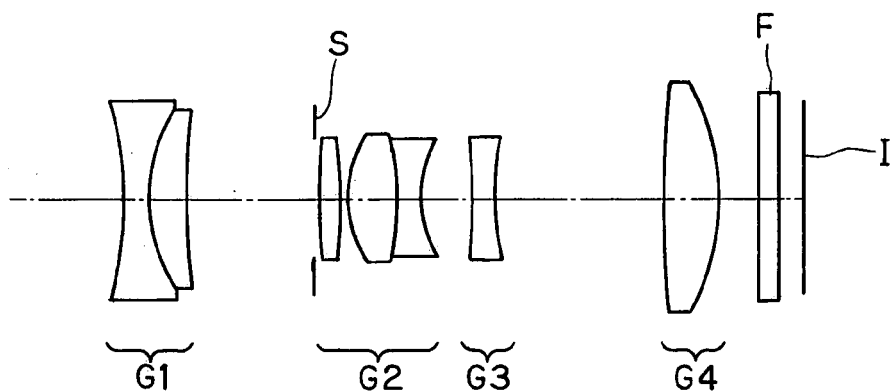
Figure 33C:
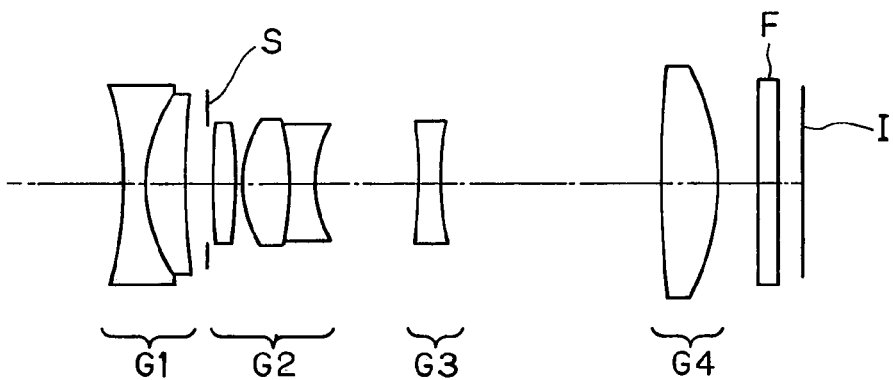
Figure 34A:
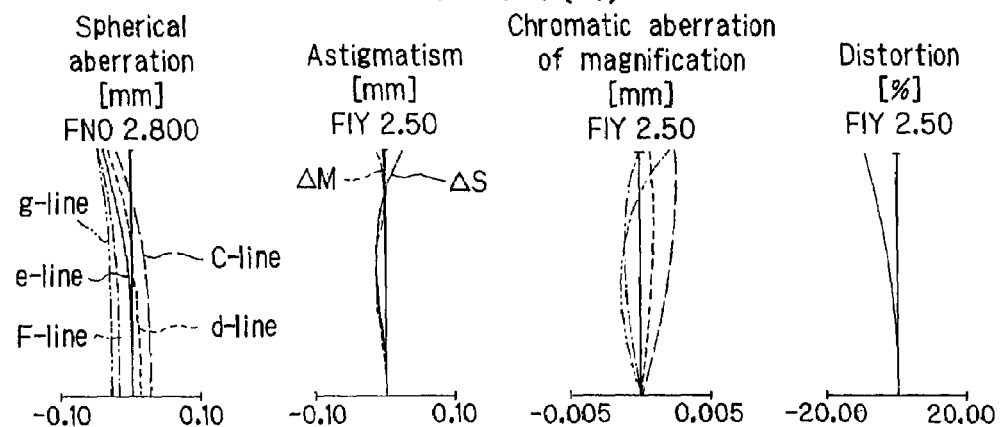
FIG. 34 is an aberration diagram for Example 5-1 of the fifth zoom optical system, showing aberrations at a wide-angle end (a), in an intermediate setting (b) and at a telephoto end (c) upon focusing on an infinite object point.
Figure 34B:
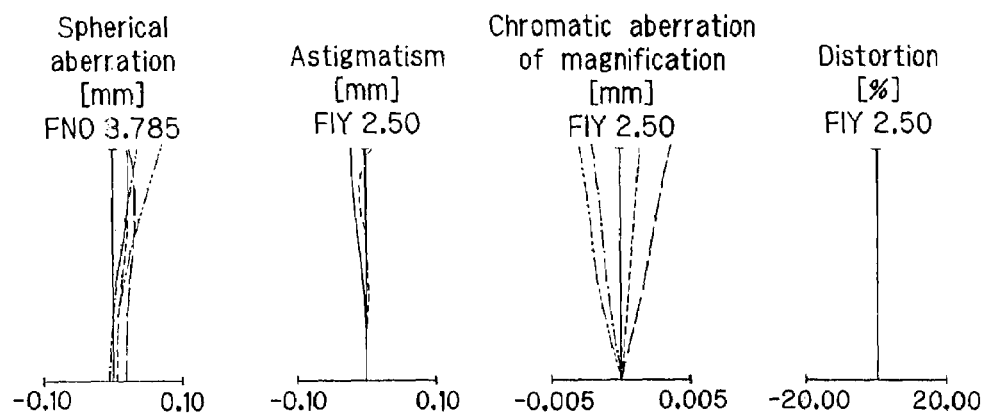
Figure 34C:
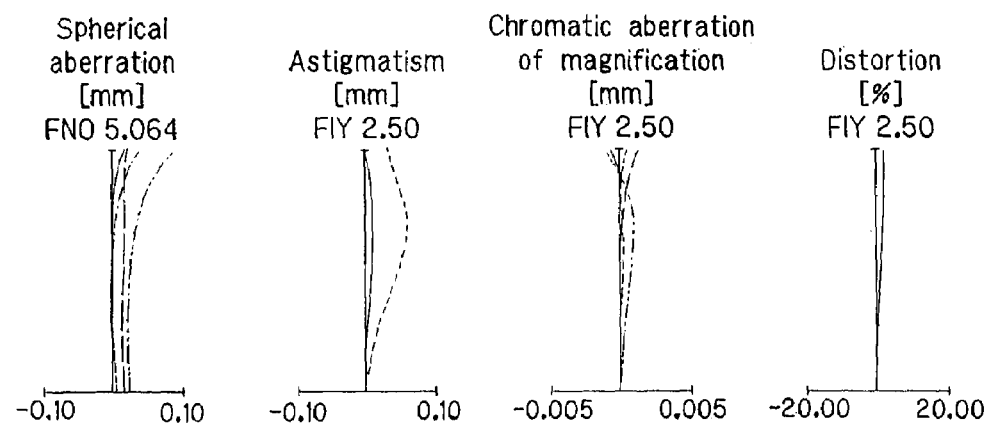
Figure 35A:
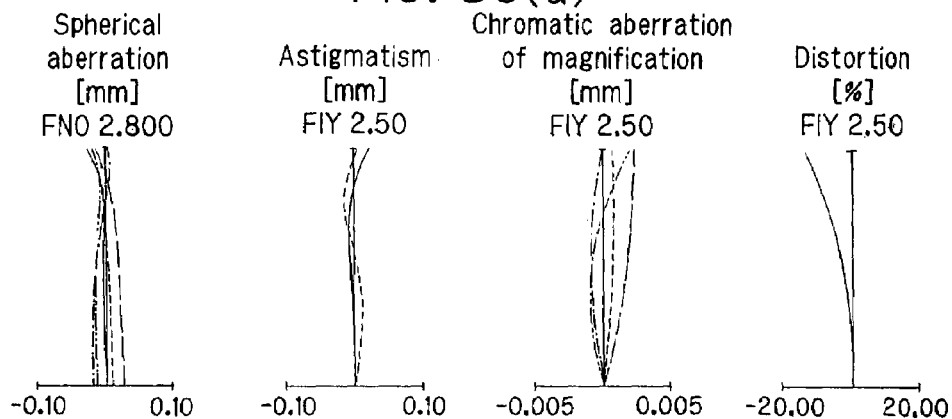
FIG. 35 is an aberration diagram for Example 5-2 of the fifth zoom optical system, showing aberrations at a wide-angle end (a), in an intermediate setting (b) and at a telephoto end (c) upon focusing on an infinite object point.
Figure 35B:
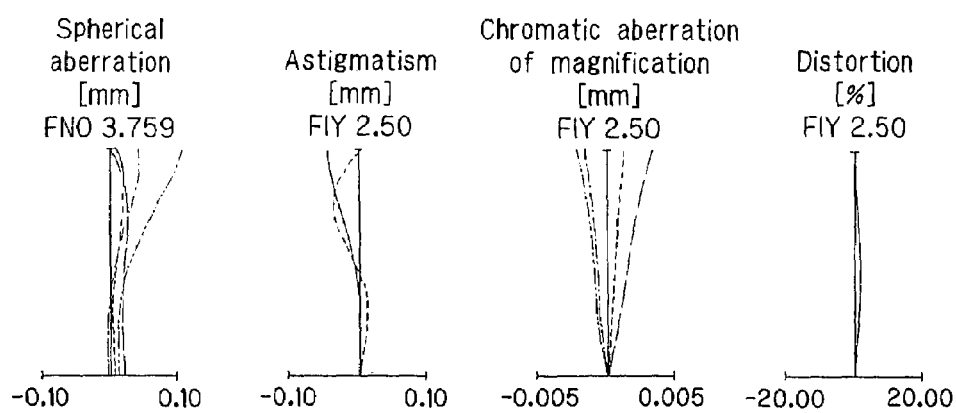
Figure 35C:
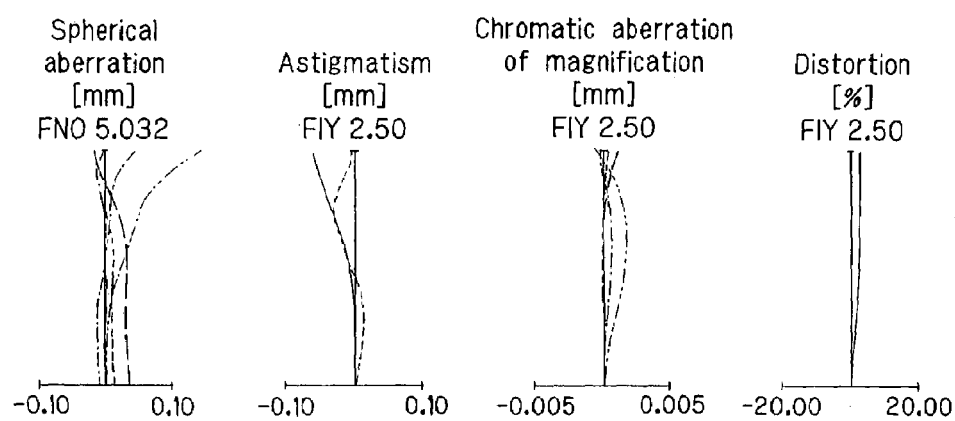

(5) Zoom Optical System Wherein the First Group is a Negative Lens Group, the Second Group is a Positive Lens Group, the Third Group is a Negative Lens Group and the Fourth Group is a Positive Lens Group Examples 5-1 and 5-2 of the fifth zoom optical system (zoom lens) are now explained with reference to the drawings. FIGS. 32 and 33 are illustrative in lens section along the optical axes of Examples 5-1 and 5-2 at the wide-angle ends (a), in intermediate settings (b) and at the telephoto ends (c), respectively, upon focusing on an infinite object point. FIGS. 34 and 35 are aberration diagrams for spherical aberration, astigmatism, chromatic aberration of magnification and distortion of Examples 5-1 and 5-2 at the wide-angle ends (a), in the intermediate settings (b) and at the telephoto ends (c), respectively, upon focusing on an infinite object point.

EXAMPLE 5-1

FIG. 32 is illustrative of the zoom optical system of this example, which is made up of, in order from its object side, a first lens group G1, a second lens group G2, an aperture stop S, a third lens group G3 and a fourth lens group G4. Upon zooming from the wide-angle end to the telephoto end of the optical system, the first lens group G1 remains fixed; the second lens group G2 moves in unison with the aperture stop S toward the object side; the third lens group G3 moves toward the object side while the space between it and the fourth lens group G4 first becomes narrow and then wide; and the fourth lens group G4 remains fixed.

The first lens group G1 has generally negative power, and is composed of a doublet consisting of a double-concave negative lens and a positive meniscus lens concave on its image side. Three aspheric surfaces are used: one at the object-side surface of the double-convex positive lens, and two at the surfaces of the doublet nearest to its object and image sides.

The second lens group G2 has generally positive power, and is composed of, in order from its object side, a double-convex positive lens and a doublet consisting of a double-convex positive lens and a double-concave negative lens. Three aspheric surfaces are used: one at the object-side surface of the double-convex positive lens, and two at the surfaces of the doublet nearest to its object and image sides.

The third lens group G3 has negative power, and consists of a negative meniscus lens convex on its object side. One aspheric surface is applied to the image-side surface of the negative meniscus lens.

The fourth lens group G4 has positive power, and consists of a positive meniscus lens concave on its object side. One aspheric surface is applied to the image-side surface of the positive meniscus lens.

The lenses that form the zoom optical system of this example are all one-piece lenses except the negative meniscus lens in the third lens group G3. Each one-piece lens has been fabricated by the process shown in FIG. 1.

Figure 36:
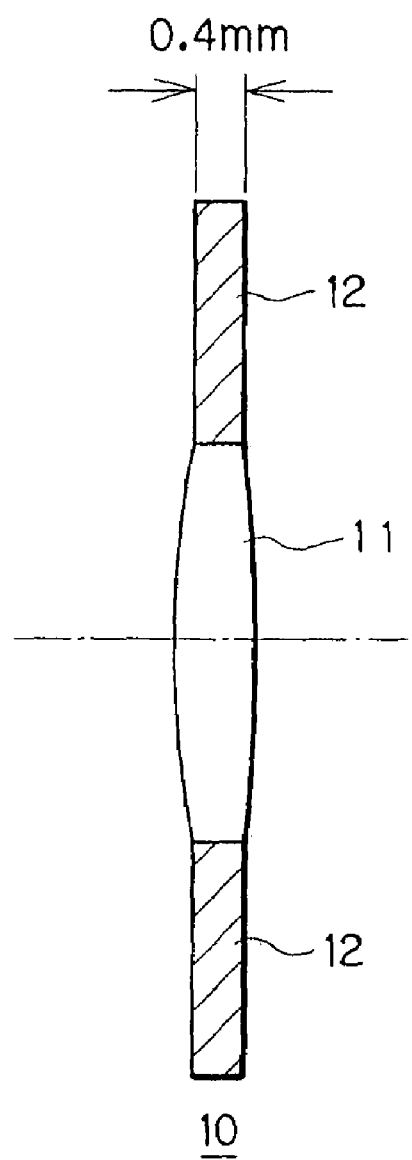
FIG. 36 is illustrative in section of one exemplary one-piece lens used in Example 5-1 of the fifth zoom optical system.

One exemplary one-piece lens 10 used herein is depicted in FIG. 36. FIG. 36 is illustrative in section of the object-side double-convex positive lens in the second lens group G2. In this lens, the double-convex positive lens is configured as the one-piece lens. The second lens blank 12 is 0.4 mm in thickness. Although not shown in FIG. 36, the second lens blank 12 could be processed simultaneously with the provision of a hole or an irregular pattern.

EXAMPLE 5-2

FIG. 33 is illustrative of the zoom optical system of this example, which is made up of, in order from its object side, a first lens group G1, a second lens group G2, an aperture stop S, a third lens group G3 and a fourth lens group G4. Upon zooming from the wide-angle end to the telephoto end of the optical system, the first lens group G1 remains fixed; the second lens group G2 moves in unison with the aperture stop S toward the object side; the third lens group G3 moves toward the object side while the space between it and the fourth lens group G4 first becomes slightly narrow and then wide; and the fourth lens group G4 remains fixed.

The first lens group G1 has generally negative power, and is composed of a doublet consisting of a double-concave negative lens and a positive meniscus lens concave on its image side. Two aspheric surfaces are used at the surfaces of the doublet nearest to its object and image sides.

The second lens group G2 has generally positive power, and is composed of, in order from its object side, a double-convex positive lens and a doublet consisting of a double-convex positive lens and a double-concave negative lens. Three aspheric surfaces are used: one at the object-side surface of the double-convex positive lens that is a single lens, and two at the surfaces of the doublet nearest to its object and image sides.

The third lens group G3 has negative power, and consists of a double-concave negative lens. One aspheric surface is applied to the image-side surface of the double-convex positive lens.

The fourth lens group G4 has positive power, and consists of a double-convex positive lens. One aspheric surface is applied to the image-side surface of the double-convex positive lens.

The lenses that form the zoom optical system of this example are all one-piece lenses except the double-concave negative lens in the second lens group G2. Each one-piece lens has been fabricated by the process shown in FIG. 3.

Figure 37:
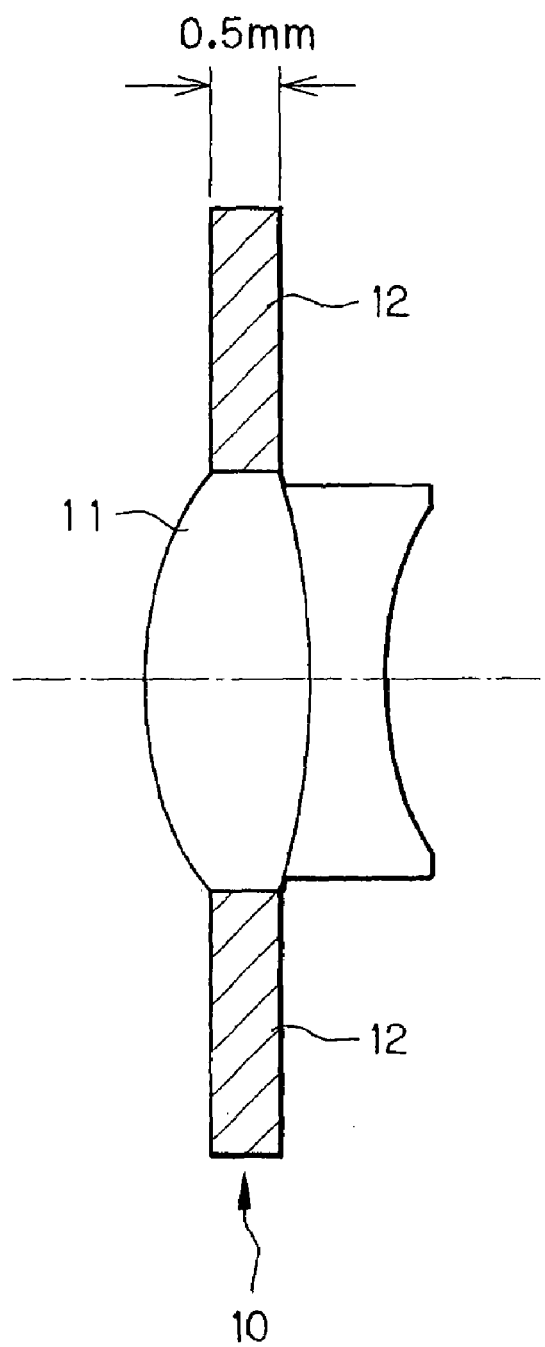
FIG. 37 is illustrative in section of one exemplary one-piece lens used in Example 5-2 of the fifth zoom optical system.

One exemplary one-piece lens 10 used herein is depicted in FIG. 37. FIG. 37 is illustrative in section of the doublet in the second lens group G2. In this doublet, the object-side double-convex positive lens is configured as the one-piece lens 10, with the double-concave negative lens cemented to the image side thereof. The second lens blank 12 has a thickness of 0.5 mm. Although not depicted in FIG. 37, the second lens blank 12 could be processed simultaneously with the provision of a hole or an irregular pattern (see FIG. 3).

Numerical data on each example will be given later.

Figure 38A:
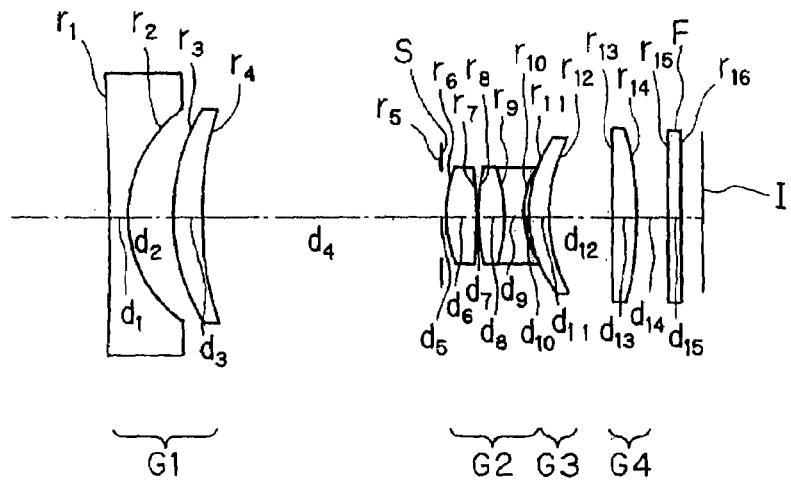
FIG. 38 is illustrative in lens section of Example 6-1 of the sixth zoom optical system, showing lens sections at a wide-angle end (a), in an intermediate setting (b) and at a telephoto end (c) upon focusing on an infinite object point.
Figure 38B:
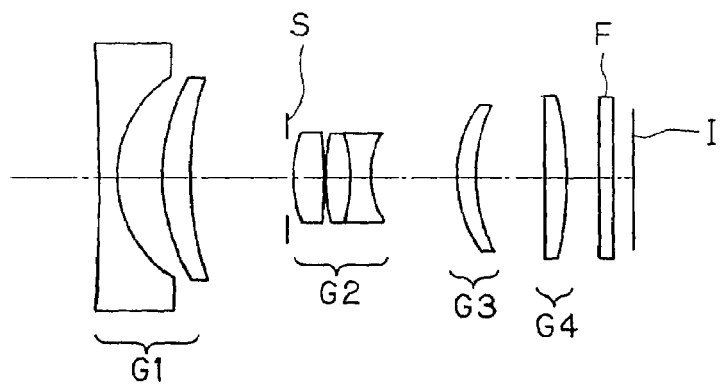
Figure 38C:
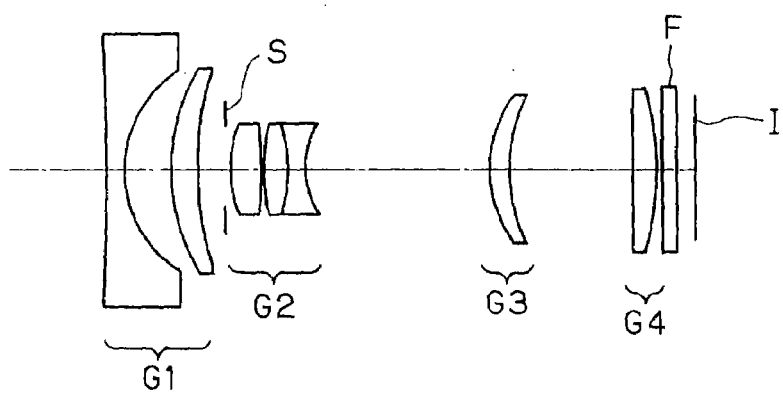
Figure 39A:
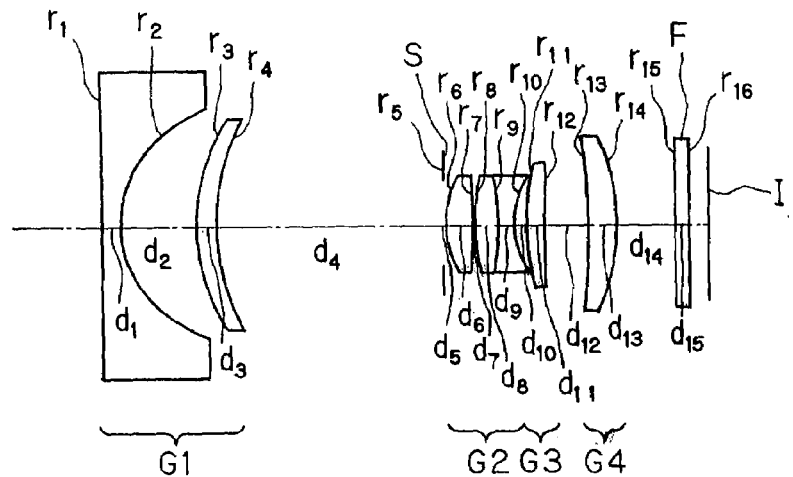
FIG. 39 is illustrative in lens section of Example 6-2 of the sixth zoom optical system, showing lens sections at a wide-angle end (a), in an intermediate setting (b) and at a telephoto end (c) upon focusing on an infinite object point.
Figure 39B:
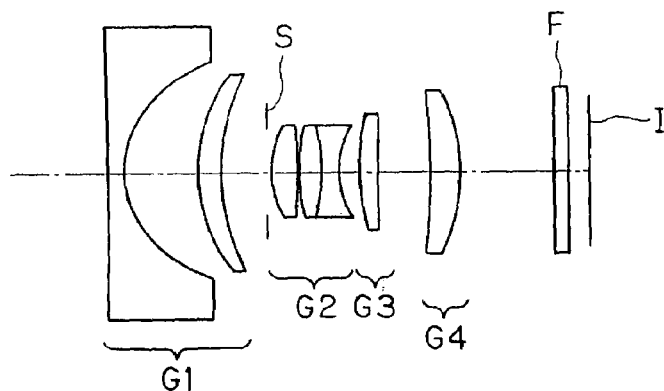
Figure 39C:
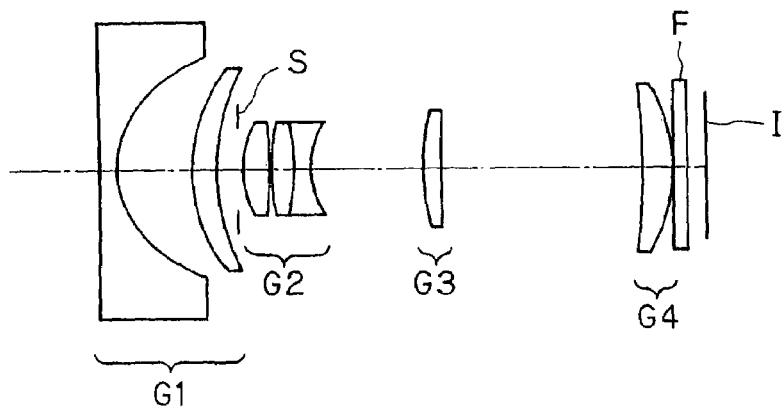
Figure 40A:
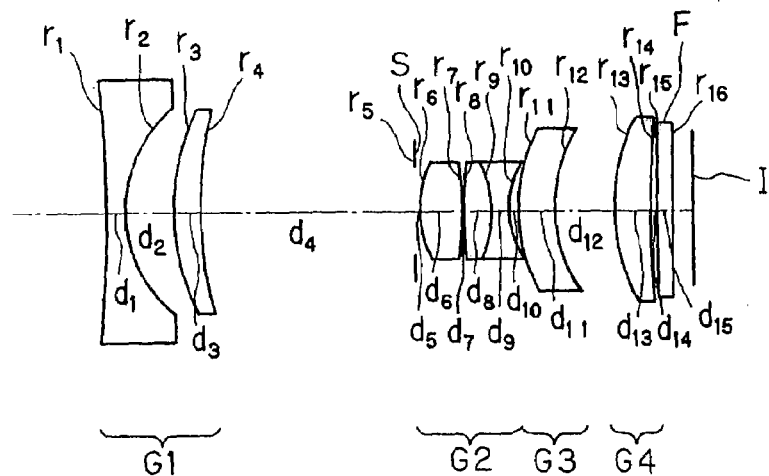
FIG. 40 is illustrative in lens section of Example 6-3 of the sixth zoom optical system; showing lens sections at a wide-angle end (a), in an intermediate setting (b) and at a telephoto end (c) upon focusing on an infinite object point.
Figure 40B:
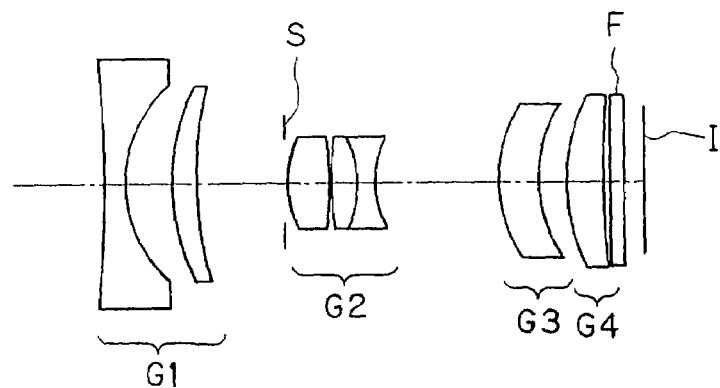
Figure 40C:
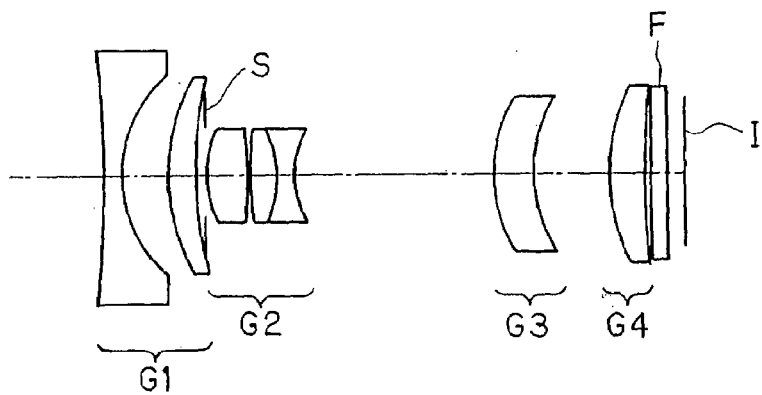
Figure 41A:
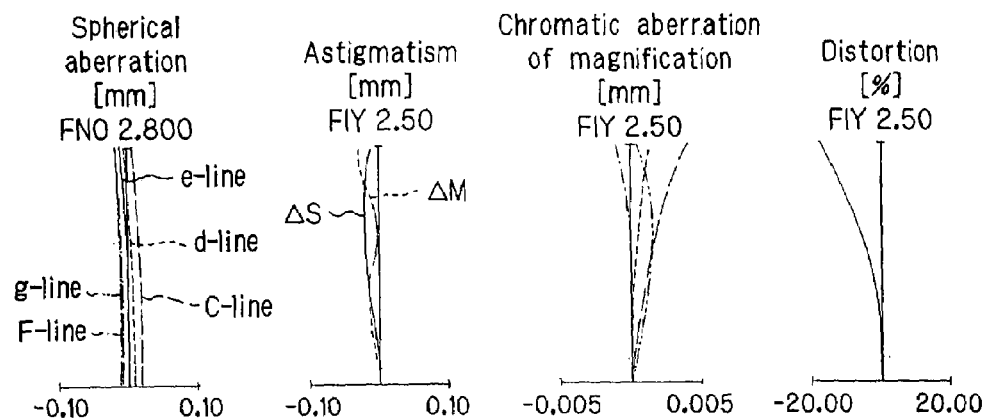
FIG. 41 is an aberration diagram for Example 6-1 of the sixth zoom optical system, showing aberrations at a wide-angle end (a), in an intermediate setting (b) and at a telephoto end (c) upon focusing on an infinite object point.
Figure 41B:
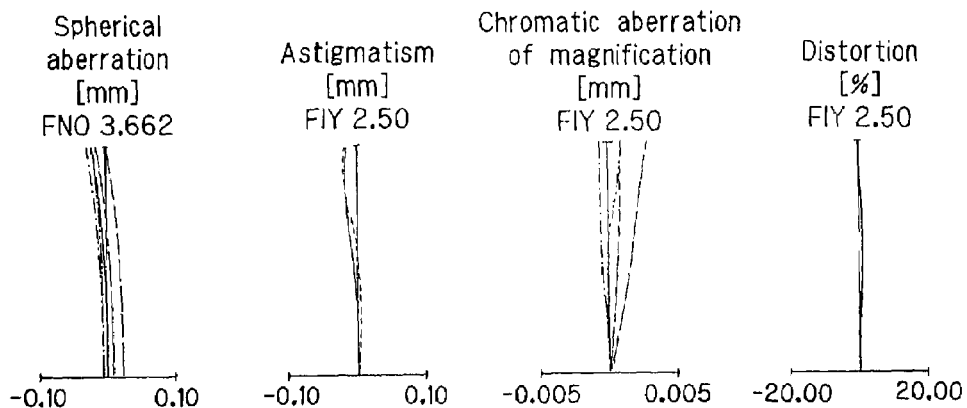
Figure 41C:
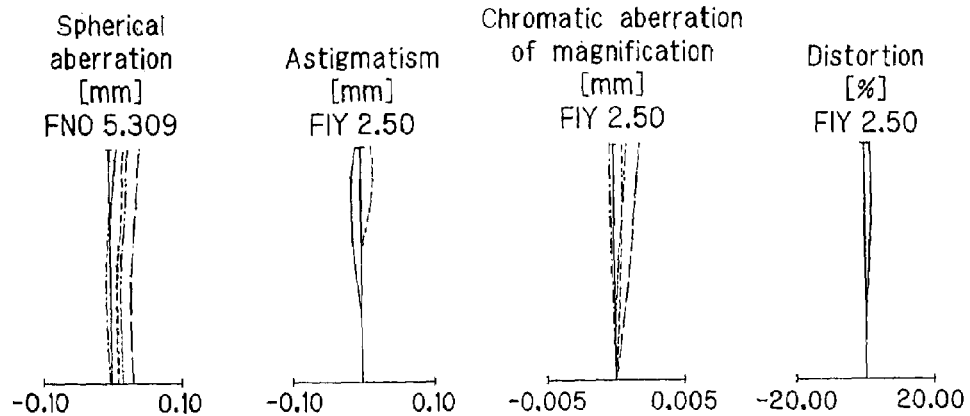
Figure 42A:
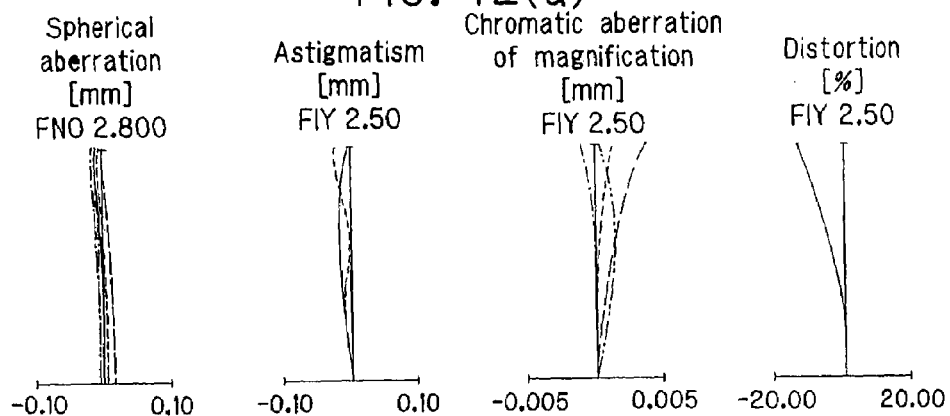
FIG. 42 is an aberration diagram for Example 6-2 of the sixth zoom optical system, showing aberrations at a wide-angle end (a), in an intermediate setting (b) and at a telephoto end (c) upon focusing on an infinite object point.
Figure 42B:
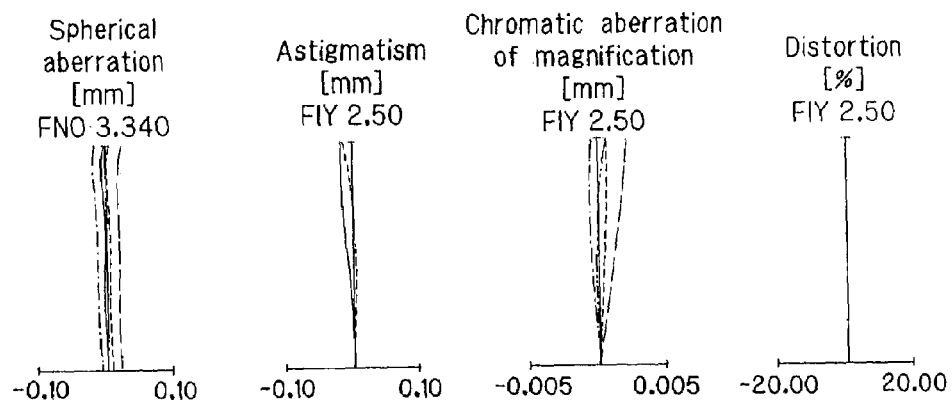
Figure 42C:
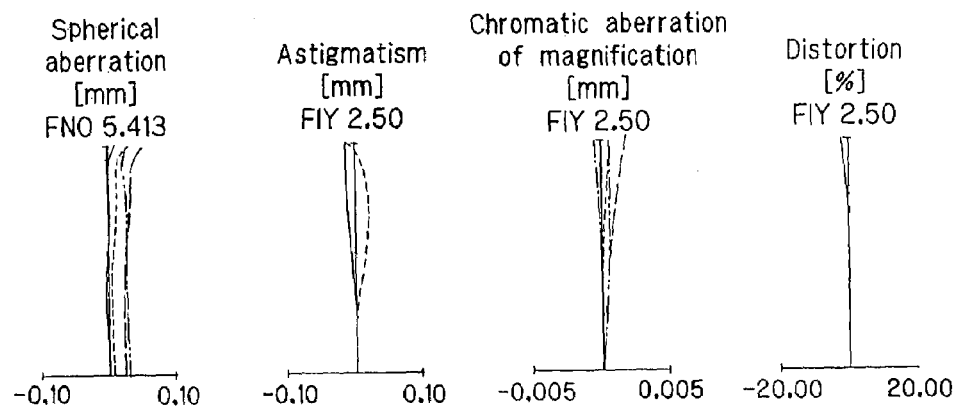

(6) Zoom Optical System Wherein the First Group is a Negative Lens Group, the Second Group is a Positive Lens Group, the Third Group is a Positive Lens Group and the Fourth Group is a Positive Lens Group Examples 6-1, 6-2 and 6-3 of the sixth zoom optical system (zoom lens) are now explained with reference to the drawings. FIGS. 38, 39 and 40 are illustrative in lens section along the optical axes of Examples 6-1, 6-2 and 6-3 at the wide-angle ends (a), in intermediate settings (b) and at the telephoto ends (c), respectively, upon focusing on an infinite object point. FIGS. 41, 42 and 43 are aberration diagrams for spherical aberration, astigmatism, chromatic aberration of magnification and distortion of Examples 6-1, 6-2 and 6-3 at the wide-angle ends (a), in the intermediate settings (b) and at the telephoto ends (c), respectively, upon focusing on an infinite object point.

EXAMPLE 6-1

FIG. 38 is illustrative of the zoom optical system of this example, which is made up of, in order from its object side, a first lens group G1, an aperture stop S, a second lens group G2, a third lens group G3 and a fourth lens group G4. Upon zooming from the wide-angle end to the telephoto end of the optical system, the first lens group G1 moves in a concave locust toward the object side and is located in much the same position at the telephoto end as at the wide-angle end. The second lens group G2 moves in unison with the aperture stop S toward the object side. The third lens group moves slightly toward the object side. The fourth lens group G4 moves in a convex locus slightly toward the object side, and is located nearer to the image side of the optical system at the telephoto end than at the wide-angle end.

The first lens group G1 has generally negative power, and is composed of, in order from its object side, a double-concave negative lens and a positive meniscus lens concave on its image side. One aspheric surface is applied to the image-side surface of the double-concave negative lens.

The second lens group G2 has generally positive power, and is composed of, in order from its object side, a double-convex positive lens and a doublet consisting of a double-convex positive lens and a double-concave negative lens. Two aspheric surfaces are used: one at the object-side surface of the double-convex positive lens and one at the surface of the doublet nearest to its object side.

The third lens group G3 has positive power, and consists of a positive meniscus lens concave on its image side. One aspheric surface is applied to the image-side surface of the positive meniscus lens.

The fourth lens group G4 has positive power, and consists of a plano-convex positive lens convex on its image side. One aspheric surface is applied to the image-side surface of the plano-convex positive lens.

The lenses that form the zoom optical system of this example are all one-piece lenses except the double-concave negative lens in the second lens group G2. Each one-piece lens has been fabricated by the process shown in FIG. 1.

Figure 44:
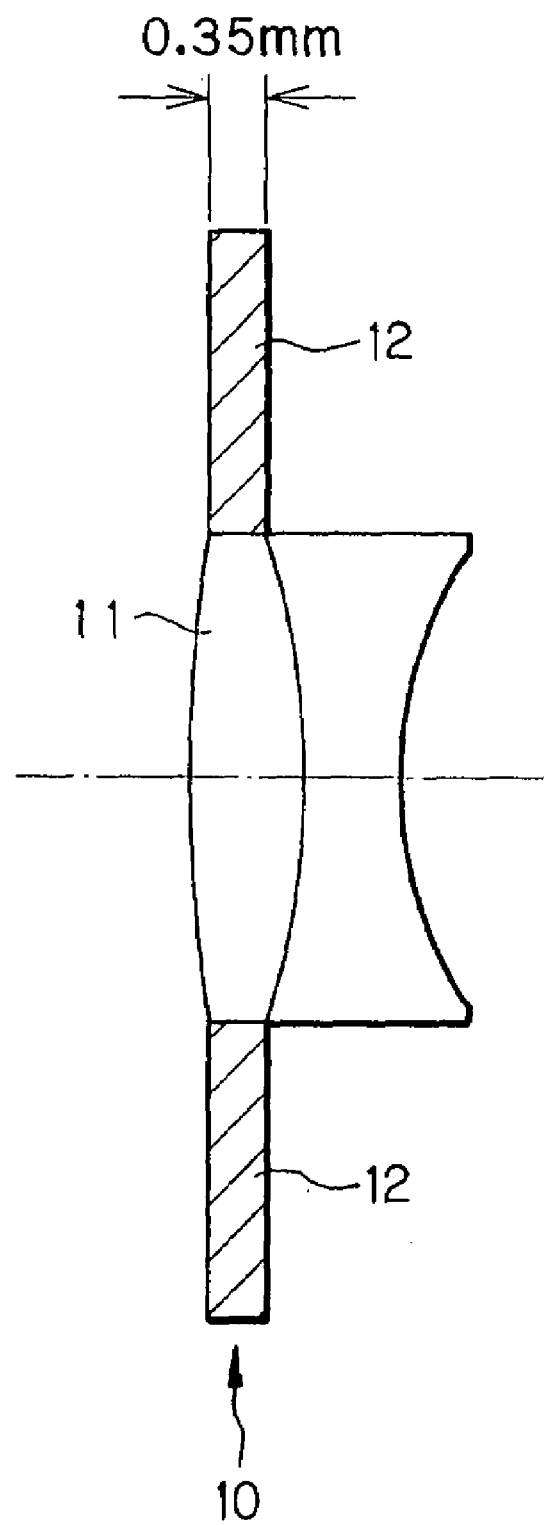
FIG. 44 is illustrative in section of one exemplary one-piece lens used in Example 6-1 of the sixth zoom optical system.

One exemplary one-piece lens 10 used herein is shown in FIG. 44. FIG. 44 is illustrative in section of the doublet in the second lens group G2. In this doublet, the object-side double-convex positive lens is configured as the one-piece lens 10, with the double-concave negative lens cemented to the image side thereof. The second lens blank 12 is 0.35 mm in thickness. Although not depicted in FIG. 44, the second lens blank 12 could be processed simultaneously with the provision of a hole or an irregular pattern.

EXAMPLE 6-2

FIG. 39 is illustrative of the zoom optical system of this example, which is made up of, in order from its object side, a first lens group G1, an aperture stop S, a second lens group G2, a third lens group G3 and a fourth lens group G4. Upon zooming from the wide-angle end to the telephoto end of the optical system, the first lens group G1 moves in a concave locust toward the object side and is located in much the same position at the telephoto end as at the wide-angle end. The second lens group G2 moves in unison with the aperture stop S toward the object side. The third lens group G3 moves toward the object side while the space between it and the second lens group G2 becomes wide. The fourth lens group G4 moves in a convex locus toward the object side and is positioned nearer to the image side of the optical system at the telephoto end than at the wide-angle end.

The first lens group G1 has generally negative power, and is composed of, in order from its object side, a plane-concave negative lens concave on its image side and a positive meniscus lens concave on its image side. One aspheric surface is applied to the image-side surface of the plano-concave negative lens.

The second lens group G2 has generally positive power, and is composed of, in order from its object side, a double-convex positive lens and a doublet consisting of a double-convex positive lens and a double-concave negative lens. Two aspheric surfaces are used: one at the object-side surface of the object-side double-convex positive lens and one at the surface of the doublet nearest to its object side.

The third lens group G3 has positive power, and consists of a positive meniscus lens concave on its image side. One aspheric surface is applied to the image-side surface of the positive meniscus lens.

The fourth lens group G4 has positive power, and consists of a positive meniscus lens concave on its object side. One aspheric surface is applied to the image-side surface of the positive meniscus lens.

The lenses that form the zoom optical system of this example are all one-piece lenses that have been fabricated by the process shown in FIG. 3.

Figure 45:
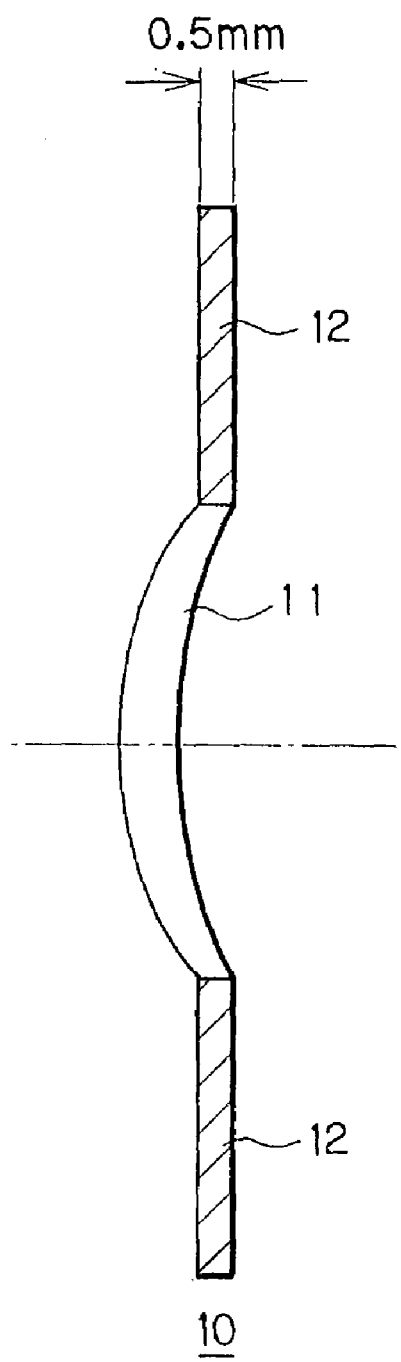
FIG. 45 is illustrative in section of one exemplary one-piece lens used in Example 6-2 of the sixth zoom optical system.

One exemplary one-piece lens 10 used herein is shown in FIG. 45. FIG. 45 is illustrative in section of the positive meniscus lens in the first lens group G1. In this lens, the positive meniscus lens is configured as the one-piece lens 10.

The second lens blank 12 is 0.5 mm in thickness. Although not depicted in FIG. 45, the second lens blank 12 could be processed simultaneously with the provision of a hole or an irregular pattern (see FIG. 3).

EXAMPLE 6-3

FIG. 40 is illustrative of the zoom optical system of this example, which is made up of, in order from its object side, a first lens group G1, an aperture stop S, a second lens group G2, a third lens group G3 and a fourth lens group G4. Upon zooming from the wide-angle end to the telephoto end of the optical system, the first lens group G1 moves in a concave locus toward the object side and is located in much the same position at the telephoto end as at the wide-angle end. The second lens group G2 moves in unison with the aperture stop S toward the object side. The third lens group G3 moves in a concave locus toward the object side and is positioned nearer to the object side at the telephoto end than at the wide-angle end. The fourth lens group G4 remains fixed.

The first lens group G1 has generally negative power, and is composed of, in order from its object side, a double-concave negative lens and a positive meniscus lens concave on its image side. One aspheric surface is applied to the image-side surface of the double-concave negative lens.

The second lens group G2 has generally positive power, and is composed of, in order from its object side, a double-convex positive lens and a doublet consisting of a double-convex positive lens and a double-concave negative lens. Two aspheric surfaces are used: one at the object-side surface of the object-side double-convex positive lens and one at the surface of the doublet nearest to its object side.

The third lens group G3 has positive power, and consists of a positive meniscus lens concave on its image side. One aspheric surface is applied to the image-side surface of the positive meniscus lens.

The fourth lens group G4 has positive power, and consist of a positive meniscus lens concave on its image side. One aspheric surface is applied to the image-side surface of the positive meniscus lens.

The lenses that form the zoom optical system of this example are all one-piece lenses except the double-concave negative lens in the second lens group G2. Each one-piece lens has been fabricated by the process shown in FIG. 5.

Figure 46:
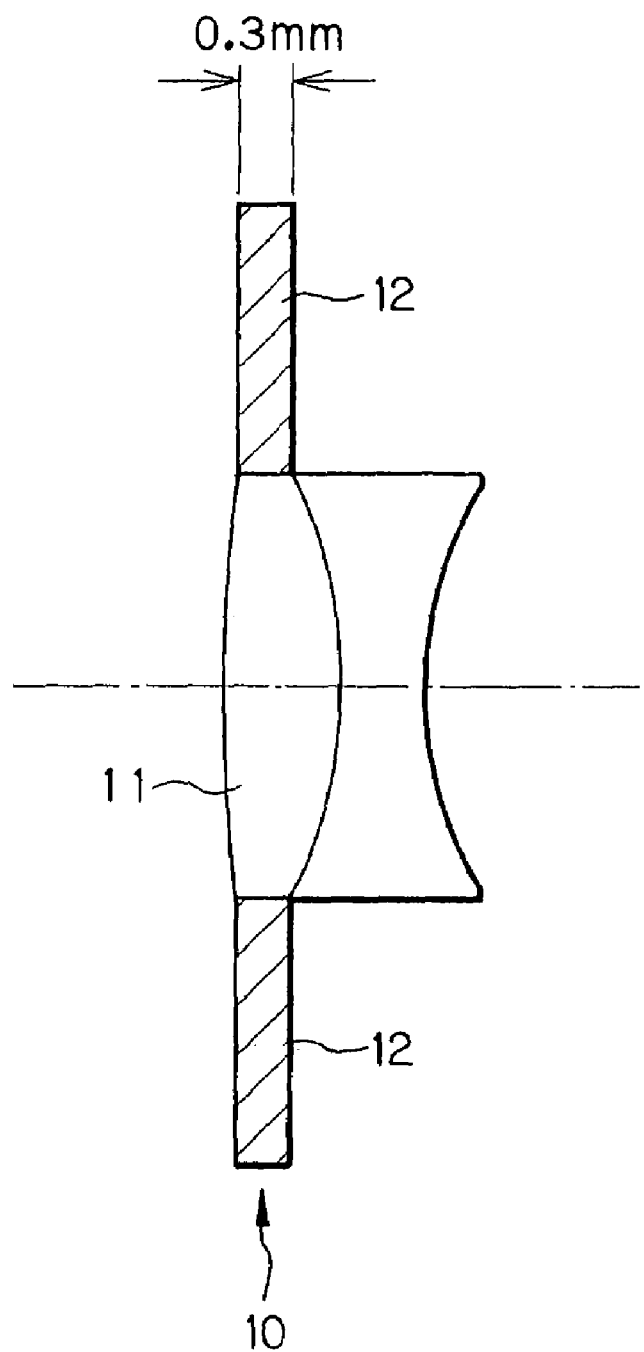
FIG. 46 is illustrative in section of one exemplary one-piece lens used in Example 6-3 of the sixth zoom optical system.

One exemplary one-piece lens 10 used herein is shown in FIG. 46. FIG. 46 is illustrative in section of the doublet in the second lens group G2. In this doublet, the object-side double-convex positive lens is configured as the one-piece lens 10, with the double-concave negative lens cemented to the image side thereof. The second lens blank 12 is 0.3 mm in thickness. Although not depicted in FIG. 46, the second lens blank 12 could be processed simultaneously with the formation of a hole or an irregular pattern (see FIG. 3).

Numerical data on each example will be given later.

Figure 47A:
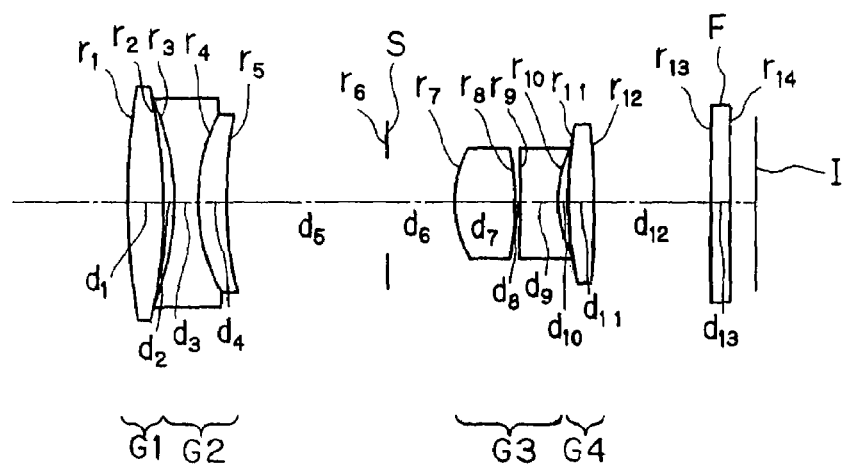
FIG. 47 is illustrative in lens section of Example 7-1 of the seventh zoom optical system, showing lens sections at a wide-angle end (a), in an intermediate setting (b) and at a telephoto end (c) upon focusing on an infinite object point.
Figure 47B:
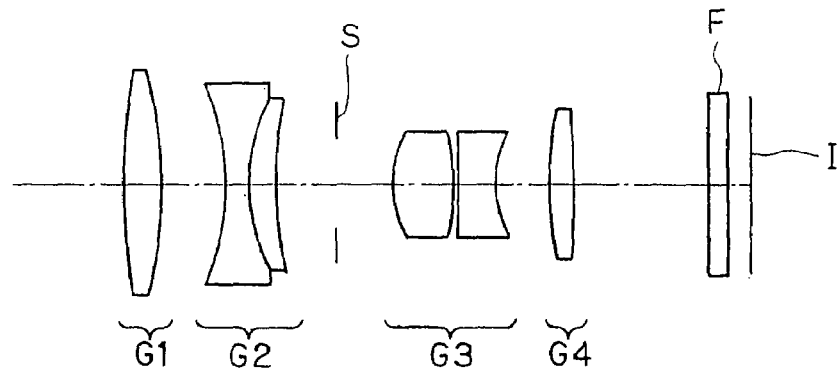
Figure 47C:
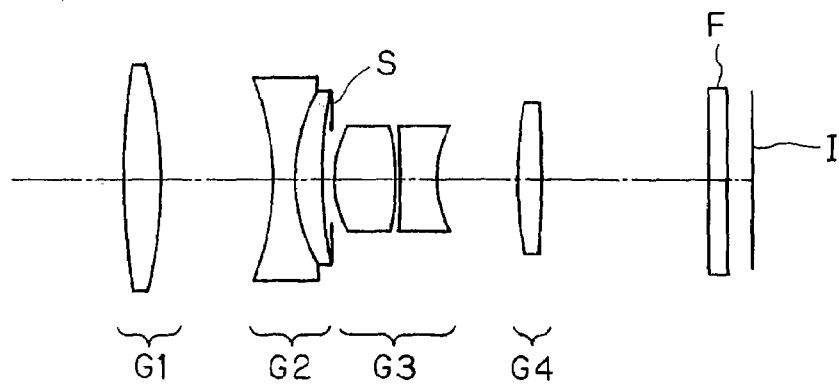
Figure 48A:
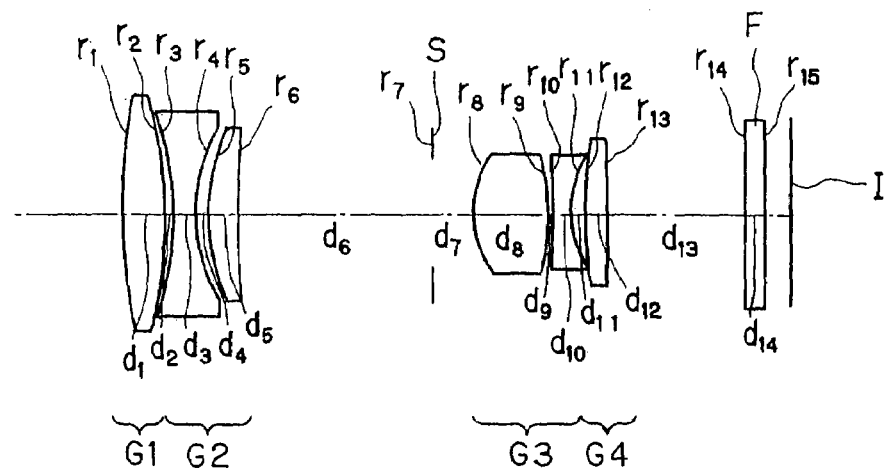
FIG. 48 is illustrative in lens section of Example 7-2 of the seventh zoom optical system, showing lens sections at a wide-angle end (a), in an intermediate setting (b) and at a telephoto end (c) upon focusing on an infinite object point.
Figure 48B:
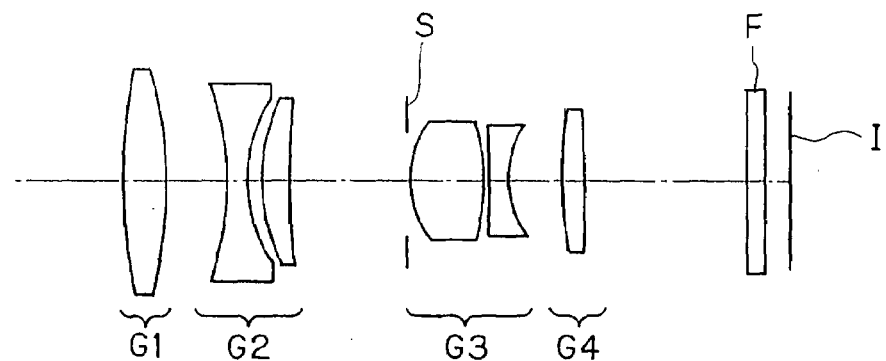
Figure 48C:
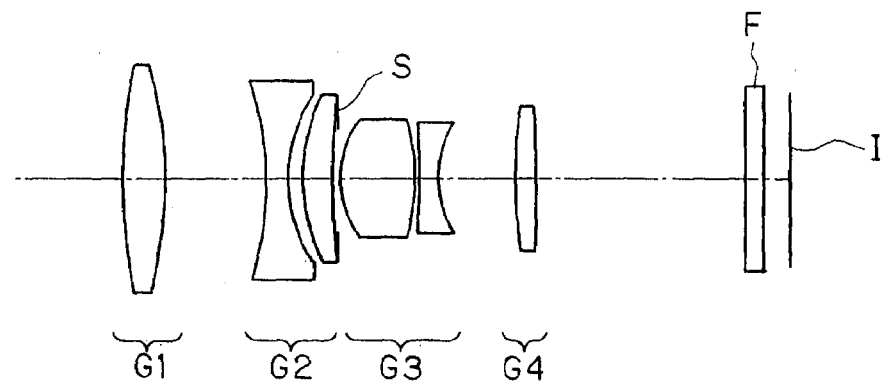
Figure 49A:
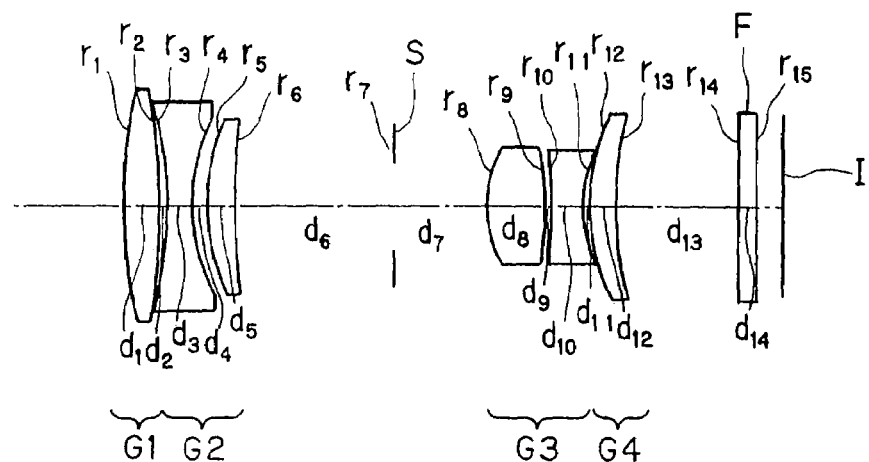
FIG. 49 is illustrative in lens section of Example 7-3 of the seventh zoom optical system, showing lens sections at a wide-angle end (a), in an intermediate setting (b) and at a telephoto end (c) upon focusing on an infinite object point.
Figure 49B:
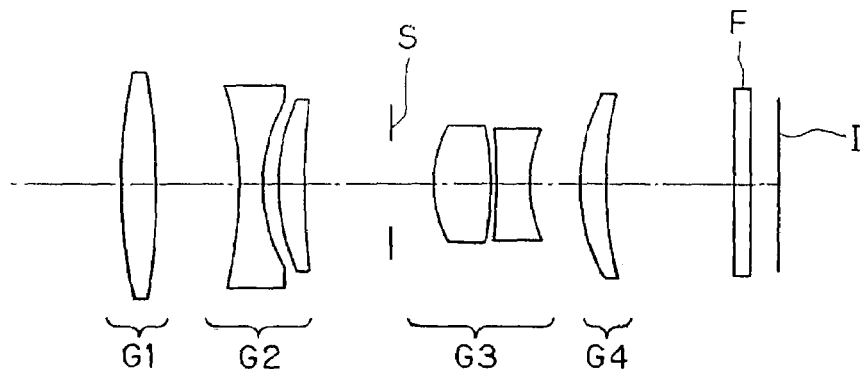
Figure 49C:
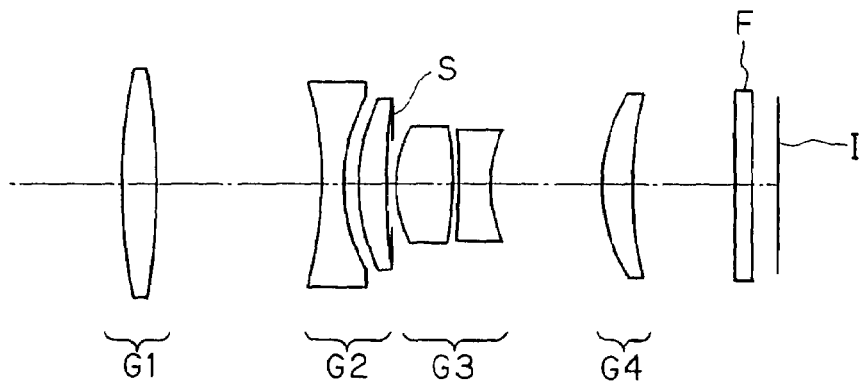
Figure 50A:
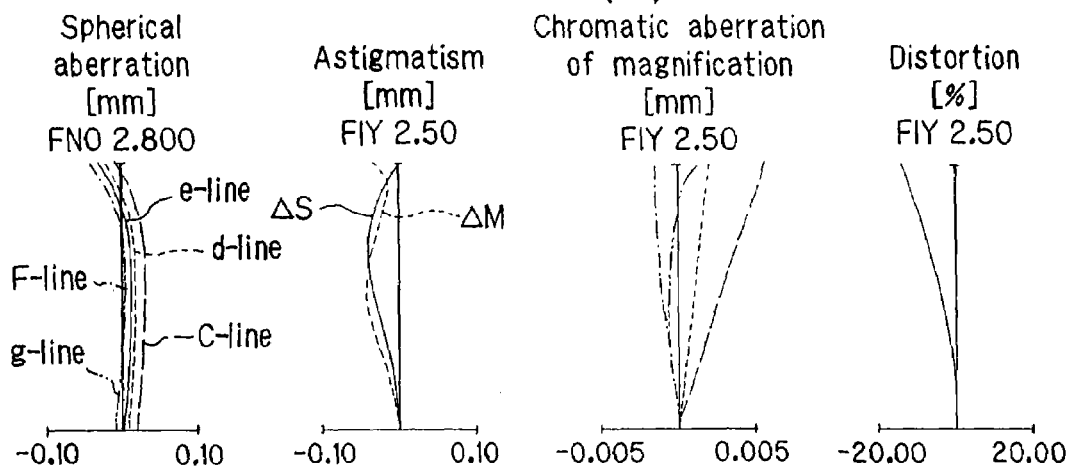
FIG. 50 is an aberration diagram for Example 7-1 of the seventh zoom optical system, showing aberrations at a wide-angle end (a), in an intermediate setting (b) and at a telephoto end (c) upon focusing on an infinite object point.
Figure 50B:
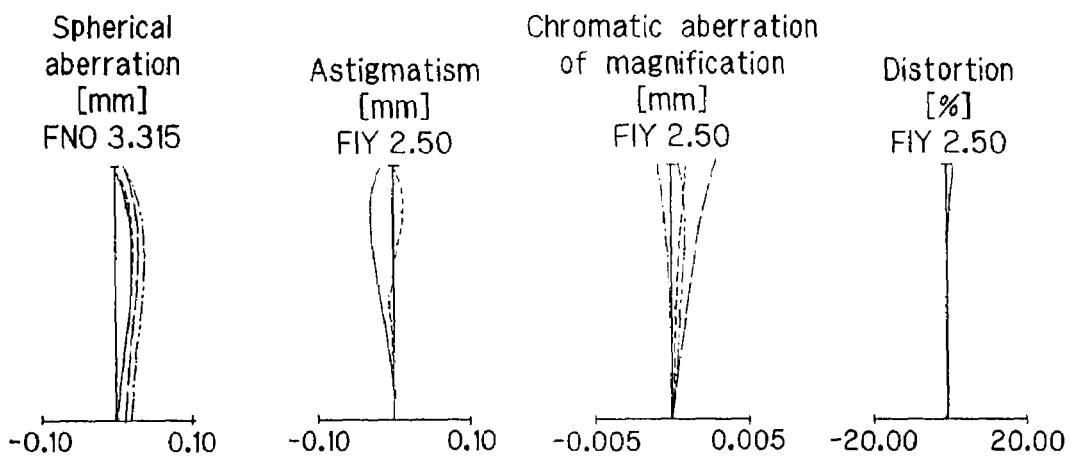
Figure 50C:
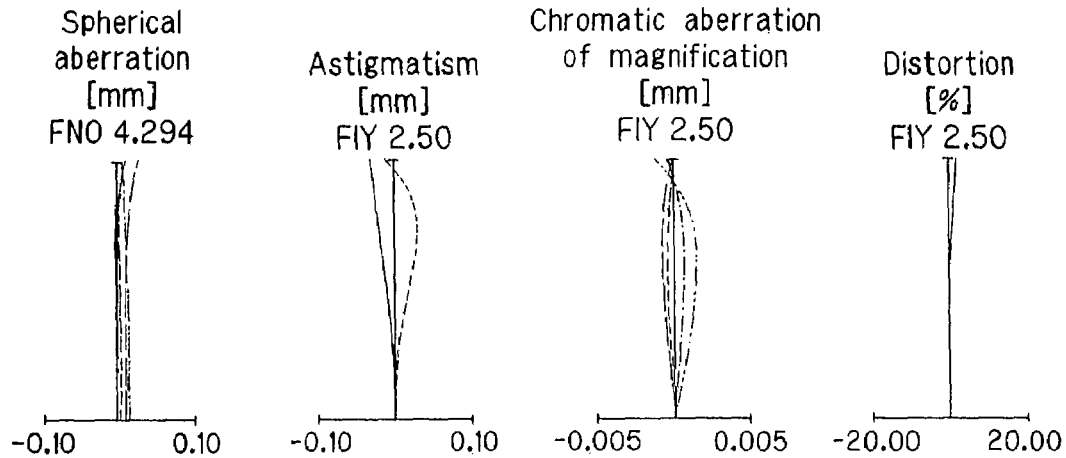
Figure 52A:
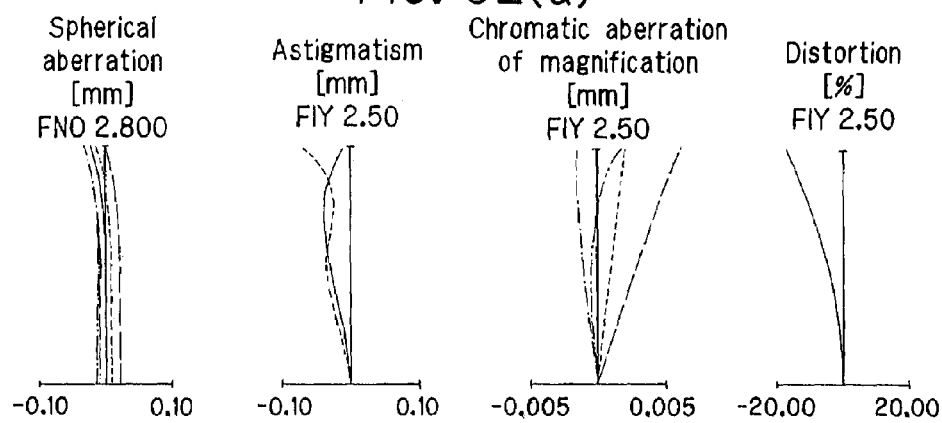
FIG. 52 is an aberration diagram for Example 7-3 of the seventh zoom optical system, showing aberrations at a wide-angle end (a), in an intermediate setting (b) and at a telephoto end (c) upon focusing on an infinite object point.
Figure 52B:
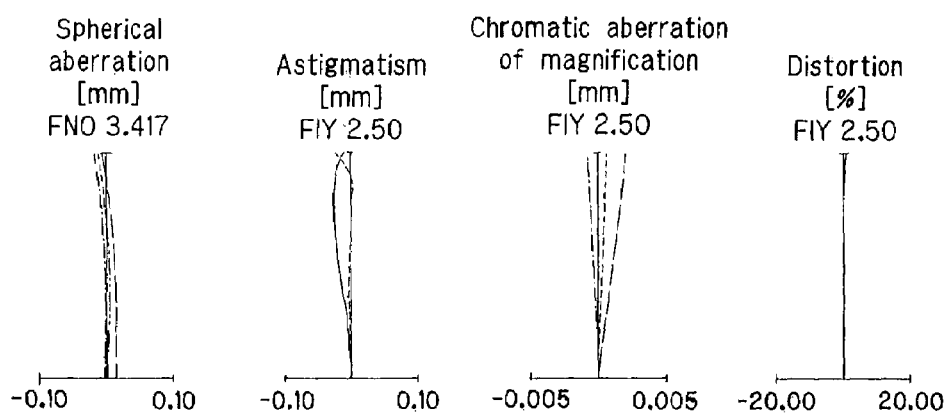
Figure 52C:
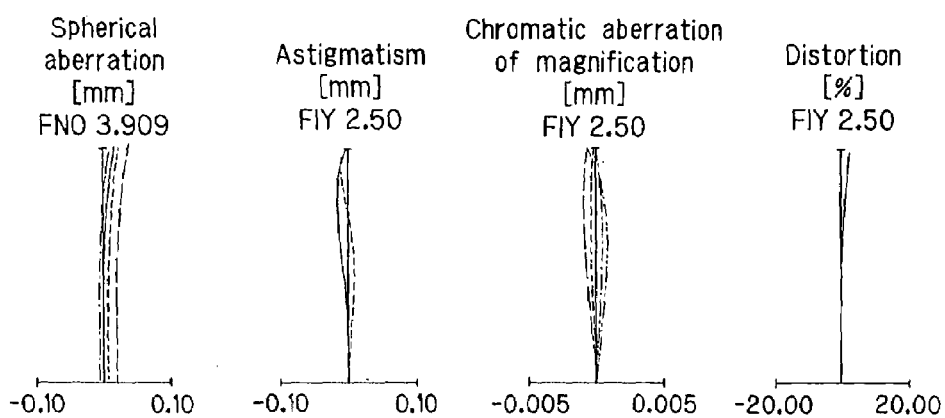

(7) Zoom Optical System Wherein the First Group is a Positive Lens, the Second Group is a Negative Lens Group, the Third Group is a Positive Lens Group and the Fourth Group is a Positive Lens Group Examples 7-1, 7-2 and 7-3 of the sixth zoom optical system (zoom lens) are now explained with reference to the drawings. FIGS. 47, 48 and 49 are illustrative in lens section along the optical axes of Examples 7-1, 7-2 and 7-3 at the wide-angle ends (a), in intermediate settings (b) and at the telephoto ends (c), respectively, upon focusing on an infinite object point. FIGS. 50, 51 and 52 are aberration diagrams for spherical aberration, astigmatism, chromatic aberration of magnification and distortion of Examples 7-1, 7-2 and 7-3 at the wide-angle ends (a), in the intermediate settings (b) and at the telephoto ends (c), respectively, upon focusing on an infinite object point.

EXAMPLE 7-1

FIG. 47 is illustrative of the zoom optical system of this example, which is made up of, in order from its object side, a first lens group G1, a second lens group G2, an aperture stop S, a third lens group G3 and a fourth lens group G4. Upon zooming from the wide-angle end to the telephoto end of the optical system, the first lens group G1 remains fixed; the second lens group G2 moves toward the image side of the optical system; the aperture stop S moves toward the object side; and both the third and fourth lens groups G3 and G4 moves toward the object side. In the meantime, the third and fourth lens groups G3 and G4 move while their space becomes wide.

The first lens group G1 has generally positive power, and consists of a double-convex positive lens. One aspheric surface is applied to the object-side surface of the double-convex positive lens.

The second lens group G2 has generally negative power, and is composed of a doublet consisting of a double-concave negative lens and a positive meniscus lens concave on its image side. One aspheric surface is applied to the surface of the doublet nearest to its object side.

The third lens group G3 has positive power, and is composed of, in order from its object side, a double-convex positive lens and a double-concave negative lens. Two aspheric surfaces are used: one at the object-side surface of the double-convex positive lens and another at the image-side surface of the double-concave negative lens.

The fourth lens group G4 has positive power, and consists of a double-convex positive lens. One aspheric surface is applied to the object-side surface of the double-convex positive lens.

The lenses that form the zoom optical system of this example are all one-piece lenses that have been fabricated by the process illustrated in FIG. 1.

Figure 53:
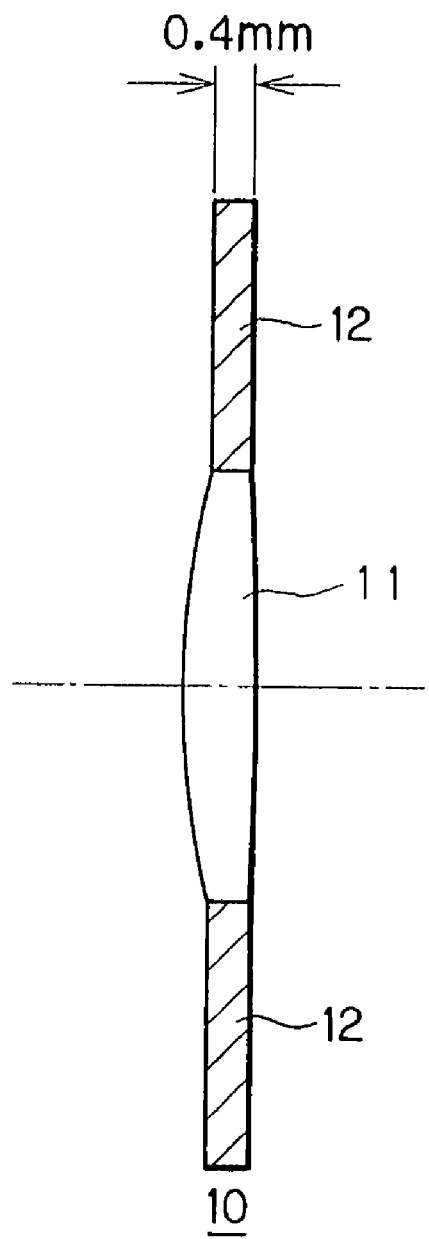
FIG. 53 is illustrative in section of one exemplary one-piece lens used in Example 7-1 of the seventh zoom optical system.

One exemplary one-piece lens 10 used herein is shown in FIG. 53. FIG. 53 is illustrative in section of the double-convex positive lens in the fourth lens group G4, which is configured as a one-piece lens. The second lens blank 12 is 0.4 mm in thickness. Although not shown in FIG. 53, the second lens blank 12 could be processed simultaneously with the formation of a hole or an irregular pattern.

EXAMPLE 7-2

FIG. 48 is illustrative of the zoom optical system of this example, which is made up of, in order from its object side, a first lens group G1, a second lens group G2, an aperture stop S, a third lens group G3 and a fourth lens group G4. Upon zooming from the wide-angle end to the telephoto end of the optical system, the first lens group G1 remains fixed; the second lens group G2 moves toward the image side of the optical system; the aperture stop S moves toward the object side; and both the third and fourth lens groups G3 and G4 move toward the object side while their space becomes wide.

The first lens group G1 generally positive power, and consists of a double-convex positive lens. One aspheric surface is applied to the object-side surface of the double-convex positive lens.

The second lens group G2 has generally negative power, and consists of a double-concave negative lens and a positive meniscus lens concave on its image side. One aspheric surface is applied to the object-side surface of the double-concave negative lens.

The third lens group G3 has positive power, and is composed of, in order from its object side, a double-convex positive lens and a double-concave negative lens. Two aspheric surfaces are used: one at the object-side surface of the double-convex positive lens and another at the image-side surface of the double-concave negative lens.

The fourth lens group G4 has positive power, and consists of a positive meniscus lens concave on its image side. One aspheric surface is applied to the object-side surface of the positive meniscus lens.

The lenses that form the zoom optical system of this example are all one-piece lenses that have been fabricated by the process shown in FIG. 3.

Figure 54:
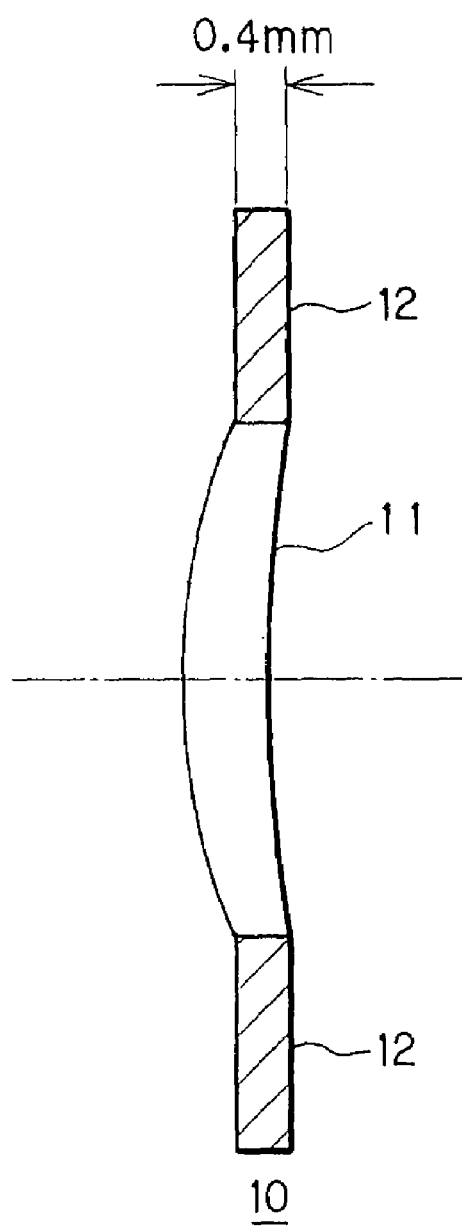
FIG. 54 is illustrative in section of one exemplary one-piece lens used in Example 7-2 of the seventh zoom optical system.
Figure 55:
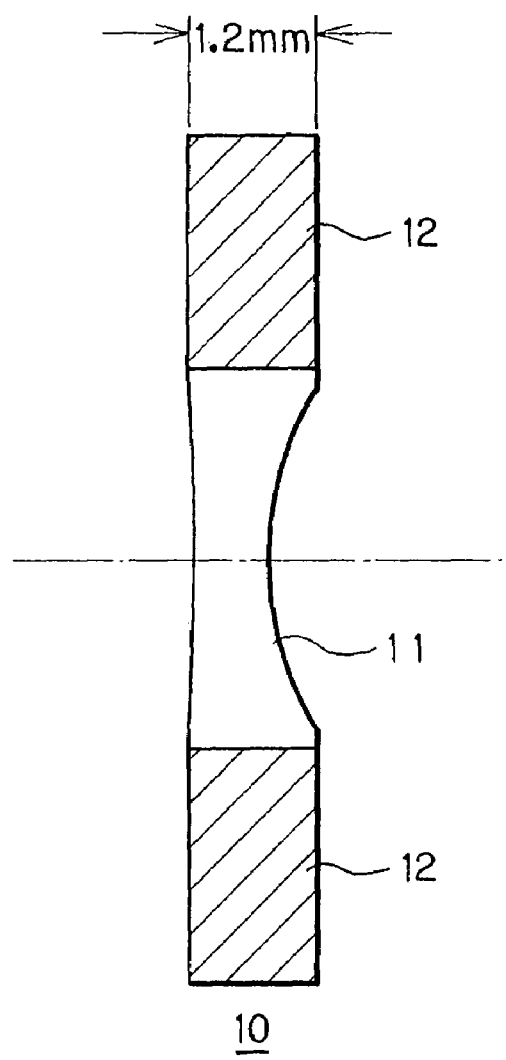
FIG. 55 is illustrative in section of another exemplary one-piece lens used in Example 7-2 of the seventh zoom optical system.

Exemplary one-piece lenses used herein are shown in FIGS. 54 and 55. FIG. 54 is illustrative in section of the positive meniscus lens in the second lens group G2, which is configured as the one-piece lens 10. The second lens blank 12 has a thickness of 0.4 mm. FIG. 55 is illustrative in section of the double-concave negative lens in the third lens group G3, which is configured as a one-piece lens. The second lens blank 12 is 1.2 mm in thickness. Although not shown in FIGS. 54 and 55, the second lens blank 12 could be processed simultaneously with the formation of a hole or an irregular pattern (see FIG. 3).

EXAMPLE 7-3

FIG. 49 is illustrative of the zoom optical system of this example, which is made up of, in order from its object side, a first lens group G1, a second lens group G2, an aperture stop S, a third lens group G3 and a fourth lens group G4. Upon zooming from the wide-angle end to the telephoto end of the optical system, the first lens group G1 remains fixed; the second lens group G2 moves toward the image side of the optical system; the aperture stop S remains fixed; the third lens group G3 moves toward the object side; and the fourth lens group G4 moves in a convex locus toward the object side. It is here noted that the fourth lens group G4 is positioned nearer to the image side at the telephoto end than at the wide-angle end.

The first lens group G1 has generally positive power, and consists of a double-convex positive lens. One aspheric surface is applied to the object-side surface of the double-convex positive lens.

The second lens group G2 has generally negative power, and is composed of, in order from its object side, a double-convex positive lens and a positive meniscus lens concave on its image side. One aspheric surface is applied to the object-side surface of the double-concave negative lens.

The third lens group G3 has positive power, and is composed of, in order from its object side, a double-convex positive lens and a double-concave negative lens. Two aspheric surfaces are used: one at the object-side surface of the double-convex positive lens and another at the image-side surface of the double-concave negative lens.

The fourth lens group G4 has positive power, and consists of a meniscus lens concave on its image side. One aspheric surface is applied to the object-side surface of the positive meniscus lens.

The lenses that form the zoom optical system of this example are all one-piece lenses that have been fabricated by the process illustrated in FIG. 5.

Figure 56:
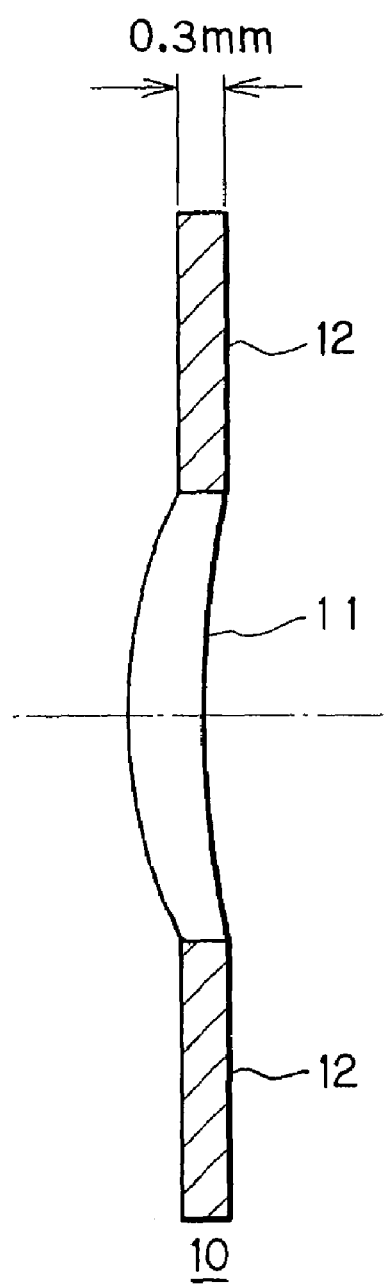
FIG. 56 is illustrative in section of one exemplary one-piece lens used in Example 7-3 of the seventh zoom optical system.

One exemplary one-piece lens 10 used herein is illustrated in FIG. 56. FIG. 56 is illustrative of the positive meniscus lens in the fourth lens group G4, which is configured as a one-piece lens. The second lens blank 12 is 0.3 mm in thickness. Although not shown in FIG. 56, the second lens blank 12 could be processed simultaneously with the formation of a hole or an irregular pattern (see FIG. 3).

The numerical data on each example are now set out. However, it is noted that the symbols used hereinafter but not hereinbefore have the following meanings.

f: focal length of the zoom optical system,
$f_{NO}$: F-number,
ω: half angle of view,
WE: wide-angle end,
ST: intermediate setting,
TE: telephoto end,
$r_1, r_2, \ldots$ : radius of curvature of each lens surface,
$d_1, d_2, \ldots$ : space between adjacent lens surfaces,
$n_{d1}, n_{d2}, \ldots$ : d-line refractive index of each lens, and
$v_{d1}, v_{d2}, \ldots$ : Abbe constant of each lens.

Note that the aspheric shape is given by the following formula, provided that x is an optical axis where the direction of travel of light is taken as positive, and y is a direction orthogonal to the optical axis.

$$x=(y^2/r)/[1+\{1-(K+1)(y/r)^2\}^{1/2}]+A_4y^4+A_6y^6+A_8y^8+A_{10}y^{10}$$

Here r is a paraxial radius of curvature, K is a conical coefficient, and $A_4$, $A_6$, $A_8$ and $A_{10}$ are the $4^{th}$-, $6^{th}$-, $8^{th}$- and $10^{th}$-order aspheric coefficients, respectively.

EXAMPLE 1-1

| | | | |
|---|---|---|---|
| $r_1 = -41.781$ (Aspheric) | $d_1 = 0.60$ | $n_{d1} = 1.80610$ | $v_{d1} = 40.92$ |
| $r_2 = 3.177$ (Aspheric) | $d_2 = 0.66$ | | |
| $r_3 = 6.332$ | $d_3 = 0.62$ | $n_{d2} = 1.84666$ | $v_{d2} = 23.78$ |
| $r_4 = 24.596$ | $d_4 =$ (Variable) | | |
| $r_5 = \infty$ (Stop) | $d_5 = 0.10$ | | |
| $r_6 = 2.662$ (Aspheric) | $d_6 = 0.95$ | $n_{d3} = 1.51633$ | $v_{d3} = 64.14$ |
| $r_7 = -6.827$ | $d_7 = 0.10$ | | |
| $r_8 = 9.099$ | $d_8 = 0.86$ | $n_{d4} = 1.80610$ | $v_{d4} = 40.92$ |
| $r_9 = -2.887$ | $d_9 = 0.61$ | $n_{d5} = 1.68893$ | $v_{d5} = 31.07$ |
| $r_{10} = 3.039$ (Aspheric) | $d_{10} =$ (Variable) | | |
| $r_{11} = \infty$ | $d_{11} = 0.50$ | $n_{d6} = 1.51633$ | $v_{d6} = 64.14$ |
| $r_{12} = \infty$ | | | |

Aspherical Coefficients

1st surface

K = 298.089
$A_4 = -1.32975 \times 10^{-2}$
$A_6 = 2.40059 \times 10^{-3}$
$A_8 = -1.12956 \times 10^{-4}$
$A_{10} = 0$ 2nd surface K = −6.673
$A_4 = 7.26462 \times 10^{-3}$
$A_6 = -2.67280 \times 10^{-3}$
$A_8 = 1.15842 \times 10^{-3}$
$A_{10} = -1.24655 \times 10^{-4}$ 6th surface K = −1.680
$A_4 = 3.59073 \times 10^{-3}$
$A_6 = -9.37097 \times 10^{-4}$
$A_8 = 1.54936 \times 10^{-4}$
$A_{10} = -3.54681 \times 10^{-5}$ 10th surface

K = 1.840

-continued $A_4 = 6.69764 \times 10^{-3}$
$A_6 = 0$
$A_8 = 0$
$A_{10} = 0$

Zooming Data (∞)

|  | WE | ST | TE |
|---|---|---|---|
| f (mm) | 4.4 | 6.23 | 8.78 |
| $F_{NO}$ | 2.8 | 3.3 | 4.1 |
| ω (°) | 33.2 | 22.5 | 15.9 |
| $d_4$ | 3.16 | 1.38 | 0.14 |
| $d_{10}$ | 4.24 | 5.47 | 7.26 |

EXAMPLE 1-2

| | | | |
|---|---|---|---|
| $r_1 = -20.127$ (Aspheric) | $d_1 = 0.60$ | $n_{d1} = 1.67790$ | $v_{d1} = 55.34$ |
| $r_2 = 2.853$ | $d_2 = 1.23$ | | |
| $r_3 = 4.097$ | $d_3 = 0.72$ | $n_{d2} = 1.84666$ | $v_{d2} = 23.78$ |
| $r_4 = 5.809$ | $d_4 =$ (Variable) | | |
| $r_5 = \infty$ (Stop) | $d_5 = 0.10$ | | |
| $r_6 = 2.549$ (Aspheric) | $d_6 = 0.84$ | $n_{d3} = 1.69350$ | $v_{d3} = 53.21$ |
| $r_7 = -3.172$ | $d_7 = 0.60$ | | |
| $r_8 = -9.327$ | $d_8 = 1.04$ | $n_{d4} = 1.80518$ | $v_{d4} = 25.42$ |
| $r_9 = -3.278$ | $d_9 = 0.60$ | $n_{d5} = 1.81474$ | $v_{d5} = 37.03$ |
| $r_{10} = -7.604$ (Aspheric) | $d_{10} =$ (Variable) | | |
| $r_{11} = \infty$ | $d_{11} = 0.50$ | $n_{d6} = 1.51633$ | $v_{d6} = 64.14$ |
| $r_{12} = \infty$ | | | |

Aspherical Coefficients

1st surface

K = −228.497
$A_4 = -1.41365 \times 10^{-3}$
$A_6 = 1.48862 \times 10^{-4}$
$A_8 = -4.35387 \times 10^{-6}$
$A_{10} = 0$
6th surface K = −0.176
$A_4 = -4.34973 \times 10^{-4}$
$A_6 = 1.10461 \times 10^{-4}$
$A_8 = 2.52554 \times 10^{-4}$
$A_{10} = -1.39801 \times 10^{-4}$
10th surface K = −7.497
$A_4 = 1.45179 \times 10^{-2}$
$A_6 = 7.85336 \times 10^{-4}$
$A_8 = 2.70499 \times 10^{-3}$
$A_{10} = -5.60770$ Zooming Data (∞)

|  | WE | ST | TE |
|---|---|---|---|
| f (mm) | 3.0 | 5.2 | 9.0 |
| $F_{NO}$ | 3.5 | 4.5 | 6.3 |
| ω (°) | 50.4 | 26.7 | 15.6 |
| $d_4$ | 5.05 | 1.96 | 0.19 |
| $d_{10}$ | 3.06 | 4.82 | 7.93 |

EXAMPLE 2-1

| | | | |
|---|---|---|---|
| $r_1 = \infty$ (Stop) | $d_1 = 0.55$ | | |
| $r_2 = -2.158$ (Aspheric) | $d_2 = 0.69$ | $n_{d1} = 1.49700$ | $v_{d1} = 81.54$ |
| $r_3 = -2.071$ (Aspheric) | $d_3 = 0.10$ | | |
| $r_4 = 10.989$ | $d_4 = 0.60$ | $n_{d2} = 1.84666$ | $v_{d2} = 23.78$ |
| $r_5 = 4.313$ | $d_5 = 0.12$ | | |
| $r_6 = 4.932$ | $d_6 = 1.16$ | $n_{d3} = 1.51633$ | $v_{d3} = 64.14$ |
| $r_7 = -2.401$ (Aspheric) | $d_7 =$ (Variable) | | |
| $r_8 = -6.483$ | $d_8 = 0.62$ | $n_{d4} = 1.84666$ | $v_{d4} = 23.78$ |
| $r_9 = -3.958$ | $d_9 = 0.79$ | | |
| $r_{10} = -2.597$ (Aspheric) | $d_{10} = 0.60$ | $n_{d5} = 1.80610$ | $v_{d5} = 40.92$ |
| $r_{11} = 61.065$ | $d_{11} =$ (Variable) | | |
| $r_{12} = \infty$ | $d_{12} = 0.50$ | $n_{d6} = 1.51633$ | $v_{d6} = 64.14$ |
| $r_{13} = \infty$ | | | |

Aspherical Coefficients

2nd surface

K = 0.000
$A_4 = -2.84390 \times 10^{-2}$
$A_6 = 9.11709 \times 10^{-3}$
$A_8 = 7.00659 \times 10^{-3}$
$A_{10} = 0$
3rd surface K = −0.894
$A_4 = -6.81547 \times 10^{-3}$
$A_6 = 5.63263 \times 10^{-3}$
$A_8 = 5.81608 \times 10^{-3}$
$A_{10} = 0$
7th surface K = −0.359
$A_4 = -4.65568 \times 10^{-3}$
$A_6 = -1.56716 \times 10^{-3}$
$A_8 = 1.86252 \times 10^{-4}$
$A_{10} = -7.14500 \times 10^{-5}$
10th surface K = −4.566
$A_4 = -2.78392 \times 10^{-2}$
$A_6 = 4.86515 \times 10^{-3}$
$A_8 = -5.40423 \times 10^{-4}$
$A_{10} = 0$ Zooming Data (∞)

|  | WE | ST | TE |
|---|---|---|---|
| f (mm) | 5.5 | 7.8 | 10.9 |
| $F_{NO}$ | 2.8 | 4.0 | 5.5 |
| ω (°) | 25.3 | 18.0 | 13.0 |
| $d_7$ | 1.71 | 0.76 | 0.10 |
| $d_{11}$ | 0.49 | 3.03 | 6.62 |

EXAMPLE 2-2

| | | | |
|---|---|---|---|
| $r_1 = \infty$ (Stop) | $d_1 = 0.61$ | | |
| $r_2 = -2.480$ (Aspheric) | $d_2 = 0.60$ | $n_{d1} = 1.49700$ | $v_{d1} = 81.54$ |
| $r_3 = -2.820$ (Aspheric) | $d_3 = 0.63$ | | |
| $r_4 = 8.606$ | $d_4 = 0.60$ | $n_{d2} = 1.68893$ | $v_{d2} = 31.07$ |
| $r_5 = 2.625$ | $d_5 = 1.24$ | $n_{d3} = 1.58913$ | $v_{d3} = 61.14$ |
| $r_6 = -2.953$ (Aspheric) | $d_6 =$ (Variable) | | |
| $r_7 = -7.436$ | $d_7 = 0.63$ | $n_{d4} = 1.84666$ | $v_{d4} = 23.78$ |
| $r_8 = -4.115$ | $d_8 = 0.73$ | | |
| $r_9 = -2.736$ (Aspheric) | $d_9 = 0.60$ | $n_{d5} = 1.80610$ | $v_{d5} = 40.92$ |
| $r_{10} = 26.678$ | $d_{10} =$ (Variable) | | |
| $r_{11} = \infty$ | $d_{11} = 0.50$ | $n_{d6} = 1.51633$ | $v_{d6} = 64.14$ |
| $r_{12} = \infty$ | | | |

-continued

Aspherical Coefficients

2nd surface

K = 0.000
$A_4 = -5.18890 \times 10^{-3}$
$A_6 = 6.43068 \times 10^{-3}$
$A_8 = 2.08572 \times 10^{-3}$
$A_{10} = 0$ 3rd surface K = −1.389
$A_4 = -3.33499 \times 10^{-4}$
$A_6 = 5.27759 \times 10^{-3}$
$A_8 = 2.05797 \times 10^{-3}$
$A_{10} = 0$ 6th surface K = −0.816
$A_4 = -2.04253 \times 10^{-3}$
$A_6 = -1.18792 \times 10^{-3}$
$A_8 = 3.09456 \times 10^{-4}$
$A_{10} = -7.24211 \times 10^{-5}$ 9th surface K = −3.385
$A_4 = -1.65664 \times 10^{-2}$
$A_6 = 1.45807 \times 10^{-3}$
$A_8 = -8.20014 \times 10^{-5}$
$A_{10} = 0$

| Zooming Data (∞) | | | |
|---|---|---|---|
| | WE | ST | TE |
| f (mm) | 5.5 | 7.78 | 10.96 |
| $F_{NO}$ | 2.8 | 4.0 | 5.6 |
| ω (°) | 25.2 | 18.0 | 12.9 |
| $d_6$ | 1.82 | 0.81 | 0.10 |
| $d_{10}$ | 0.39 | 2.92 | 6.55 |

EXAMPLE 3-1

| | | | |
|---|---|---|---|
| $r_1$ = 12.646 | $d_1$ = 0.60 | $n_{d1}$ = 1.69350 | $v_{d1}$ = 53.21 |
| $r_2$ = 3.067 (Aspheric) | $d_2$ = 1.08 | | |
| $r_3$ = 4.805 | $d_3$ = 0.75 | $n_{d2}$ = 1.84666 | $v_{d2}$ = 23.78 |
| $r_4$ = 7.074 | $d_4$ = (Variable) | | |
| $r_5$ = ∞ (Stop) | $d_5$ = 0.10 | | |
| $r_6$ = 3.743 (Aspheric) | $d_6$ = 0.80 | $n_{d3}$ = 1.67790 | $v_{d3}$ = 55.34 |
| $r_7$ = −15.671 | $d_7$ = 0.89 | | |
| $r_8$ = −5.791 | $d_8$ = 0.60 | $n_{d4}$ = 1.76182 | $v_{d4}$ = 26.52 |
| $r_9$ = 4.399 | $d_9$ = 0.39 | | |
| $r_{10}$ = 14.092 | $d_{10}$ = 0.96 | $n_{d5}$ = 1.78590 | $v_{d5}$ = 44.20 |
| $r_{11}$ = −4.706 | $d_{11}$ = (Variable) | | |
| $r_{12}$ = 5.551 (Aspheric) | $d_{12}$ = 0.80 | $n_{d6}$ = 1.78800 | $v_{d6}$ = 47.37 |
| $r_{13}$ = 6.983 | $d_{13}$ = (Variable) | | |
| $r_{14}$ = ∞ | $d_{14}$ = 0.50 | $n_{d7}$ = 1.51633 | $v_{d7}$ = 64.14 |
| $r_{15}$ = ∞ | | | |

Aspherical Coefficients

2nd surface

K = −1.200
$A_4 = 3.55109 \times 10^{-3}$
$A_6 = 2.56305 \times 10^{-4}$
$A_8 = -2.33716 \times 10^{-5}$
$A_{10} = 2.07830 \times 10^{-6}$ 6th surface K = −0.728
$A_4 = 7.03429 \times 10^{-4}$
$A_6 = -1.42131 \times 10^{-5}$ -continued $A_8 = 5.98131 \times 10^{-5}$
$A_{10} = -1.12393 \times 10^{-5}$ 12th surface K = −3.851
$A_4 = 1.74180 \times 10^{-3}$
$A_6 = 8.82987 \times 10^{-6}$
$A_8 = 0$
$A_{10} = 0$

| Zooming Data (∞) | | | |
|---|---|---|---|
| | WE | ST | TE |
| f (mm) | 4.4 | 6.2 | 8.8 |
| $F_{NO}$ | 2.8 | 3.2 | 4.0 |
| ω (°) | 30.8 | 22.3 | 15.7 |
| $d_4$ | 4.77 | 1.78 | 0.22 |
| $d_{11}$ | 0.10 | 2.61 | 8.22 |
| $d_{13}$ | 4.13 | 3.49 | 0.56 |

EXAMPLE 3-2

| | | | |
|---|---|---|---|
| $r_1$ = −6.951 (Aspheric) | $d_1$ = 0.60 | $n_{d1}$ = 1.67790 | $v_{d1}$ = 55.34 |
| $r_2$ = 6.574 | $d_2$ = 0.64 | $n_{d2}$ = 1.84666 | $v_{d2}$ = 23.78 |
| $r_3$ = 15.485 | $d_3$ = (Variable) | | |
| $r_4$ = ∞ (Stop) | $d_4$ = 0.10 | | |
| $r_5$ = 4.706 (Aspheric) | $d_5$ = 0.69 | $n_{d3}$ = 1.69350 | $v_{d3}$ = 53.21 |
| $r_6$ = −6.848 | $d_6$ = 0.17 | | |
| $r_7$ = 6.792 | $d_7$ = 0.92 | $n_{d4}$ = 1.80610 | $v_{d4}$ = 40.92 |
| $r_8$ = −2.029 | $d_8$ = 0.60 | $n_{d5}$ = 1.68893 | $v_{d5}$ = 31.07 |
| $r_9$ = 2.447 | $d_9$ = (Variable) | | |
| $r_{10}$ = −5.488 | $d_{10}$ = 0.77 | $n_{d6}$ = 1.68893 | $v_{d6}$ = 31.07 |
| $r_{11}$ = −3.434 (Aspheric) | $d_{11}$ = 1.78 | | |
| $r_{12}$ = ∞ | $d_{12}$ = 0.50 | $n_{d7}$ = 1.51633 | $v_{d7}$ = 64.14 |
| $r_{13}$ = ∞ | | | |

Aspherical Coefficients

1st surface

K = −4.615
$A_4 = -1.30227 \times 10^{-3}$
$A_6 = 0$
$A_8 = 0$
$A_{10} = 0$

5th surface

K = −3.406
$A_4 = -3.94764 \times 10^{-3}$
$A_6 = -7.90797 \times 10^{-4}$
$A_8 = 2.03424 \times 10^{-4}$
$A_{10} = -1.31727 \times 10^{-4}$ 11th surface K = −0.035
$A_4 = 3.45595 \times 10^{-3}$
$A_6 = 0$
$A_8 = 0$
$A_{10}$ 0

| Zooming Data (∞) | | | |
|---|---|---|---|
| | WE | ST | TE |
| f (mm) | 4.4 | 6.2 | 8.8 |
| $F_{NO}$ | 2.8 | 3.3 | 4.1 |
| ω (°) | 32.9 | 21.8 | 15.4 |
| $d_3$ | 3.26 | 1.43 | 0.14 |
| $d_9$ | 1.88 | 3.18 | 4.99 |

EXAMPLE 4-1

| | | | |
|---|---|---|---|
| $r_1 = -8.544$ | $d_1 = 0.60$ | $n_{d1} = 1.69350$ | $\nu_{d1} = 53.21$ |
| $r_2 = 5.795$ (Aspheric) | $d_2 = 0.44$ | | |
| $r_3 = 7.279$ | $d_3 = 0.67$ | $n_{d2} = 1.84666$ | $\nu_{d2} = 23.78$ |
| $r_4 = 19.919$ | $d_4 =$ (Variable) | | |
| $r_5 = \infty$ (Stop) | $d_5 = 0.10$ | | |
| $r_6 = 3.655$ (Aspheric) | $d_6 = 1.38$ | $n_{d3} = 1.69350$ | $\nu_{d3} = 53.21$ |
| $r_7 = -14.166$ | $d_7 = 0.10$ | | |
| $r_8 = 9.263$ (Aspheric) | $d_8 = 0.99$ | $n_{d4} = 1.78800$ | $\nu_{d4} = 47.37$ |
| $r_9 = -2.793$ | $d_9 = 0.60$ | $n_{d5} = 1.68893$ | $\nu_{d5} = 31.07$ |
| $r_{10} = 3.038$ | $d_{10} =$ (Variable) | | |
| $r_{11} = 44.064$ | $d_{11} = 1.60$ | $n_{d6} = 1.78800$ | $\nu_{d6} = 47.37$ |
| $r_{12} = -4.323$ | $d_{12} = 0.16$ | | |
| $r_{13} = -3.912$ | $d_{13} = 1.60$ | $n_{d7} = 1.51633$ | $\nu_{d7} = 64.14$ |
| $r_{14} = -18.192$ (Aspheric) | $d_{14} = 0.10$ | | |
| $r_{15} = \infty$ | $d_{15} = 0.50$ | $n_{d8} = 1.51633$ | $\nu_{d8} = 64.14$ |
| $r_{16} = \infty$ | | | |

Aspherical Coefficients

2nd surface $K = -0.856$
$A_4 = -5.31098 \times 10^{-4}$
$A_6 = 2.90922 \times 10^{-4}$
$A_8 = -6.35097 \times 10^{-5}$
$A_{10} = 5.38366 \times 10^{-6}$ 6th surface $K = 0.057$
$A_4 = -2.33967 \times 10^{-4}$
$A_6 = 6.09317 \times 10^{-6}$
$A_8 = 8.12573 \times 10^{-5}$
$A_{10} = -1.66984 \times 10^{-5}$ 8th surface $K = -33.940$
$A_4 = -1.48982 \times 10^{-3}$
$A_6 = -1.35589 \times 10^{-3}$
$A_8 = 0$
$A_{10} = 0$ 14th surface $K = 0.000$
$A_4 = 7.17227 \times 10^{-3}$
$A_6 = -6.23670 \times 10^{-4}$
$A_8 = 0$
$A_{10} = 0$

Zooming Data (∞)

| | WE | ST | TE |
|---|---|---|---|
| f (mm) | 4.4 | 6.2 | 8.8 |
| $F_{NO}$ | 2.8 | 3.3 | 4.1 |
| ω (°) | 33.1 | 22.1 | 15.6 |
| $d_4$ | 3.63 | 1.58 | 0.14 |
| $d_{10}$ | 2.14 | 3.59 | 5.65 |

EXAMPLE 4-2

| | | | |
|---|---|---|---|
| $r_1 = -6.328$ | $d_1 = 0.60$ | $n_{d1} = 1.69350$ | $\nu_{d1} = 53.21$ |
| $r_2 = 3.092$ | $d_2 = 1.03$ | $n_{d2} = 1.81474$ | $\nu_{d2} = 37.03$ |
| $r_3 = 11.872$ | $d_3 =$ (Variable) | | |
| $r_4 = 3.024$ (Aspheric) | $d_4 = 1.08$ | $n_{d3} = 1.69350$ | $\nu_{d3} = 53.21$ |
| $r_5 = 36.382$ | $d_5 = 0.12$ | | |
| $r_6 = \infty$ (Stop) | $d_6 = 0.10$ | | |
| $r_7 = 4.427$ (Aspheric) | $d_7 = 0.99$ | $n_{d4} = 1.78800$ | $\nu_{d4} = 47.37$ |
| $r_8 = -7.290$ | $d_8 = 1.20$ | $n_{d5} = 1.84666$ | $\nu_{d5} = 23.78$ |
| $r_9 = 3.680$ (Aspheric) | $d_9 =$ (Variable) | | |
| $r_{10} = -7.523$ | $d_{10} = 1.20$ | $n_{d6} = 1.80610$ | $\nu_{d6} = 40.92$ |
| $r_{11} = -2.849$ | $d_{11} = 0.16$ | | |
| $r_{12} = -2.632$ | $d_{12} = 1.16$ | $n_{d7} = 1.49700$ | $\nu_{d7} = 81.54$ |
| $r_{13} = -6.396$ (Aspheric) | $d_{13} = 0.79$ | | |
| $r_{14} = \infty$ | $d_{14} = 0.50$ | $n_{d8} = 1.51633$ | $\nu_{d8} = 64.14$ |
| $r_{15} = \infty$ | $d_{15}$ | | |

Aspherical Coefficients

4th surface $K = 0.396$
$A_4 = 2.09373 \times 10^{-3}$
$A_6 = -1.62524 \times 10^{-4}$
$A_8 = 2.20952 \times 10^{-4}$
$A_{10} = -2.31731 \times 10^{-5}$ 7th surface $K = -8.236$
$A_4 = 1.60630 \times 10^{-3}$
$A_6 = -3.38827 \times 10^{-3}$
$A_8 = -3.72604 \times 10^{-4}$
$A_{10} = 0$ 9th surface $K = 0.344$
$A_4 = 8.07095 \times 10^{-3}$
$A_6 = -7.93864 \times 10^{-4}$
$A_8 = 0$
$A_{10} = 0$ 13th surface $K = 0.000$
$A_4 = 3.88351 \times 10^{-3}$
$A_6 = -5.71375 \times 10^{-4}$
$A_8 = 0$
$A_{10} = 0$

Zooming Data (∞)

| | WE | ST | TE |
|---|---|---|---|
| f (mm) | 4.4 | 6.2 | 8.8 |
| $F_{NO}$ | 2.8 | 3.4 | 4.3 |
| ω (°) | 33.5 | 22.2 | 15.8 |
| $d_3$ | 2.76 | 1.21 | 0.10 |
| $d_9$ | 0.65 | 1.78 | 3.33 |

EXAMPLE 5-1

| | | | |
|---|---|---|---|
| $r_1 = -15.253$ (Aspheric) | $d_1 = 0.60$ | $n_{d1} = 1.69350$ | $\nu_{d1} = 53.21$ |
| $r_2 = 4.141$ | $d_2 = 0.96$ | $n_{d2} = 1.68893$ | $\nu_{d2} = 31.07$ |
| $r_3 = 12.214$ (Aspheric) | $d_3 =$ (Variable) | | |
| $r_4 = \infty$ (Stop) | $d_4 = 0.10$ | | |
| $r_5 = 9.919$ (Aspheric) | $d_5 = 0.68$ | $n_{d3} = 1.49700$ | $\nu_{d3} = 81.54$ |
| $r_6 = -11.002$ | $d_6 = 0.10$ | | |
| $r_7 = 3.141$ (Aspheric) | $d_7 = 1.33$ | $n_{d4} = 1.74320$ | $\nu_{d4} = 49.34$ |
| $r_8 = -6.830$ | $d_8 = 0.62$ | $n_{d5} = 1.68893$ | $\nu_{d5} = 31.07$ |
| $r_9 = 3.671$ (Aspheric) | $d_9 =$ (Variable) | | |
| $r_{10} = 11.080$ | $d_{10} = 1.06$ | $n_{d6} = 1.68893$ | $\nu_{d6} = 31.07$ |
| $r_{11} = 3.943$ (Aspheric) | $d_{11} =$ (Variable) | | |
| $r_{12} = -13.947$ | $d_{12} = 1.11$ | $n_{d7} = 1.68893$ | $\nu_{d7} = 31.07$ |
| $r_{13} = -4.584$ (Aspheric) | $d_{13} = 1.69$ | | |
| $r_{14} = \infty$ | $d_{14} = 0.50$ | $n_{d8} = 1.51633$ | $\nu_{d8} = 64.14$ |
| $r_{15} = \infty$ | | | |

Aspherical Coefficients

1st surface $K = 19.399$
$A_4 = -9.52491 \times 10^{-4}$

-continued $A_6 = 4.99000 \times 10^{-5}$
$A_8 = 1.01862 \times 10^{-5}$
$A_{10} = 0$
3rd surface $K = -14.812$
$A_4 = -8.97149 \times 10^{-4}$
$A_6 = 4.01691 \times 10^{-6}$
$A_8 = 1.68687 \times 10^{-5}$
$A_{10} = 0$
5th surface $K = 19.348$
$A_4 = -4.82828 \times 10^{-3}$
$A_6 = 8.06209 \times 10^{-4}$
$A_8 = -1.99532 \times 10^{-4}$
$A_{10} = 0$
7th surface $K = -1.011$
$A_4 = 7.47480 \times 10^{-3}$
$A_6 = -2.60867 \times 10^{-4}$
$A_8 = 8.69323 \times 10^{-5}$
$A_{10} = 0$
9th surface $K = -9.730$
$A_4 = 3.91180 \times 10^{-2}$
$A_6 = -4.30584 \times 10^{-3}$
$A_8 = 1.54137 \times 10^{-3}$
$A_{10} = 0$
11th surface $K = -5.280$
$A_4 = 1.20789 \times 10^{-2}$
$A_6 = -8.05017 \times 10^{-4}$
$A_8 = 1.88007 \times 10^{-6}$
$A_{10} = 0$
13th surface $K = -1.512$
$A_4 = 1.20543 \times 10^{-4}$
$A_6 = -1.73187 \times 10^{-4}$
$A_8 = 5.42052 \times 10^{-6}$
$A_{10} = 0$

| | Zooming Data ($\infty$) | | |
|---|---|---|---|
| | WE | ST | TE |
| f (mm) | 4.7 | 7.6 | 13.0 |
| $F_{NO}$ | 2.8 | 3.8 | 5.1 |
| $\omega$ (°) | 30.3 | 18.1 | 10.7 |
| $d_3$ | 5.47 | 2.88 | 0.18 |
| $d_9$ | 0.74 | 0.35 | 1.39 |
| $d_{11}$ | 0.74 | 3.72 | 5.38 |

EXAMPLE 5-2

| $r_1 = -8.395$ (Aspheric) | $d_1 = 0.60$ | $n_{d1} = 1.67790$ | $\nu_{d1} = 55.34$ |
|---|---|---|---|
| $r_2 = 4.439$ | $d_2 = 0.98$ | $n_{d2} = 1.68893$ | $\nu_{d2} = 31.07$ |
| $r_3 = 21.458$ (Aspheric) | $d_3 = $ (Variable) | | |
| $r_4 = \infty$ (Stop) | $d_4 = 0.08$ | | |
| $r_5 = 13.194$ (Aspheric) | $d_5 = 0.65$ | $n_{d3} = 1.49700$ | $\nu_{d3} = 81.54$ |
| $r_6 = -10.912$ | $d_6 = 0.19$ | | |
| $r_7 = 2.999$ (Aspheric) | $d_7 = 1.34$ | $n_{d4} = 1.74320$ | $\nu_{d4} = 49.34$ |
| $r_8 = -5.935$ | $d_8 = 0.60$ | $n_{d5} = 1.68893$ | $\nu_{d5} = 31.07$ |
| $r_9 = 3.541$ (Aspheric) | $d_9 = $ (Variable) | | |
| $r_{10} = -54.527$ | $d_{10} = 0.60$ | $n_{d6} = 1.68893$ | $\nu_{d6} = 31.07$ |
| $r_{11} = 6.260$ (Aspheric) | $d_{11} = $ (Variable) | | |
| $r_{12} = 30.988$ | $d_{12} = 1.48$ | $n_{d7} = 1.68893$ | $\nu_{d7} = 31.07$ |
| $r_{13} = -5.446$ (Aspheric) | $d_{13} = 1.00$ | | |
| $r_{14} = \infty$ | $d_{14} = 0.50$ | $n_{d8} = 1.51633$ | $\nu_{d8} = 64.14$ |
| $r_{15} = \infty$ | | | |

| Aspherical Coefficients |
|---|

1st surface $K = 0.576$
$A_4 = -6.63222 \times 10^{-4}$
$A_6 = 5.19142 \times 10^{-5}$
$A_8 = 3.41858 \times 10^{-6}$
$A_{10} = 0$
3rd surface $K = -31.443$
$A_4 = -4.24448 \times 10^{-4}$
$A_6 = -2.32455 \times 10^{-7}$
$A_8 = 1.82275 \times 10^{-5}$
$A_{10} = 0$
5th surface $K = 32.850$
$A_4 = -2.19377 \times 10^{-3}$
$A_6 = -7.72833 \times 10^{-5}$
$A_8 = 7.53132 \times 10^{-6}$
$A_{10} = 0$
7th surface $K = -1.055$
$A_4 = 7.33888 \times 10^{-3}$
$A_6 = 4.41996 \times 10^{-4}$
$A_8 = -1.81717 \times 10^{-5}$
$A_{10} = 0$
9th surface $K = -10.179$
$A_4 = 4.50999 \times 10^{-2}$
$A_6 = -4.61578 \times 10^{-3}$
$A_8 = 1.84744 \times 10^{-3}$
$A_{10} = 0$
11th surface $K = -24.461$
$A_4 = 1.24411 \times 10^{-2}$
$A_6 = -2.06313 \times 10^{-3}$
$A_8 = 1.94143 \times 10^{-4}$
$A_{10} = 0$
13th surface $K = -11.947$
$A_4 = -4.12632 \times 10^{-3}$
$A_6 = 2.43311 \times 10^{-4}$
$A_8 = -7.32948 \times 10^{-6}$
$A_{10} = 0$

| | Zooming Data ($\infty$) | | |
|---|---|---|---|
| | WE | ST | TE |
| f (mm) | 4.7 | 7.6 | 13.0 |
| $F_{NO}$ | 2.8 | 3.8 | 5.0 |
| $\omega$ (°) | 31.6 | 18.2 | 10.6 |
| $d_3$ | 6.04 | 3.32 | 0.55 |
| $d_9$ | 1.34 | 1.32 | 2.66 |
| $d_{11}$ | 1.76 | 4.49 | 5.93 |

EXAMPLE 6-1

| $r_1 = -235.855$ | $d_1 = 0.60$ | $n_{d1} = 1.69350$ | $\nu_{d1} = 53.21$ |
|---|---|---|---|
| $r_2 = 3.549$ (Aspheric) | $d_2 = 1.59$ | | |
| $r_3 = 6.625$ | $d_3 = 0.91$ | $n_{d2} = 1.84666$ | $\nu_{d2} = 23.78$ |
| $r_4 = 12.436$ | $d_4 = $ (Variable) | | |
| $r_5 = \infty$ (Stop) | $d_5 = 0.10$ | | |

-continued

| | | | |
|---|---|---|---|
| $r_6 = 3.797$ (Aspheric) | $d_6 = 1.06$ | $n_{d3} = 1.69350$ | $\nu_{d3} = 53.21$ |
| $r_7 = -17.794$ | $d_7 = 0.10$ | | |
| $r_8 = 7.931$ (Aspheric) | $d_8 = 0.78$ | $n_{d4} = 1.78800$ | $\nu_{d4} = 47.37$ |
| $r_9 = -4.713$ | $d_9 = 0.60$ | $n_{d5} = 1.68893$ | $\nu_{d5} = 31.07$ |
| $r_{10} = 2.574$ | $d_{10}$ = (Variable) | | |
| $r_{11} = 4.259$ | $d_{11} = 0.66$ | $n_{d6} = 1.49700$ | $\nu_{d6} = 81.54$ |
| $r_{12} = 6.233$ (Aspheric) | $d_{12}$ = (Variable) | | |
| $r_{13} = \infty$ | $d_{13} = 0.79$ | $n_{d7} = 1.74320$ | $\nu_{d7} = 49.34$ |
| $r_{14} = -8.029$ (Aspheric) | $d_{14}$ = (Variable) | | |
| $r_{15} = \infty$ | $d_{15} = 0.50$ | $n_{d8} = 1.51633$ | $\nu_{d8} = 64.14$ |
| $r_{16} = \infty$ | | | |

Aspherical Coefficients

2nd surface $K = -0.565$
$A_4 = -1.29926 \times 10^{-4}$
$A_6 = 1.05590 \times 10^{-4}$
$A_8 = -7.93901 \times 10^{-6}$
$A_{10} = 2.72375 \times 10^{-7}$ 6th surface $K = -0.137$
$A_4 = -1.31726 \times 10^{-3}$
$A_6 = -1.41891 \times 10^{-4}$
$A_8 = 6.88204 \times 10^{-5}$
$A_{10} = -1.74013 \times 10^{-5}$ 8th surface $K = -1.367$
$A_4 = -1.60327 \times 10^{-3}$
$A_6 = -1.35433 \times 10^{-4}$
$A_8 = 0$
$A_{10} = 0$ 12th surface $K = 0.000$
$A_4 = 1.72530 \times 10^{-3}$
$A_6 = 2.23148 \times 10^{-5}$
$A_8 = 0$
$A_{10} = 0$ 14th surface $K = -14.842$
$A_4 = -1.74997 \times 10^{-4}$
$A_6 = 2.64295 \times 10^{-6}$
$A_8 = 0$
$A_{10} = 0$ Zooming Data (∞)

| | WE | ST | TE |
|---|---|---|---|
| f (mm) | 3.0 | 5.2 | 9.0 |
| $F_{NO}$ | 2.8 | 3.7 | 5.3 |
| ω (°) | 45.5 | 25.7 | 15.3 |
| $d_4$ | 7.91 | 3.24 | 0.91 |
| $d_{10}$ | 0.24 | 2.88 | 6.07 |
| $d_{12}$ | 2.12 | 2.25 | 4.11 |
| $d_{14}$ | 1.01 | 1.07 | 0.18 |

EXAMPLE 6-2

| | | | |
|---|---|---|---|
| $r_1 = \infty$ | $d_1 = 0.60$ | $n_{d1} = 1.51633$ | $\nu_{d1} = 64.14$ |
| $r_2 = 2.950$ (Aspheric) | $d_2 = 2.52$ | | |
| $r_3 = 5.433$ | $d_3 = 0.80$ | $n_{d2} = 1.84666$ | $\nu_{d2} = 23.78$ |
| $r_4 = 6.933$ | $d_4$ = (Variable) | | |
| $r_5 = \infty$ (Stop) | $d_5 = 0.10$ | | |
| $r_6 = 3.215$ (Aspheric) | $d_6 = 0.81$ | $n_{d3} = 1.58313$ | $\nu_{d3} = 59.38$ |
| $r_7 = -88.640$ | $d_7 = 0.10$ | | |
| $r_8 = 5.867$ (Aspheric) | $d_8 = 0.74$ | $n_{d4} = 1.78800$ | $\nu_{d4} = 47.37$ |

-continued

| | | | |
|---|---|---|---|
| $r_9 = -8.024$ | $d_9 = 0.60$ | $n_{d5} = 1.68893$ | $\nu_{d5} = 31.07$ |
| $r_{10} = 2.566$ | $d_{10}$ = (Variable) | | |
| $r_{11} = 7.991$ | $d_{11} = 0.60$ | $n_{d6} = 1.49700$ | $\nu_{d6} = 81.54$ |
| $r_{12} = 27.210$ (Aspheric) | $d_{12}$ = (Variable) | | |
| $r_{13} = -29.417$ | $d_{13} = 0.99$ | $n_{d7} = 1.49700$ | $\nu_{d7} = 81.54$ |
| $r_{14} = -5.069$ (Aspheric) | $d_{14}$ = (Variable) | | |
| $r_{15} = \infty$ | $d_{15} = 0.50$ | $n_{d8} = 1.51633$ | $\nu_{d8} = 64.14$ |
| $r_{16} = \infty$ | | | |

Aspherical Coefficients

2nd surface $K = -0.893$
$A_4 = 1.45261 \times 10^{-3}$
$A_6 = 1.41038 \times 10^{-4}$
$A_8 = -7.01509 \times 10^{-6}$
$A_{10} = 4.11221 \times 10^{-7}$ 6th surface $K = 0.128$
$A_4 = 1.53677 \times 10^{-5}$
$A_6 = -8.68099 \times 10^{-5}$
$A_8 = 2.50336 \times 10^{-4}$
$A_{10} = -3.99233 \times 10^{-5}$ 8th surface $K = -2.777$
$A_4 = -2.28635 \times 10^{-3}$
$A_6 = -5.33394 \times 10^{-4}$
$A_8 = -1.51884 \times 10^{-4}$
$A_{10} = 0$ 12th surface $K = 0.000$
$A_4 = 2.30056 \times 10^{-3}$
$A_6 = -1.45665 \times 10^{-4}$
$A_8 = 2.87717 \times 10^{-5}$
$A_{10} = 0$ 14th surface $K = -2.859$
$A_4 = -1.27245 \times 10^{-4}$
$A_6 = -4.60322 \times 10^{-5}$
$A_8 = -3.26441 \times 10^{-6}$
$A_{10} = 0$ Zooming Data (∞)

| | WE | ST | TE |
|---|---|---|---|
| f (mm) | 3.0 | 5.2 | 9.0 |
| $F_{NO}$ | 2.8 | 3.3 | 5.4 |
| ω (°) | 43.9 | 25.8 | 15.8 |
| $d_4$ | 7.57 | 1.59 | 0.74 |
| $d_{10}$ | 0.37 | 0.66 | 3.80 |
| $d_{12}$ | 1.44 | 1.79 | 6.68 |
| $d_{14}$ | 1.96 | 3.15 | 0.10 |

EXAMPLE 6-3

| | | | |
|---|---|---|---|
| $r_1 = -39.641$ | $d_1 = 0.60$ | $n_{d1} = 1.69350$ | $\nu_{d1} = 53.21$ |
| $r_2 = 3.758$ (Aspheric) | $d_2 = 1.62$ | | |
| $r_3 = 7.085$ | $d_3 = 0.83$ | $n_{d2} = 1.84666$ | $\nu_{d2} = 23.78$ |
| $r_4 = 13.743$ | $d_4$ = (Variable) | | |
| $r_5 = \infty$ (Stop) | $d_5 = 0.10$ | | |
| $r_6 = 3.644$ (Aspheric) | $d_6 = 1.36$ | $n_{d3} = 1.69350$ | $\nu_{d3} = 53.21$ |
| $r_7 = -23.518$ | $d_7 = 0.10$ | | |
| $r_8 = 8.588$ (Aspheric) | $d_8 = 0.82$ | $n_{d4} = 1.78800$ | $\nu_{d4} = 47.37$ |
| $r_9 = -3.659$ | $d_9 = 0.60$ | $n_{d5} = 1.68893$ | $\nu_{d5} = 31.07$ |
| $r_{10} = 2.800$ | $d_{10}$ = (Variable) | | |

-continued

| | | | |
|---|---|---|---|
| $r_{11}$ = 4.441 | $d_{11}$ = 1.29 | $n_{d6}$ = 1.49700 | $v_{d6}$ = 81.54 |
| $r_{12}$ = 4.321 (Aspheric) | $d_{12}$ = (Variable) | | |
| $r_{13}$ = 5.613 | $d_{13}$ = 1.20 | $n_{d7}$ = 1.69350 | $v_{d7}$ = 53.21 |
| $r_{14}$ = 556.044 (Aspheric) | $d_{14}$ = 0.22 | | |
| $r_{15}$ = ∞ | $d_{15}$ = 0.50 | $n_{d8}$ = 1.51633 | $v_{d8}$ = 64.14 |
| $r_{16}$ = ∞ | | | |

Aspherical Coefficients

2nd surface

K = −0.730
$A_4$ = 1.40877 × 10$^{-6}$
$A_6$ = 1.25212 × 10$^{-4}$
$A_8$ = −9.63026 × 10$^{-6}$
$A_{10}$ = 3.57391 × 10$^{-7}$

6th surface

K = 0.181
$A_4$ = −3.50134 × 10$^{-4}$
$A_6$ = −9.65305 × 10$^{-5}$
$A_8$ = 1.52691 × 10$^{-4}$
$A_{10}$ = −3.81912 × 10$^{-5}$

8th surface

K = −19.376
$A_4$ = −1.33804 × 10$^{-3}$
$A_6$ = −1.00926 × 10$^{-3}$
$A_8$ = 0
$A_{10}$ = 0

12th surface

K = 0.000
$A_4$ = −1.98092 × 10$^{-4}$
$A_6$ = 1.58372 × 10$^{-4}$
$A_8$ = 0
$A_{10}$ = 0

14th surface

K = 0.000
$A_4$ = 4.78191 × 10$^{-3}$
$A_6$ = −3.69614 × 10$^{-4}$
$A_8$ = 0
$A_{10}$ = 0

Zooming Data (∞)

| | WE | ST | TE |
|---|---|---|---|
| f (mm) | 3.0 | 5.2 | 9.0 |
| $F_{NO}$ | 2.8 | 3.7 | 5.2 |
| ω (°) | 46.4 | 25.8 | 14.8 |
| $d_4$ | 7.08 | 2.79 | 0.22 |
| $d_{10}$ | 0.23 | 4.07 | 6.51 |
| $d_{12}$ | 1.91 | 0.90 | 2.49 |

EXAMPLE 7-1

| | | | |
|---|---|---|---|
| $r_1$ = 16.444 (Aspheric) | $d_1$ = 1.11 | $n_{d1}$ = 1.49700 | $v_{d1}$ = 81.54 |
| $r_2$ = −10.268 | $d_2$ = (Variable) | | |
| $r_3$ = −6.588 (Aspheric) | $d_3$ = 0.60 | $n_{d2}$ = 1.81600 | $v_{d2}$ = 46.62 |
| $r_4$ = 4.660 | $d_4$ = 0.81 | $n_{d3}$ = 1.84666 | $v_{d3}$ = 23.78 |
| $r_5$ = 10.739 | $d_5$ = (Variable) | | |
| $r_6$ = ∞ (Stop) | $d_6$ = (Variable) | | |
| $r_7$ = 2.889 (Aspheric) | $d_7$ = 1.73 | $n_{d4}$ = 1.72916 | $v_{d4}$ = 54.68 |
| $r_8$ = −6.939 | $d_8$ = 0.10 | | |
| $r_9$ = −296.907 | $d_9$ = 1.00 | $n_{d5}$ = 1.84666 | $v_{d5}$ = 23.78 |
| $r_{10}$ = 2.764 (Aspheric) | $d_{10}$ = (Variable) | | |
| $r_{11}$ = 10.958 (Aspheric) | $d_{11}$ = 0.69 | $n_{d6}$ = 1.84666 | $v_{d6}$ = 23.78 |
| $r_{12}$ = −38.512 | $d_{12}$ = (Variable) | | |
| $r_{13}$ = ∞ | $d_{13}$ = 0.50 | $n_{d7}$ = 1.51633 | $v_{d7}$ = 64.14 |
| $r_{14}$ = ∞ | | | |

-continued

Aspherical Coefficients

1st surface

K = 0.000
$A_4$ = −3.90951 × 10$^{-4}$
$A_6$ = −1.51396 × 10$^{-5}$
$A_8$ = −1.67063 × 10$^{-7}$
$A_{10}$ = 0

3rd surface

K = −8.941
$A_4$ = −2.25798 × 10$^{-3}$
$A_6$ = 1.84228 × 10$^{-4}$
$A_8$ = −6.78364 × 10$^{-6}$
$A_{10}$ = 0

7th surface

K = 0.149
$A_4$ = −5.76087 × 10$^{-3}$
$A_6$ = −3.03438 × 10$^{-4}$
$A_8$ = −1.86281 × 10$^{-4}$
$A_{10}$ = 1.78319 × 10$^{-5}$

10th surface

K = −0.789
$A_4$ = 1.46423 × 10$^{-2}$
$A_6$ = 1.70602 × 10$^{-3}$
$A_8$ = −1.02432 × 10$^{-4}$
$A_{10}$ = 0

11th surface

K = −1.302
$A_4$ = 1.42750 × 10$^{-3}$
$A_6$ = 3.40229 × 10$^{-5}$
$A_8$ = −3.10139 × 10$^{-6}$
$A_{10}$ = 0

Zooming Data (∞)

| | WE | ST | TE |
|---|---|---|---|
| f (mm) | 4.4 | 7.6 | 13.2 |
| $F_{NO}$ | 2.8 | 3.3 | 4.3 |
| ω (°) | 33.4 | 17.9 | 10.5 |
| $d_2$ | 0.21 | 1.63 | 3.00 |
| $d_5$ | 4.45 | 1.68 | 0.16 |
| $d_6$ | 1.86 | 1.55 | 0.10 |
| $d_{10}$ | 0.36 | 1.53 | 2.25 |
| $d_{12}$ | 3.24 | 3.73 | 4.61 |

EXAMPLE 7-2

| | | | |
|---|---|---|---|
| $r_1$ = 12.875 (Aspheric) | $d_1$ = 1.22 | $n_{d1}$ = 1.49700 | $v_{d1}$ = 81.54 |
| $r_2$ = −11.898 | $d_2$ = (Variable) | | |
| $r_3$ = −6.694 (Aspheric) | $d_3$ = 0.60 | $n_{d2}$ = 1.81600 | $v_{d2}$ = 46.62 |
| $r_4$ = 4.386 | $d_4$ = 0.38 | | |
| $r_5$ = 5.629 | $d_5$ = 0.78 | $n_{d3}$ = 1.84666 | $v_{d3}$ = 23.78 |
| $r_6$ = 15.581 | $d_6$ = (Variable) | | |
| $r_7$ = ∞ (Stop) | $d_7$ = (Variable) | | |
| $r_8$ = 2.890 (Aspheric) | $d_8$ = 2.00 | $n_{d4}$ = 1.72916 | $v_{d4}$ = 54.68 |
| $r_9$ = −7.475 | $d_9$ = 0.10 | | |
| $r_{10}$ = −40.151 | $d_{10}$ = 0.60 | $n_{d5}$ = 1.84666 | $v_{d5}$ = 23.78 |
| $r_{11}$ = 3.043 (Aspheric) | $d_{11}$ = (Variable) | | |
| $r_{12}$ = 8.251 (Aspheric) | $d_{12}$ = 0.65 | $n_{d6}$ = 1.84666 | $v_{d6}$ = 23.78 |
| $r_{13}$ = 110.712 | $d_{13}$ = (Variable) | | |
| $r_{14}$ = ∞ | $d_{14}$ = 0.50 | $n_{d7}$ = 1.51633 | $v_{d7}$ = 64.14 |
| $r_{15}$ = ∞ | | | |

-continued

Aspherical Coefficients

1st surface

K = 0.000
$A_4 = -2.87331 \times 10^{-4}$
$A_6 = -1.36425 \times 10^{-5}$
$A_8 = -2.10759 \times 10^{-7}$
$A_{10} = 0$ 3rd surface K = -6.859
$A_4 = -6.46103 \times 10^{-4}$
$A_6 = 6.43816 \times 10^{-5}$
$A_8 = -2.35771 \times 10^{-6}$
$A_{10} = 0$ 8th surface K = 0.202
$A_4 = -4.23004 \times 10^{-3}$
$A_6 = -5.62239 \times 10^{-4}$
$A_8 = 1.16888 \times 10^{-5}$
$A_{10} = -2.46485 \times 10^{-5}$ 11th surface K = -0.930
$A_4 = 1.38536 \times 10^{-2}$
$A_6 = 1.65230 \times 10^{-3}$
$A_8 = 1.48060 \times 10^{-4}$
$A_{10} = 0$ 12th surface K = -4.825
$A_4 = 1.27515 \times 10^{-3}$
$A_6 = 1.23670 \times 10^{-4}$
$A_8 = -2.14636 \times 10^{-5}$
$A_{10} = 0$ Zooming Data (∞)

| | WE | ST | TE |
|---|---|---|---|
| f (mm) | 4.4 | 7.6 | 13.2 |
| $F_{NO}$ | 2.8 | 3.5 | 4.1 |
| ω (°) | 33.0 | 17.9 | 10.5 |
| $d_2$ | 0.25 | 1.67 | 2.81 |
| $d_6$ | 5.38 | 3.17 | 0.15 |
| $d_7$ | 1.16 | 0.15 | 0.10 |
| $d_{11}$ | 0.30 | 1.42 | 2.02 |
| $d_{13}$ | 3.87 | 4.53 | 5.87 |

EXAMPLE 7-3

| | | | |
|---|---|---|---|
| $r_1$ = 11.725 (Aspheric) | $d_1$ = 1.09 | $n_{d1}$ = 1.49700 | $v_{d1}$ = 81.54 |
| $r_2$ = -16.531 | $d_2$ = (Variable) | | |
| $r_3$ = -8.820 (Aspheric) | $d_3$ = 0.60 | $n_{d2}$ = 1.81600 | $v_{d2}$ = 46.62 |
| $r_4$ = 4.699 | $d_4$ = 0.42 | | |
| $r_5$ = 5.723 | $d_5$ = 0.74 | $n_{d3}$ = 1.84666 | $v_{d3}$ = 23.78 |
| $r_6$ = 13.620 | $d_6$ = (Variable) | | |
| $r_7$ = ∞ (Stop) | $d_7$ = (Variable) | | |
| $r_8$ = 3.020 (Aspheric) | $d_8$ = 1.71 | $n_{d4}$ = 1.72916 | $v_{d4}$ = 54.68 |
| $r_9$ = -7.650 | $d_9$ = 0.10 | | |
| $r_{10}$ = -55.896 | $d_{10}$ = 0.89 | $n_{d5}$ = 1.84666 | $v_{d5}$ = 23.78 |
| $r_{11}$ = 3.002 (Aspheric) | $d_{11}$ = (Variable) | | |
| $r_{12}$ = 5.067 (Aspheric) | $d_{12}$ = 0.80 | $n_{d6}$ = 1.84666 | $v_{d6}$ = 23.78 |
| $r_{13}$ = 12.083 | $d_{13}$ = (Variable) | | |
| $r_{14}$ = ∞ | $d_{14}$ = 0.50 | $n_{d7}$ = 1.51633 | $v_{d7}$ = 64.14 |
| $r_{15}$ = ∞ | | | |

Aspherical Coefficients

1st surface

K = 0.000
$A_4 = -1.66609 \times 10^{-4}$
$A_6 = -2.74210 \times 10^{-6}$
$A_8 = -1.85730 \times 10^{-7}$
$A_{10} = 0$ 3rd surface K = -12.939
$A_4 = -1.39316 \times 10^{-3}$
$A_6 = 9.75592 \times 10^{-5}$
$A_8 = -2.56373 \times 10^{-6}$
$A_{10} = 0$ 8th surface K = -0.005
$A_4 = -3.06313 \times 10^{-3}$
$A_6 = -2.32293 \times 10^{-4}$
$A_8 = -7.53412 \times 10^{-5}$
$A_{10} = 3.30742 \times 10^{-6}$ 11th surface K = -1.189
$A_4 = 1.28018 \times 10^{-2}$
$A_6 = 1.75616 \times 10^{-3}$
$A_8 = -7.21525 \times 10^{-5}$
$A_{10} = 0$ 12th surface K = -4.764
$A_4 = 3.80909 \times 10^{-3}$
$A_6 = -1.52897 \times 10^{-4}$
$A_8 = 5.78542 \times 10^{-6}$
$A_{10} = 0$ Zooming Data (∞)

| | WE | ST | TE |
|---|---|---|---|
| f (mm) | 4.4 | 7.6 | 13.2 |
| $F_{NO}$ | 2.8 | 3.4 | 3.9 |
| ω (°) | 34.3 | 17.9 | 10.4 |
| $d_2$ | 0.24 | 2.31 | 4.55 |
| $d_6$ | 4.46 | 2.39 | 0.15 |
| $d_7$ | 2.61 | 1.19 | 0.10 |
| $d_{11}$ | 0.25 | 1.54 | 3.28 |
| $d_{13}$ | 3.31 | 3.45 | 2.80 |

Set out below are the values of conditions (2A) and (3A) in Examples 1-1 and 1-2.

| | Example 1-1 | Example 1-2 |
|---|---|---|
| Condition (2A) | 2.85 | 5.36 |
| Condition (3A) | | |
| (Object-Side Lens) | 1.16 | 0.68 |
| (Image-Side Lens) | 1.03 | — |

Set out below are the values of conditions (2B) and (3B) in Examples 2-1 and 2-2.

| | Example 2-1 | Example 2-2 |
|---|---|---|
| Condition (2B) | 2.85 | 5.36 |
| Condition (3B) | | |
| (Object-Side Lens) | 1.16 | 0.68 |
| (Image-Side Lens) | 1.03 | — |

Set out below are the values of conditions (2C), (3C) and (4C) in Examples 3-1 and 3-2.

|  | Example 3-1 | Example 3-2 |
| --- | --- | --- |
| Condition (2C) | 6.08 | 3.95 |
| Condition (3C) |  |  |
| (Object-Side Lens) | 1.43 | 1.13 |
| (Image-Side Lens) | 1.89 | 0.78 |
| Condition (4C) | 12.05 | 4.34 |

Set out below are the values of conditions (2C), (3C) and (4C) in Examples 3-1 and 3-2.

|  | Example 3-1 | Example 3-2 |
| --- | --- | --- |
| Condition (2C) | 6.08 | 3.95 |
| Condition (3C) |  |  |
| (Object-Side Lens) | 1.43 | 1.13 |
| (Image-Side Lens) | 1.89 | 0.78 |
| Condition (4C) | 12.05 | 4.34 |

Set out below are the values of conditions (2D), (3D) and (4D) in Examples 4-1 and 4-2.

|  | Example 4-1 | Example 4-2 |
| --- | --- | --- |
| Condition (2C) | 4.17 | 2.38 |
| Condition (3D) |  |  |
| (Object-Side Lens) | 2.32 | 2.11 |
| (Image-Side Lens) | 1.17 | 1.50 |
| Condition (4D) | 3.50 | 3.07 |

Set out below are the values of conditions (2E), (3E) and (5E) in Examples 5-1 and 5-2.

|  | Example 5-1 | Example 5-2 |
| --- | --- | --- |
| Condition (2E) | 3.63 | 3.26 |
| Condition (3E) |  |  |
| (Object-Side Lens) | 2.36 | 2.55 |
| (Image-Side Lens) | 1.60 | 1.48 |
| Condition (5E) | 4.56 | 4.01 |

Set out below are the values of conditions (2F), (3F), (4F) and 5(F) in Examples 6-1, 6-2 and 6-3.

|  | Ex. 6-1 | Ex. 6-2 | Ex. 6-3 |
| --- | --- | --- | --- |
| Condition (2F) | 6.98 | 10.65 | 6.57 |
| Condition (3F) |  |  |  |
| (Object-Side Lens) | 1.94 | 1.59 | 2.50 |
| (Image-Side Lens) | 1.28 | 1.39 | 1.17 |
| Condition (4F) | 6.40 | 4.58 | 202.83 |
| Condition (5F) | 3.62 | 4.10 | 4.03 |

Set out below are the values of conditions (2G), (3G), (4G) and 5(G) in Examples 7-1, 7-2 and 7-3.

|  | Ex. 7-1 | Ex. 7-2 | Ex. 7-3 |
| --- | --- | --- | --- |
| Condition (2G) | 4.59 | 4.96 | 4.92 |
| Condition (3G) | 3.62 | 3.72 | 3.97 |
| Condition (4G) | 1.96 | 2.30 | 2.06 |
| Condition (5G) | 3.15 | 3.12 | 3.81 |

By the way, although glass is used for all the lenses in the zoom optical systems according to the above example, it is acceptable to use a plastic material for them. With the use of resinous materials for lenses, it is possible to easily mass-fabricate them by molding processes for the resinous materials. Expensive resinous materials make it possible to achieve expensive optical systems.

It is also acceptable to use organic-inorganic composite materials in place of glass. Organic-inorganic composite materials usable herein are now explained.

In an organic-inorganic composite material, an organic component and an inorganic component are mixed together into a composite material at a molecular level or a nano-scale. Some available forms include (1) a structure wherein a polymeric matrix comprising an organic skeleton and a matrix comprising an inorganic skeleton are entangled together and penetrated into each other, (2) a structure wherein inorganic fine particles (so-called nano-particles) much smaller than the wavelength of light on a nano-scale are uniformly dispersed throughout a polymeric matrix comprising an organic skeleton, and (3) a combined structure of both.

Between the organic component and the inorganic component there are some interactions such as intermolecular forces, e.g., hydrogen bonds, dispersion forces and Coulomb force, attractive forces resulting from covalent bonds, ionic bonds and interaction of $\pi$ electron clouds, etc. In the organic-inorganic composite material, the organic component and the inorganic component are mixed together at a molecular level or at a scale level smaller than the wavelength of light. For this reason, that composite material provides a transparent material because of having little or no influence on light scattering. As can also be derived from Maxwell equation, the composite material possesses the optical characteristics of each of the organic and inorganic components. Therefore, the organic-inorganic composite material can have various optical properties (such as refractive index and chromatic dispersion) depending on the type and quantitative ratio of the organic and inorganic components present. Thus, it is possible to obtain various optical properties by blending together the organic and inorganic components at any desired ratio.

Some exemplary compositions of an organic-inorganic composite material comprising an acrylate resin (of the ultraviolet curable type) and nano-particles of zirconia ($ZrO_2$) are shown in Table 1; some exemplary compositions of an organic-inorganic composite material comprising an acrylate resin and nano-particles of zirconia ($ZrO_2$)/alumina ($Al_2O_3$) in Table 2; some exemplary compositions of an organic-inorganic composite material comprising an acrylate resin and nano-particles of niobium oxide ($Nb_2O_5$) in Table 3; and some exemplary compositions of an acrylate resin and nano-particles of zirconium alkoxide/alumina ($Al_2O_3$) in Table 4.

TABLE 1

Zirconia

| Content | $n_d$ | $v_d$ | $n_C$ | $n_F$ | $n_g$ |
|---|---|---|---|---|---|
| 0 (100% acrylic) | 1.49236 | 57.85664 | 1.48981 | 1.49832 | 1.50309 |
| 0.1 | 1.579526 | 54.85037 | 1.57579 | 1.586355 | 1.59311 |
| 0.2 | 1.662128 | 53.223 | 1.657315 | 1.669756 | 1.678308 |
| 0.3 | 1.740814 | 52.27971 | 1.735014 | 1.749184 | 1.759385 |
| 0.4 | 1.816094 | 51.71726 | 1.809379 | 1.825159 | 1.836887 |
| 0.5 | 1.888376 | 51.3837 | 1.880807 | 1.898096 | 1.911249 |

TABLE 2

| $Al_2O_3*$ | $ZrO_2*$ | $n_d$ | $v_d$ | $n_C$ | $n_F$ | $n_g$ | Remarks |
|---|---|---|---|---|---|---|---|
| 0.1 | 0.4 | 1.831515 | 53.56672 | 1.824581 | 1.840374 | 1.8151956 | 50% acrylate |
| 0.2 | 0.3 | 1.772832 | 56.58516 | 1.767125 | 1.780783 | 1.790701 | |
| 0.3 | 0.2 | 1.712138 | 60.97687 | 1.707449 | 1.719127 | 1.727275 | |
| 0.4 | 0.1 | 1.649213 | 67.85669 | 1.645609 | 1.655177 | 1.661429 | |
| 0.2 | 0.2 | 1.695632 | 58.32581 | 1.690903 | 1.702829 | 1.774891 | |

$Al_2O_3*$: quantitative ratio of $Al_2O_3$
$ZrO_2*$: quantitative ratio of $ZrO_2$

TABLE 3

| $Nb_2O_5*$ | $Al_2O_3*$ | $n_d$ | $v_d$ | $n_C$ | $n_F$ | $n_g$ |
|---|---|---|---|---|---|---|
| 0.1 | 0 | 1.589861 | 29.55772 | 1.584508 | 1.604464 | 1.617565 |
| 0.2 | 0 | 1.681719 | 22.6091 | 1.673857 | 1.70401 | 1.724457 |
| 0.3 | 0 | 1.768813 | 19.52321 | 1.758673 | 1.798053 | 1.8251 |
| 0.4 | 0 | 1.851815 | 17.80818 | 1.839538 | 1.887415 | 1.920475 |
| 0.5 | 0 | 1.931253 | 16.73291 | 1.91708 | 1.972734 | 2.011334 |

$Nb_2O_5*$: content of $Nb_2O_5$
$Al_2O_3*$: content of $Al_2O_3$

TABLE 4

| $Al_2O_3*$ | ZA* | $n_d$ | $v_d$ | $n_C$ | $n_F$ |
|---|---|---|---|---|---|
| 0 | 0.2 | 1.533113 | 58.39837 | 1.530205 | 1.539334 |
| 0.1 | 0.27 | 1.54737 | 62.10192 | 1.544525 | 1.553339 |
| 0.2 | 0.24 | 1.561498 | 66.01481 | 1.558713 | 1.567219 |
| 0.3 | 0.21 | 1.575498 | 70.15415 | 1.572774 | 1.580977 |
| 0.4 | 0.18 | 1.589376 | 74.53905 | 1.586709 | 1.159616 |

$Al_2O_3*$: content of $Al_2O_3$ (film)
ZA*: zirconia alkoxide

Electronic systems comprising such zoom or image-formation optical systems as described above are now explained. Used for such electronic systems is a taking unit wherein an object image formed through the above zoom optical system is received by an image pickup device such as CCD for taking. The electronic systems, for instance, include digital cameras, video cameras, digital video units, information processors such as personal computers and mobile computers, telephone sets in general and easy-to-carry cellular phones in particular and personal digital assistants, as set forth below.

Figure 57:
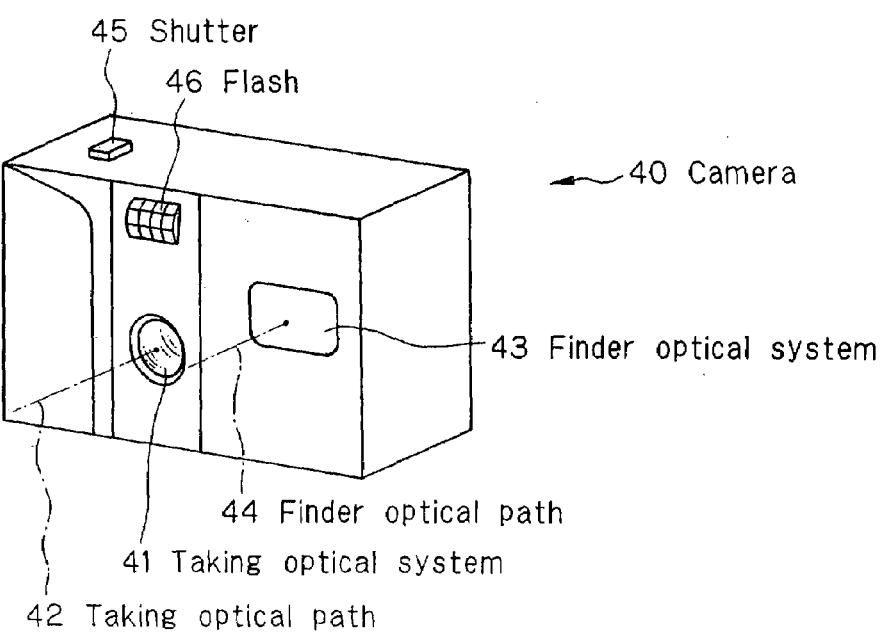
FIG. 57 is a front perspective view of the appearance of a digital camera with a built-in inventive zoom optical system.
Figure 58:
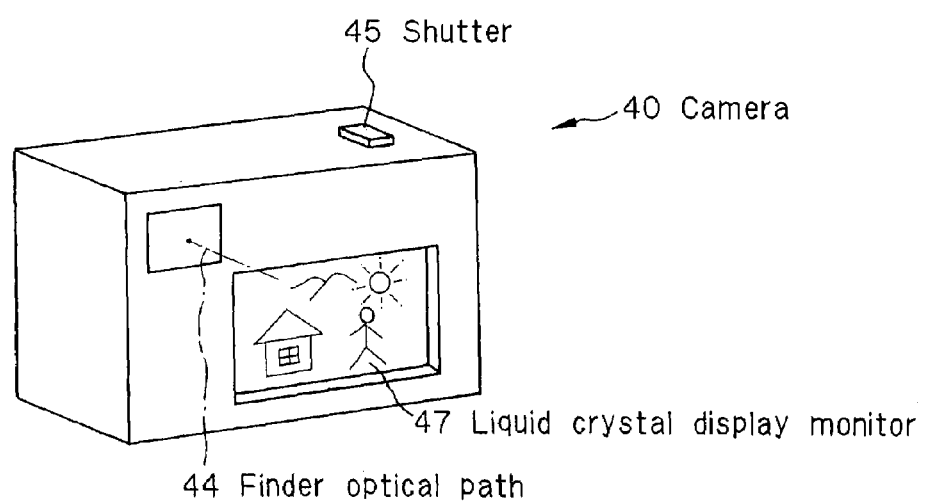
FIG. 58 is a rear perspective view of the digital camera of FIG. 57.
Figure 59:
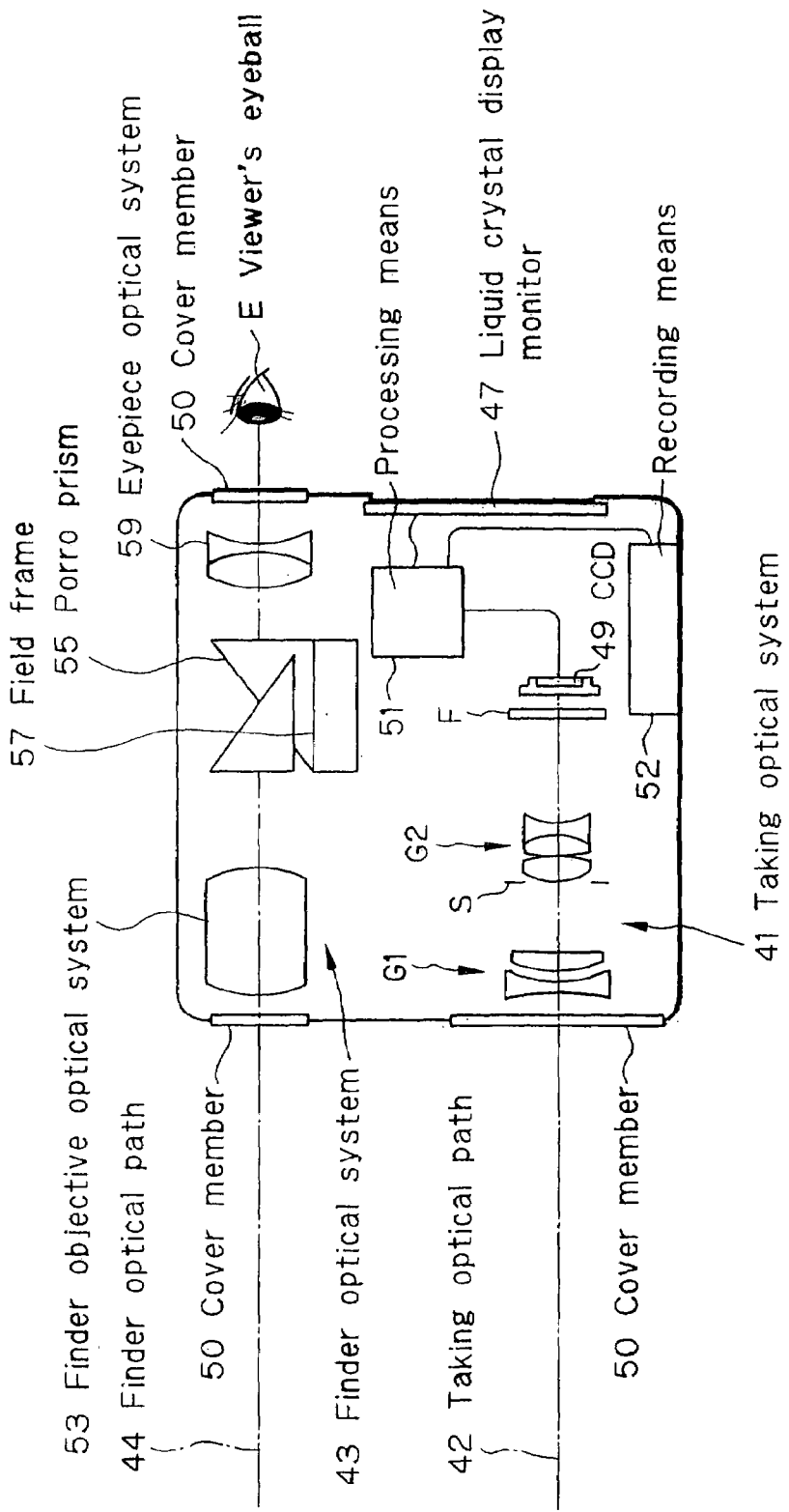
FIG. 59 is a sectional view of the digital camera of FIG. 57.

FIGS. 57, 58 and 59 are conceptual illustrations of a digital camera, in which the zoom optical system of the invention is incorporated as a taking optical system 41. FIG. 573 is a front perspective view of the appearance of a digital camera 40, and FIG. 58 is a rear perspective view of the same. FIG. 59 is a sectional view of the construction of the digital camera 40.

In this embodiment, the digital camera 40 comprises a taking optical system 41, a finder optical system 43, a shutter 45, a flash 46, a liquid crystal monitor 47 and so on. The taking optical system 41 is located on a taking optical path 42, the finder optical system 43 is placed on a finder optical path 44 separate from the taking optical path 42, and the shutter 45 is disposed on an upper portion of the camera 40. As the user presses down the shutter 45, it causes taking to occur through a taking optical system 41, for instance, the zoom optical system of Example 1-1 of the first zoom optical system.

An object image formed by the taking optical system 41 is formed on the image pickup plane of a CCD 49 via a plane-parallel plate P1 and a cover glass P2. The plane-parallel plate P1 is provided with an ultraviolet cut coating. The plane-parallel plate P1 could also have a low-pass filter function.

The object image received at CCD 49 is shown as an electronic image on the liquid crystal monitor 47 via processing means 51, which monitor is mounted on the back of the camera. This processing means 51 could be connected with recording means 52 to record therein taken electronic images.

It is noted that the recording means 52 could be provided separately from the processing means 51 or, alternatively, it could be a floppy disk, a memory card, an MO or the like. Otherwise, the recording means 52 could be constructed in such a way as to implement electronic recording or writing. This camera could also be constructed in the form of a silver-halide camera using a silver-halide film in place of CCD 49.

Moreover, a finder objective optical system 53 is located on the finder optical path 44. An object image formed by that finder objective optical system 53 is formed on a field frame 57, which is attached to a Porro prism 55 that is an image-erecting member. In the rear of the Porro prism 55 there is located an eyepiece optical system 59 for guiding an erected image into the eyeball E of a viewer. Three cover members 50 are provided: two on the entrance sides of the taking optical system 41 and the finder objective optical system 53 and one on the exit side of the eyepiece optical system 59. While plane-parallel plates are herein used for the cover members 50, it is noted that lenses having power could also be used.

The thus constructed digital camera 40 is improved in terms of performance and size reductions, because the taking optical system 41 has high performance and is slimmed down.

Figure 60:
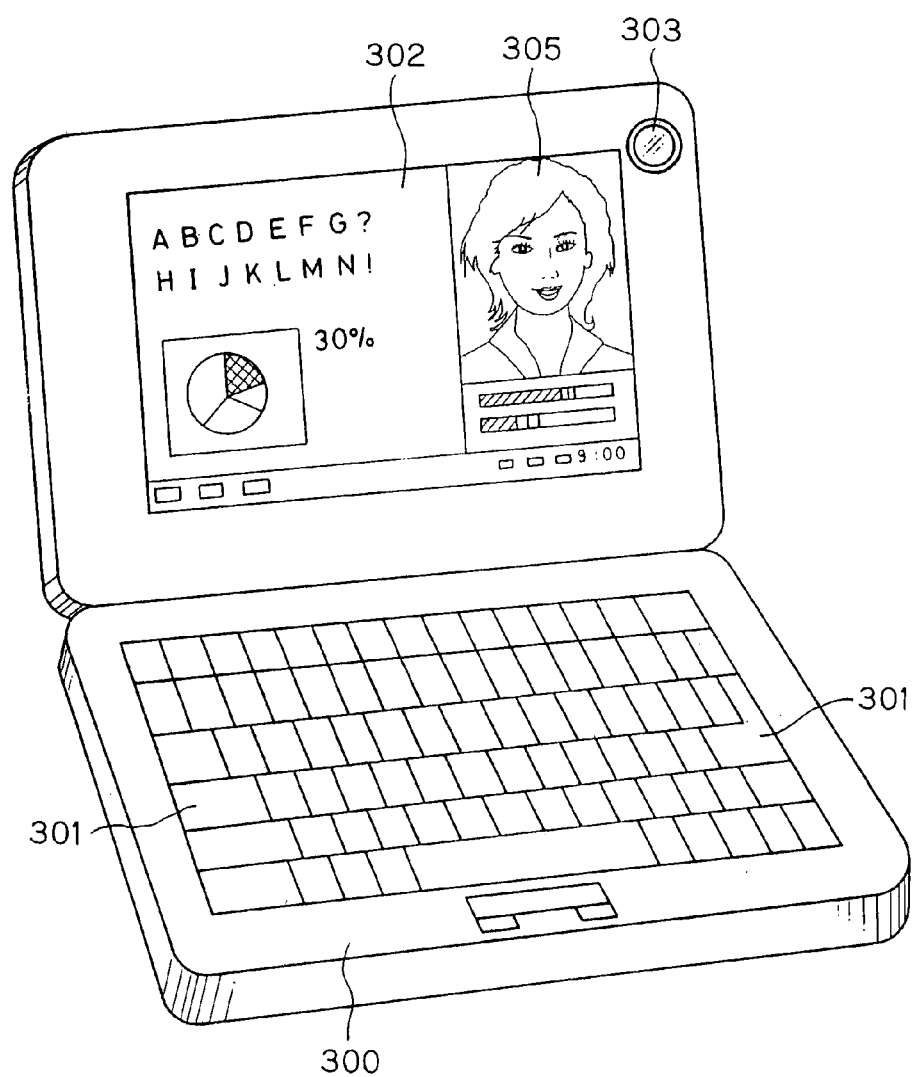
FIG. 60 is a front perspective view of a personal computer with a cover held open, wherein the zoom optical system of the invention is incorporated in the form of an objective optical system.
Figure 61:
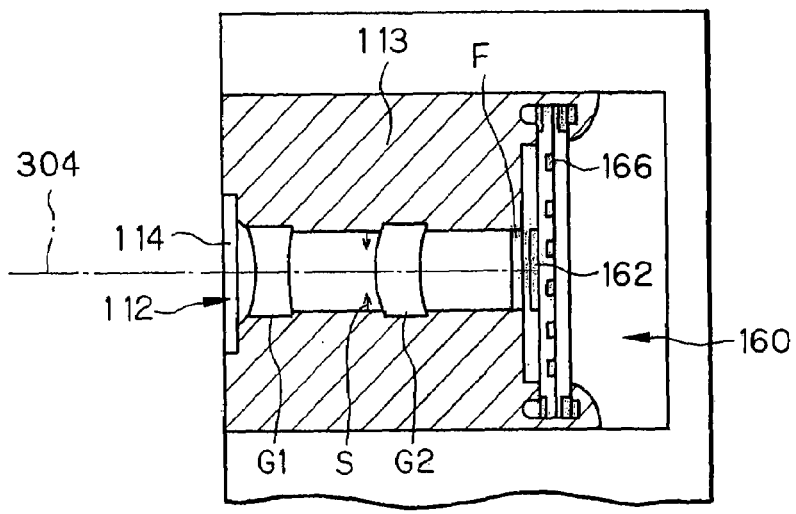
FIG. 61 is a sectional view of a taking optical system in the personal computer.
Figure 62:
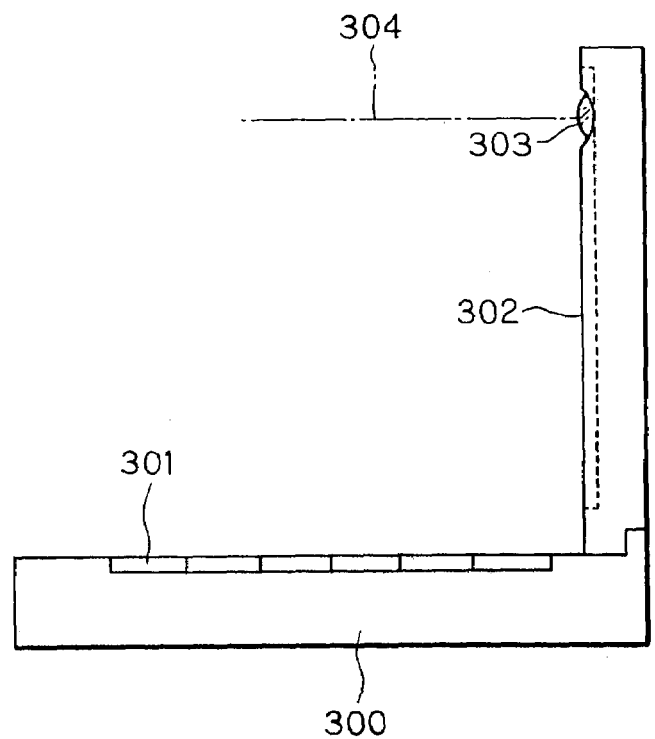
FIG. 62 is a side view of the taking optical system in the state of FIG. 60.

FIGS. 60, 61 and 62 are illustrative of a personal computer that is one example of the information processor in which the zoom optical system of the invention is used as an objective optical system. FIG. 60 is a front perspective view of a personal computer 300 in use with a cover put up, FIG. 61 is a side view of a taking optical system 303 in the personal computer 300, and FIG. 62 is a side view of the state of FIG. 60.

The personal computer 300 comprises a keyboard 301 that enables the operator to enter information from outside, a monitor 302 for presenting information to the operator and a taking optical system 303 for taking images of the operator himself or herself and surrounding images. In addition, the personal computer 300 comprises information processing means, recording means, etc., although not shown.

Here the keyboard 301 is provided for the operator to enter information from the outside in the computer. The information processing means and recording means are not shown. The monitor 302 could be any one of a transmission type liquid crystal display device illuminated from its back surface by a backlight (not shown), a reflection type liquid crystal display device designed to display images by reflection of light coming from the front, a CRT display or the like. The taking optical system 303 is provided for taking an image of the operator and surrounding images. While the taking optical system 303 is shown as being built in the right-upper portion of the monitor 302, it is understood that it is not limited thereto; it could be located somewhere around the monitor 302 or keyboard 301.

This taking optical system 303 comprises, on a taking optical path 304, an objective lens 112 comprising the (roughly sketched) zoom optical system of the invention and an image pickup device chip 162 for receiving an image. These are built in the personal computer 300.

Here, a plane-parallel plate group F such as an optical low-pass filter is additionally applied onto the image pickup device chip 162. That is, the image pickup device chip 162 and the plane-parallel plate group F are set up as an image pickup unit 160 that can be fitted into the rear end of the lens barrel 113 of the objective lens 112 in one-touch operation, so that alignment of the objective lens 112 with the image pickup device chip 162, and surface-to-surface space adjustment are dispensed with, leading to easy assembling. At the front end of the lens barrel 113, there is located a cover glass 114 for protection of the objective lens 112. It is here noted that the driving mechanisms for the zoom optical system in the lens barrel 113 is not shown.

An object image received at the image pickup device chip 162 is entered via a terminal 166 in the processing means of the personal computer 300, and shown as an electronic image on the monitor 302. As an example, an image 305 taken of the operator is shown in FIG. 60. This image 305 could be transmitted to and shown on a personal computer on the other end via suitable processing means and the Internet or telephone line.

Figure 63A:
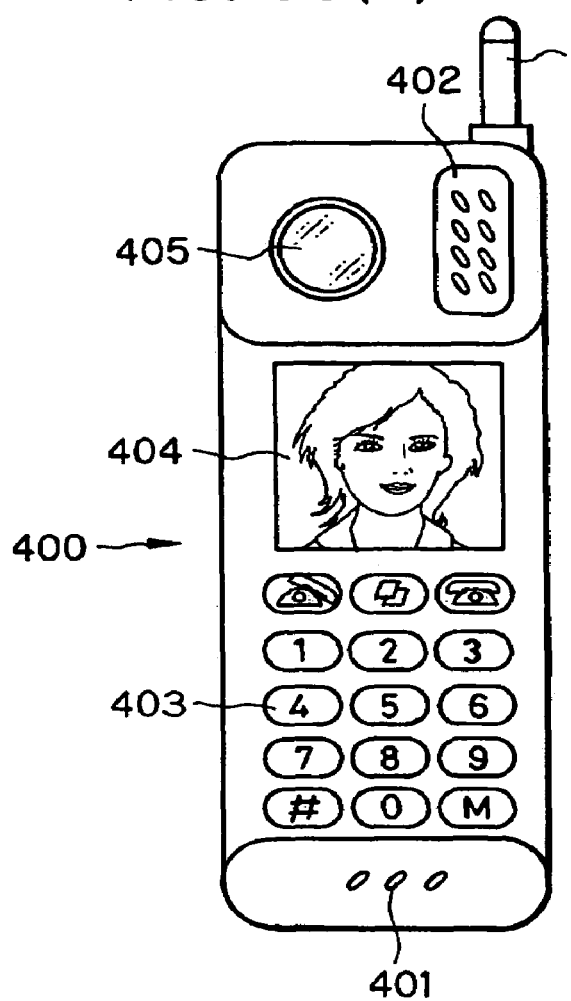
FIGS. 63(*a*) and (*b*) are a front view and a side view of a cellular phone wherein the zoom optical systems of the invention is incorporated in the form of an objective optical system, and FIG. 63(*c*) is a sectional view of a taking optical system in it.
Figure 63B:
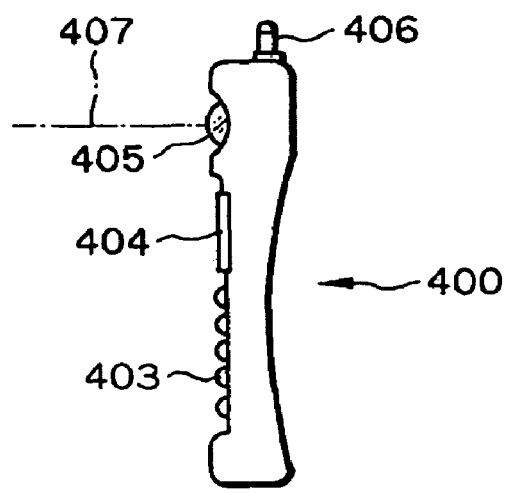
Figure 63C:
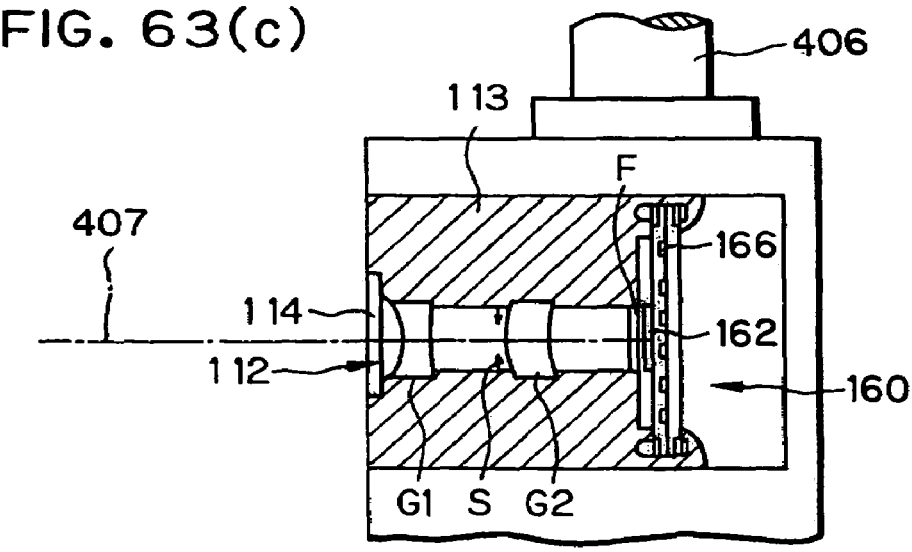

FIGS. 63(*a*), 63(*b*) and 63(*c*) are illustrative in conception of a telephone set that is another example of the information processor in which the zoom optical system of the invention is built, especially a convenient-to-carry cellular phone. FIG. 63(*a*) and FIG. 63(*b*) are a front view and a side view of a cellular phone 400, respectively, and FIG. 63(*c*) is a sectional view of a taking optical system 405.

The cellular phone 400 comprises a microphone 401, a speaker 402, an input dial 403, a monitor 404, a taking optical system 405, an antenna 406, and processing means (not shown). Here the microphone 401 is to enter the voice of the operator as information in the cellular phone, and the speaker 402 is to produce the voice of the person on the other end. The input dial 403 includes a button by which the operator enters information in the cellular phone. The monitor 404 is to show the images taken of the operator per se or the person on the other end and indicate information such as a telephone number. A liquid crystal display is used as the monitor 404. The antenna 406 is to transmit and receive communications waves. It is here noted that the components or their positions are not limited to those shown.

The taking optical system 405 is located on a taking optical path 407. That taking optical system 405 comprises an objective lens 112 comprising the (roughly sketched) zoom optical system of the invention and an image pickup device chip 162 for receiving an object image. These are built in the cellular phone 400.

Here, a plane-parallel plate group F such as an optical low-pass filter is additionally applied onto the image pickup device chip 162. That is, the image pickup device chip 162 and the plane-parallel plate group F are set up as an image pickup unit 160 that can be fitted into the rear end of the lens barrel 113 of the objective lens 112 in one-touch operation, so that alignment of the objective lens 112 with the image pickup device chip 162, and surface-to-surface space adjustment are dispensed with, leading to easy assembling. At the front end of the lens barrel 113, there is located a cover glass 114 for protection of the objective lens 112. It is noted that the driving mechanism for the zoom optical system in the lens barrel 113 is not shown.

An object image received at the image pickup device chip 162 is entered via a terminal 166 in processing means (not shown), so that the object image can be displayed as an electronic image on the monitor 404. The processing means also includes a signal processing function for converting information about the object image received at the image pickup device chip 162 into transmittable signals, thereby sending the image to the person on the other end, so that the object image can be displayed on a monitor on the other end.

POSSIBLE INDUSTRIAL APPLICATIONS

With the invention, an effective tradeoff can be offered between the cost reductions and the size reductions of a zoom optical system, and an electronic system relying on it, too, can be slimmed down at low costs.

What we claim is:

1. A zoom optical system consisting only of, in order from an object side, a first lens group having negative refracting power, a second lens group having positive refracting power, a third lens group having positive refracting power and a fourth lens group having positive refracting power, wherein:
    said first lens group consists only of two lenses,
    said fourth lens group consists only of one lens,
    at least one lens is formed by molding of a first lens blank that provides a surface including at least an optical function surface after molding, and a second lens blank that provides a surface other than said surface including at least an optical function surface after molding,
    a cavity is provided in said second lens blank,
    said first lens blank is fitted and located in said cavity,
    said first lens blank and said second lens blank are integrated into a one-piece lens, and
    at least one positive lens in said first lens group satisfies the following condition (2F), and said one-piece lens includes a thinnest portion having a thickness that satisfies the following condition (1):

$$0.1 < HH1/\phi 1 < 15 \tag{2F}$$

$$0.1 mm < t < 0.5 mm \tag{1}$$

where HH1 is a principal point spacing (mm) of the positive lens in the first lens group, $\phi 1$ is a refracting power of the positive lens in the first lens group, and t is the thickness of the thinnest portion of said one-piece lens.

2. A zoom optical system consisting only of, in order from an object side, a first lens group having negative refracting power, a second lens group having positive refracting power, a third lens group having positive refracting power and a fourth lens group having positive refracting power, wherein:
   said first lens group consists only of two lenses,
   said fourth lens group consists only of one lens,
   at least one lens is formed by molding of a first lens blank that provides a surface including at least an optical function surface after molding, and a second lens blank that provides a surface other than said surface including at least an optical function surface after molding,
   a cavity is provided in said second lens blank,
   said first lens blank is fitted and located in said cavity,
   said first lens blank and said second lens blank are integrated into a one-piece lens, and
   at least one positive lens in said second lens group satisfies the following condition (3F), and said one-piece lens includes a thinnest portion having a thickness that satisfies the following condition (1):

$$0.1 < HH2/\phi 2 < 10 \tag{3F}$$

$$0.1\ mm < t < 0.5\ mm \tag{1}$$

where HH2 is a principal point spacing (mm) of the positive lens in the second lens group, $\phi 2$ is a refracting power of the positive lens in the second lens group, and t is the thickness of the thinnest portion of said one-piece lens.

3. A zoom optical system consisting only of, in order from an object side, a first lens group having negative refracting power, a second lens group having positive refracting power, a third lens group having positive refracting power and a fourth lens group having positive refracting power, wherein:
   said first lens group consists only of two lenses,
   said fourth lens group consists only of one lens,
   at least one lens is formed by molding of a first lens blank that provides a surface including at least an optical function surface after molding, and a second lens blank that provides a surface other than said surface including at least an optical function surface after molding,
   a cavity is provided in said second lens blank,
   said first lens blank is fitted and located in said cavity,
   said first lens blank and said second lens blank are integrated into a one-piece lens, and
   at least one positive lens in said third lens group satisfies the following condition (4F), and said one-piece lens includes a thinnest portion having a thickness that satisfies the following condition (1):

$$0.1 < HH3/\phi 3 < 20 \tag{4F}$$

$$0.1\ mm < t < 0.5\ mm \tag{1}$$

where HH3 is a principal point spacing (mm) of the positive lens in the third lens group, $\phi 3$ is a refracting power of the positive lens in the third lens group, and t is the thickness of the thinnest portion of said one-piece lens.

4. A zoom optical system consisting only of, in order from an object side, a first lens group having negative refracting power, a second lens groups having positive refracting power, a third lens group having positive refracting power and a fourth lens group having positive refracting power, wherein:
   said first lens group consists only of two lenses,
   said fourth lens group consists only of one lens,
   at least one lens is formed by molding of a first lens blank that provides a surface including at least an optical function surface after molding, and a second lens blank that provides a surface other than said surface including at least an optical function surface after molding,
   a cavity is provided in said second lens blank,
   said first lens blank is fitted and located in said cavity,
   said first lens blank and said second lens blank are integrated into a one-piece lens, and
   at least one positive lens in said fourth lens group satisfies the following condition (5F), and said one-piece lens includes a thinnest portion having a thickness that satisfies the following condition (1):

$$0.1 < HH4/\phi 4 < 20 \tag{5F}$$

$$0.1\ mm < t < 0.5\ mm \tag{1}$$

where HH4 is a principal point spacing (mm) of the positive lens in the fourth lens group, $\phi 4$ is a refracting power of the positive lens in the fourth lens group, and t is the thickness of the thinnest portion of said one-piece lens.

* * * * *